(12) United States Patent
Li et al.

(10) Patent No.: US 12,120,482 B2
(45) Date of Patent: *Oct. 15, 2024

(54) SPEAKER DEVICE

(71) Applicant: SHENZHEN SHOKZ CO., LTD., Guangdong (CN)

(72) Inventors: Yongjian Li, Shenzhen (CN); Haofeng Zhang, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,855

(22) Filed: Jun. 24, 2023

(65) Prior Publication Data
US 2023/0353927 A1 Nov. 2, 2023

Related U.S. Application Data

(63) Continuation of application No. 17/305,319, filed on Jul. 4, 2021, now Pat. No. 11,700,477, which is a
(Continued)

(30) Foreign Application Priority Data

Jan. 5, 2019 (CN) .............................. 201910009907

(51) Int. Cl.
H04R 1/10 (2006.01)
H04R 1/02 (2006.01)
(Continued)

(52) U.S. Cl.
CPC ........... *H04R 1/1075* (2013.01); *H04R 1/023* (2013.01); *H04R 1/06* (2013.01); *H04R 1/1016* (2013.01);
(Continued)

(58) Field of Classification Search
CPC ........ H04R 1/1075; H04R 1/023; H04R 1/06; H04R 1/1016; H04R 1/1025;
(Continued)

(56) References Cited

U.S. PATENT DOCUMENTS 11,272,292 B2 3/2022 Li et al.
11,700,477 B2 * 7/2023 Li ........................... H04R 9/06
381/386
(Continued)

FOREIGN PATENT DOCUMENTS

CN 105101020 A 11/2015
CN 105472511 A 4/2016
(Continued)

OTHER PUBLICATIONS

International Search Report in PCT/CN2019/102403 mailed on Nov. 21, 2019, 8 Pages.
(Continued)

Primary Examiner — Angelica M McKinney
(74) Attorney, Agent, or Firm — METIS IP LLC

(57) ABSTRACT

A speaker device is provided. The speaker device may include a circuit housing, an ear hook, a rear hook, and a speaker assembly. The circuit housing may be configured to accommodate a control circuit or a battery. The ear hook may be connected to one end of the circuit housing and at least a part of the ear hook being covered by a first housing sheath. The rear hook may be connected to the other end of the circuit housing and at least a part of the rear hook being covered by a second housing sheath. The first housing sheath and the second housing sheath may cover at least a part of a periphery of the circuit housing from two ends of the circuit housing, respectively. The speaker assembly may include an earphone core and a core housing for accommodating the earphone core.

20 Claims, 22 Drawing Sheets

Related U.S. Application Data continuation of application No. PCT/CN2019/102403, filed on Aug. 24, 2019.

(51) Int. Cl.
  *H04R 1/06* (2006.01)
  *H04R 5/033* (2006.01)
  *H04R 9/02* (2006.01)
  *H04R 9/06* (2006.01)

(52) U.S. Cl.
  CPC ......... *H04R 1/1025* (2013.01); *H04R 1/1041* (2013.01); *H04R 1/1066* (2013.01); *H04R 5/0335* (2013.01); *H04R 9/025* (2013.01); *H04R 9/06* (2013.01); *H04R 2420/07* (2013.01)

(58) Field of Classification Search
  CPC .. H04R 1/1041; H04R 1/1066; H04R 5/0335; H04R 9/025; H04R 9/06; H04R 2420/07; H04R 2400/11; H04R 2460/13; H04R 9/02; H04R 1/10; H04R 1/1008; H04R 1/1083; H04R 2201/10
  See application file for complete search history.

(56) References Cited

U.S. PATENT DOCUMENTS

| | | | |
|---|---|---|---|
| 2013/0163791 A1 | 6/2013 | Qi et al. | |
| 2021/0168484 A1 | 6/2021 | Li et al. | |
| 2022/0095029 A1* | 3/2022 | Zheng | H04R 1/1083 |

FOREIGN PATENT DOCUMENTS

| | | | | |
|---|---|---|---|---|
| CN | 205336486 U | | 6/2016 | |
| CN | 107454492 A | * | 12/2017 | ............. H04R 1/105 |
| CN | 207010974 U | | 2/2018 | |
| CN | 207039848 U | | 2/2018 | |
| CN | 108873374 A | * | 11/2018 | ............. G02C 11/00 |
| CN | 208258051 U | | 12/2018 | |
| CN | 208273200 U | | 12/2018 | |
| CN | 208299971 U | | 12/2018 | |
| JP | 2016158131 A | | 9/2016 | |
| JP | 2017118481 A | | 6/2017 | |
| JP | 2018157259 A | | 10/2018 | |
| WO | 2012002605 A1 | | 1/2012 | |

OTHER PUBLICATIONS

Written Opinion in PCT/CN2019/102403 mailed on Nov. 21, 2019, 8 Pages.

* cited by examiner

SPEAKER DEVICE

CROSS-REFERENCE TO RELATED APPLICATIONS

This application is a Continuation of U.S. application Ser. No. 17/305,319, filed on Jul. 4, 2021, which is a Continuation of International Patent Application No. PCT/CN2019/102403, filed on Aug. 24, 2019, which claims priority of Chinese Patent Application No. 201910009907.7, filed on Jan. 5, 2019, and the entire contents of each of which are incorporated herein by reference.

TECHNICAL FIELD

The present disclosure relates to a speaker device, and more particularly, relates to a sleeve-type design of the speaker device.

BACKGROUND

At present, a speaker device (e.g., headphones, MP3 players, etc.) has become an important item and been widely used (e.g., for playing music, answering calls, etc.) in daily lives. Therefore, a speaker device with improved quality (e.g., sound quality) is one of developing directions of the speaker device. During a molding stage of the speaker device, a circuit housing for accommodating a control circuit or a battery may be integrated with a protective sleeve disposed on a periphery of the circuit housing. However, if the circuit housing is integrated with the protective sleeve, a high-temperature environment may cause damage to the control circuit or the battery disposed in the circuit housing, which may affect the quality of the speaker device.

SUMMARY

An embodiment of the present specification provides a speaker device including a circuit housing, an ear hook, a rear hook, and a speaker assembly. The circuit housing may be configured to accommodate a control circuit or a battery. The ear hook may be connected to one end of the circuit housing and at least a part of the ear hook being covered by a first housing sheath. The rear hook may be connected to the other end of the circuit housing and at least a part of the rear hook being covered by a second housing sheath. The first housing sheath and the second housing sheath may cover at least a part of a periphery of the circuit housing from two ends of the circuit housing, respectively. The speaker assembly may include an earphone core and a core housing for accommodating the earphone core. The speaker assembly may be connected to an end of the ear hook away from the circuit housing through a hinge assembly and the hinge assembly may be able to rotate to change a location of the speaker assembly relative to the ear hook, so that the speaker assembly being attached to a front side or a rear side of a user's ear.

In some embodiments, the circuit housing may include one or more main side walls, one or more auxiliary side walls, and one or more end walls connected with each other. The first housing sheath and the second the housing sheath may be coupled to each other on the one or more main side walls and the one or more auxiliary side walls.

In some embodiments, an inner surface of the first housing sheath or the second housing sheath corresponding to the one or more main side walls may include a positioning convex block. An outer surface of the one or more main side walls may be provided with a positioning groove corresponding to the positioning convex block.

In some embodiments, the positioning convex block is in a form of a strip and is arranged obliquely with respect to the one or more auxiliary side walls.

In some embodiments, coupled regions between the first housing sheath and the second housing sheath on the one or more main side walls and the one or more auxiliary sides wall may be arranged obliquely with respect to the one or more auxiliary side walls.

In some embodiments, a cover area of one of the first housing sheath or the second housing sheath on the circuit housing may be not smaller than a half of a cover area of the other one of the first housing sheath or the second housing sheath on the circuit housing.

In some embodiments, the rear hook may include a plug end facing an end of the circuit housing. The second housing sheath may be sleeved on a periphery of at least a part of the plug end. The circuit housing may include a socket facing the rear hook, and the plug end is at least partially inserted into the socket. Slots perpendicular to an insertion direction of the plug end relative to the socket may be located on the plug end, and a first side wall of the socket may be provided with a first through-hole corresponding to positions of the slots. The speaker device may further include a fixing component, the fixing component including two pins disposed in parallel and a connecting part for connecting the pins. The pins may be inserted into the slots through the first through-hole from an outer side wall of the first side wall of the socket so as to achieve a plugged-in connection between the circuit housing and the rear hook.

In some embodiments, a second through-hole opposite to the first through-hole may be disposed on a second side wall opposite to the first side wall on the socket, and the pins may be inserted into the second through-hole through the slots.

In some embodiments, the plug end may be divided into a first plug section and a second plug section. A cross-section area of the first plug section may be larger than a cross-section area of the second plug section in a sectional direction perpendicular to the insertion direction of the plug end. The slots may be located on the second plug section, and the second plug section may be inserted into the socket.

In some embodiments, the first plug section may include a first wiring channel extending along an insertion direction of the plug end relative to the socket. The second plug section may include a second wiring channel, the second wiring channel may penetrate the second plug section. An inner side wall of the socket may include a third wiring channel including one end connected to the first wiring channel and the other end connected to the second wiring channel. The speaker device may further include a rear hook wire. The rear hook wire may pass through the first wiring channel, the third wiring channel, and the second wiring channel successively by the rear hook to connect to the control circuit or the battery.

In some embodiments, the hinge assembly may include a hinge, a rod-like component, and a fixing component. The hinge includes a hinge base, a hinge arm, a supporting element, an elastic element. The hinge arm and the hinge base may be rotatably connected by a rotating axis, and the hinge arm may rotate relative to the hinge base under an external force, so as to alter a position of the speaker assembly relative to the ear hook. The supporting element may be movably arranged on the hinge base. The elastic element may be configured to elastically bias the supporting element toward the hinge arm so that the supporting element elastically abuts against the hinge arm.

In some embodiments, the hinge arm may include a first supporting surface and a second supporting surface connected with each other. The support element may include a third supporting surface. The third supporting surface may elastically abut against the first supporting surface and the second supporting surface, respectively, when the supporting element is elastically biased toward the hinge arm. The supporting element may be driven to rotate reversely to overcome the elastic bias of the elastic element by a connection between the first supporting surface and the second supporting surface when the hinge arm rotates relative to the hinge base under an external force, so that the third supporting surface may be switched from elastically abutting against one of the first supporting surface or the second supporting surface to the other one of the first supporting surface or the second supporting surface.

In some embodiments, a ratio of a maximum distance from a rotating axis to the connection and a minimum distance from the rotating axis to the first supporting surface may be between 1.1 and 1.5 on a section perpendicular to a central axis of the rotating axis.

In some embodiments, an angle between the hinge base and the hinge arm may become smaller when the third supporting surface is switched from elastically abutting against the first supporting surface to the second supporting surface.

In some embodiments, an external force needed when the third supporting surface is switched from elastically abutting against the first supporting surface to the second supporting surface may be different from an external force needed when the third supporting surface is switched from elastically abutting against the second supporting surface to the first supporting surface.

In some embodiments, the connection may be arranged in a shape of an arc on the section perpendicular to the central axis of the rotating axis.

In some embodiments, the connection may be arranged in a shape of a circular arc, and a curvature of the circular arc may be between 5 and 30.

In some embodiments, an angle between the first supporting surface and the second supporting surface may be an obtuse angle on the section perpendicular to the central axis of the rotating axis.

In some embodiments, the hinge base may include a base body, a first lug, and a second lug. The first lug and the second lug may protrude from the base body and may be arranged at intervals between each other. The hinge arm may include an arm body and a third lug protruding from the arm body. The third lug may be inserted into an interval region between the first lug and the second lug and be rotatably connected with the first lug and the second lug through the rotating axis.

In some embodiments, the supporting element may be at least partially arranged in the interval region and located on one side of the third lug facing the base body. The base body may be provided with an accommodating cavity communicated with the interval region. The elastic element may be disposed within the accommodating cavity, and the supporting element may be elastically biased toward the third lug by the elastic element.

In some embodiments, the earphone core at least may include a composite vibration assembly constituted by a vibration plate and a second vibration conductive plate. The composite vibration assembly may generate two resonance peaks.

In some embodiments, the earphone core may further include at least one voice coil and at least one magnetic circuit assembly. The at least one voice coil may be physically connected to the vibration plate, and the at least one magnetic circuit assembly may be physically connected to the second vibration conductive plate.

In some embodiments, a stiffness coefficient of the vibration plate may be greater than a stiffness coefficient of the second vibration conductive plate.

In some embodiments, the earphone core may further include a first vibration conductive plate. The first vibration conductive plate may be physically connected to the composite vibration assembly and the core housing. The first vibration conductive plate may generate another resonance peak.

In some embodiments, the resonance peak may be within a sound frequency range audible to a human ear.

In some embodiments, at least a portion of the core housing may be provided with at least one sound guiding hole. The at least one sound guiding hole may guide sound waves in the core housing, and the guided sound waves may be superimposed with leaked sound waves generated by the vibration of the core housing to reduce the leaked sound.

In some embodiments, the earphone core may comprise a magnetic assembly and a positioning assembly. The magnetic assembly may at least include a magnetic element. The positioning assembly may at least include two elastic elements. The magnetic assembly and the positioning assembly may be both provided on the core housing. The two elastic elements may be located on opposite sides of a center of gravity of the magnetic assembly. A relative position between the magnetic assembly and the core housing may be fixed.

In some embodiments, the magnetic assembly may at least include a first magnetic element and a second magnetic element. The first magnetic element may be a magnetic conductor or a magnet and the second magnetic element may be a magnetic conductor or a magnet. There may be a magnetic gap between the first magnetic element and the second magnetic element.

In some embodiments, the positioning assembly may include a first elastic element and a second elastic element. The first elastic element may cause a relative position between the first magnetic element and the core housing to be fixed in an extending direction of the first elastic element. The second elastic element may cause a relative position between the second magnetic element and the core housing to be fixed in an extending direction of the second elastic element.

In some embodiments, the core housing may include a first housing and a second housing. The first housing and the second housing may form an accommodating space for accommodating the magnetic assembly and the positioning assembly. The first elastic element may cause a relative position between the first magnetic element and the first housing to be fixed in the extending direction of the first elastic element. In some embodiments, a gasket may be provided between the first housing and the second housing. The gasket may be an annular gasket. Voice coil may be fixed to the gasket.

In some embodiments, the earphone core may include a voice coil. At least a portion of the voice coil may be disposed in the magnetic gap between the first magnetic element and the second magnetic element.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
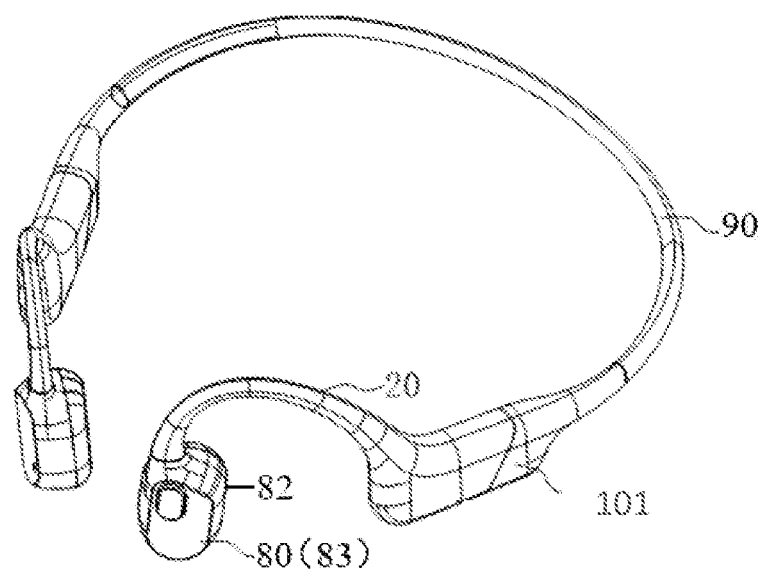
FIG. 1 is a schematic diagram illustrating an exemplary speaker device according to some embodiments of the present disclosure.

In order to illustrate the technical solutions related to the embodiments of the present disclosure, a brief introduction of the drawings referred in the description of the embodiments is provided below. Obviously, drawings described below are only some examples or embodiments of the present disclosure. Those skilled in the art may apply the present disclosure to other similar scenarios according to these drawings without further creative efforts. It should be understood that these embodiments are only provided for those skilled in the art to practice the application, but not intended to limit the scope of the present disclosure. The same numeral in the drawings refers to the same structure or operation, unless it can be obviously obtained from the context or the context illustrates otherwise.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on". The term "one embodiment" means "at least one embodiment"; the term "another embodiment" means "at least one other embodiment". Related definitions of other terms will be given in the description below. In the following, without loss of generality, in describing the present disclosure regarding conduction-related technologies, the description of the "speaker device" or "loudspeaker" will be used. This description is only a form of conduction application. For those skilled in the art, the "speaker device" or "loudspeaker" may also be replaced by other similar words, such as "sound generation apparatus", "hearing aid device" or "speaker". In fact, the various implementations in the present disclosure may be easily applied to other acoustic devices. For example, for those skilled in the art, after understanding the basic principles of speaker device, it is possible to make various modifications and alterations to the structure of and/or methods relating to the speaker device without departing from this principle. Merely by way of example, an ambient sound acquisition and processing function may be added to the speaker device, so that the speaker device may realize the function of a hearing aid. For example, a microphone may detect an ambient sound of the user/wearer, process the ambient sound according to a certain algorithm, and transmit the processed ambient sound (or a generated electrical signal representing the processed ambient sound) to a speaker. That is, the speaker device may be modified to include the function of detecting an ambient sound, a sound may be transmitted to the user/wearer through the speaker after certain signal processing, thereby realizing the functions of the hearing aid and the speaker device simultaneously. For example, the algorithm mentioned herein may include a noise cancellation algorithm, an automatic gain control algorithm, an acoustic feedback suppression algorithm, a wide dynamic range compression algorithm, an active environment recognition algorithm, an active noise reduction algorithm, a directional processing algorithm, a tinnitus processing algorithm, a multi-channel wide dynamic range compression algorithm, an active howling suppression algorithm, a volume control algorithm, or the like, or any combination thereof.

Figure 2:
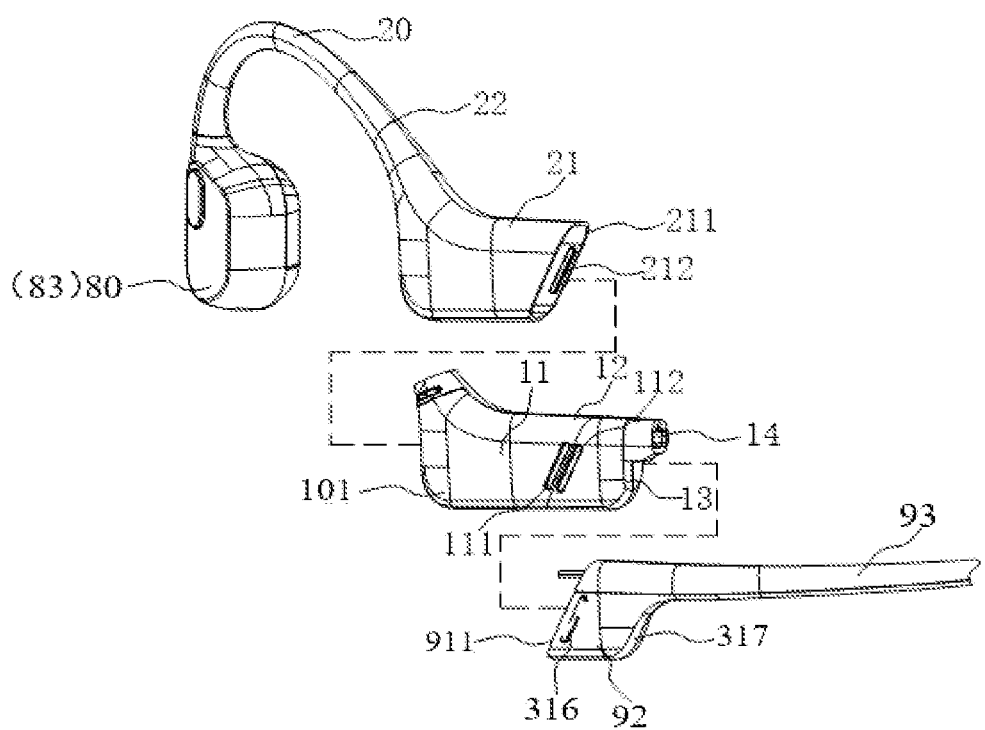
FIG. 2 is a schematic diagram illustrating an exploded view of a portion of a speaker device according to some embodiments of the present disclosure.
Figure 3:
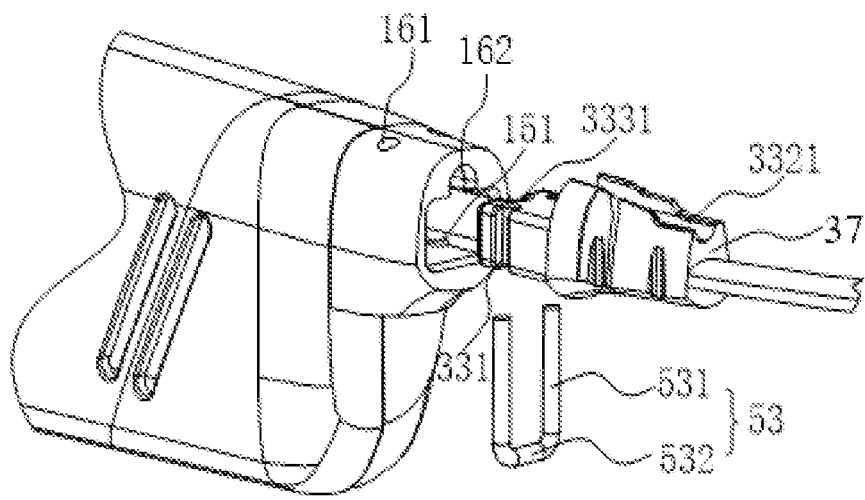
FIG. 3 is a schematic diagram illustrating an exploded view of a portion of a speaker device according to some embodiments of the present disclosure.
Figure 4:
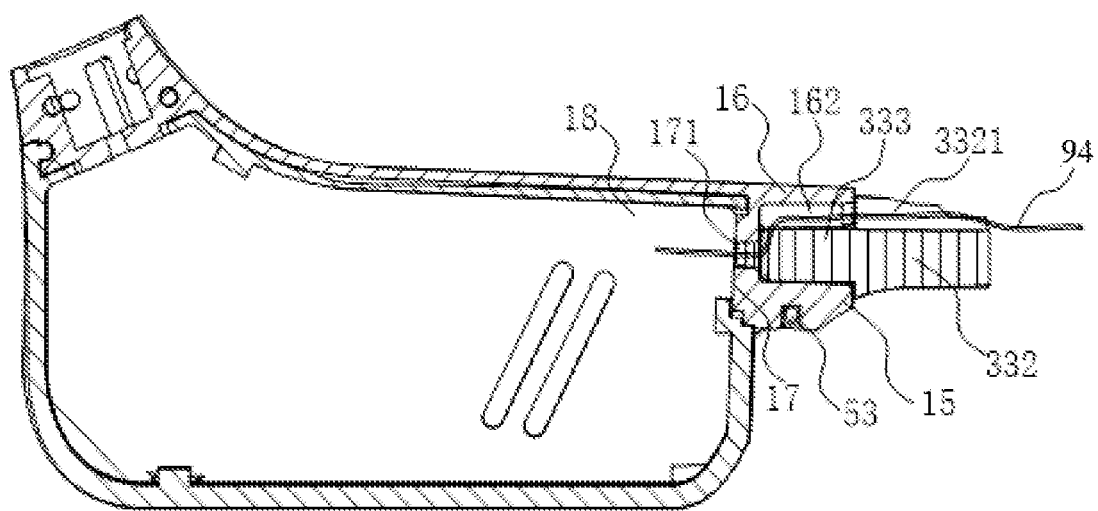
FIG. 4 is a schematic diagram illustrating a sectional view of a portion of a speaker device according to some embodiments of the present disclosure.

FIG. 1 is a schematic diagram illustrating an exemplary speaker device according to some embodiments of the present disclosure. FIG. 2 is a schematic diagram illustrating an exploded view of a portion of the speaker device illustrated in FIG. 1 according to some embodiments of the present disclosure. FIG. 3 is a schematic diagram illustrating an exploded view of a portion of the speaker device illustrated in FIG. 1 according to some embodiments of the present disclosure. FIG. 4 is a schematic diagram illustrating a sectional view of a portion of the speaker device illustrated in FIG. 1 according to some embodiments of the present disclosure. As shown in FIGS. 1-4, in some embodiments, the speaker device may be an apparatus, such as headphones, an MP3, or another apparatus with a speaker function. Specifically, the speaker device may include circuit housing(s) 101, ear hook(s) 20, a rear hook 90, function components 80 (e.g., a speaker assembly 83), control circuit(s), one or more batteries, etc. A circuit housing 101 may be configured to accommodate a control circuit and/or a battery. An ear hook 20 may be connected to one end of the circuit housing 101, and the rear hook 90 may be connected to the other end of the circuit housing 101. A speaker assembly 83 may include a core housing 82. The core housing 82 may be connected to an ear hook 20 and configured to accommodate an earphone core. In some embodiments, a count of the circuit housing(s) 101 and the count of the ear hook(s) 20 may be two, which may correspond to a left side and a right side of a user, respectively. For a certain ear hook 20, a core housing 82 and a circuit housing 101 may be disposed at two sides of the certain ear hook 20, respectively. The rear hook 90 may be further disposed at a side of the circuit housing 101 away from the certain ear hook 20.

As shown in FIG. 2, a first housing sheath 21 may be injection-molded on an ear hook 20. At least a part of the ear hook 20 may be covered by the first housing sheath 21. Specifically, the ear hook 20 may include a first elastic wire for supporting the shape of the ear hook 20. An ear hook protective sleeve 22 may be injection-molded outside a periphery of the first elastic wire. The ear hook protective sleeve 22 may further form a first housing sheath 21 integrated with the ear hook protective sleeve 22 at a connected portion between the ear hook 20 and a circuit housing 101. That is, the first housing sheath 21 may be placed on a side of the ear hook protective sleeve 22 facing the circuit housing 101.

Similarly, the rear hook 90 may be injection-molded with a second housing sheath 92. At least a part of the rear hook 90 may be covered by the second housing sheath 92. Specifically, the rear hook 90 may also include a second elastic wire for supporting a shape of the rear hook 90, and a rear hook protective sleeve 93 injection-molded outside a periphery of the second elastic wire. The rear hook protective sleeve 93 may form a second housing sheath 92 integrated with the rear hook protective sleeve 93 at a connected portion between the rear hook 90 and the circuit housing 101. That is, the second housing sheath 92 may be placed on a side of the rear hook protective sleeve 93 facing the circuit housing 101.

In some embodiments, the first housing sheath 21, the ear hook protective sleeve 22, the second housing sheath 92, and the rear hook protective sleeve 93 may be made of a soft material with a certain elasticity, such as soft silicone, rubber, etc., so as to provide users with a better touch.

In some embodiments, the first housing sheath 21 and the second housing sheath 92 may cover at least a part of a periphery of the circuit housing 101 from two ends of the circuit housing 101, respectively. The circuit housing 101, the first housing sheath 21, and the second housing sheath 92 may be molded separately. A shape of an inner side wall of the first housing sheath 21 may match a shape of at least part of an outer side wall of the circuit housing 101 near the ear hook 20. A shape of an inner side wall of the second housing sheath 92 may match the shape of at least part of an outer side wall of the circuit housing 101 near the rear hook 90. Furthermore, after the circuit housing 101, the first housing sheath 21, and the second housing sheath 92 are molded separately, the first housing sheath 21 may be placed outside a periphery of the circuit housing 101 near the ear hook 20 from a side of the circuit housing 101 facing the ear hook 20, in a sleeved manner, and the second housing sheath 92 may be placed outside a periphery of the circuit housing 101 near the rear hook 90 from a side of the circuit housing 101 facing the rear hook 90 in a sleeved manner, such that the circuit housing 101 may be covered by the first housing sheath 21 and the second housing sheath 92.

It should be noted that a high environment temperature during the molding of the first housing sheath 21 and the second housing sheath 92 may cause certain damages to the control circuit or the battery accommodated in the circuit housing 101. By molding the circuit housing 101, the first housing sheath 21, and the second housing sheath 92 separately, and then assembling them together instead mounting the first housing sheath 21 and the second housing sheath 92 on the periphery of the circuit housing 101 directly by injection molding, the damage caused by the high temperature to the control circuit or the battery during the molding may be avoided, thereby reducing negative effects on the control circuit or the battery in the molding.

In some embodiments, the circuit housing 101 may include one or more main side walls 11, one or more auxiliary side walls 12, and one or more end walls 13 connected to each other. For example, the circuit housing 101 may be a flat housing. The flat circuit housing 101 may include two opposite main side walls 11 with relatively larger areas than other walls. When a user wears the speaker device, one of the two opposite main side walls 11 may attach (or approximately attach) to the head, and the other opposite main side wall may be away from the head. The auxiliary side wall(s) 12 and end wall(s) 13 may be used to connect the two main side walls 11. When the user wears the speaker device, the auxiliary side wall(s) 12 may include two side walls facing an upper side and a lower side of the user's head. The end wall(s) 13 may include a side wall of the circuit housing 101 near one end of the ear hook 20 and a side wall of the circuit housing 101 near one end of the rear hook 90. The two end walls may be opposite to each other and face a front side and rear side of the user's head, respectively, when the user wears the speaker device. The main side wall(s) 11, the auxiliary side wall(s) 12, and the end wall(s) 13 may be connected to each other to form the circuit housing 101.

In some embodiments, the first housing sheath 21 may include an open end 211. The open end 211 may be sleeved on at least a portion of the circuit housing 101. For example, the open end 211 may cover the end wall(s) 13 on the side of the circuit housing 101 facing the ear hook 20, and optionally a portion of the main side wall(s) 11 and the auxiliary side wall(s) 12 near the ear hook 20. The second housing sheath 92 may include an open end 911. The open end 911 may be sleeved on at least a portion of the circuit housing 101. For example, the open end 911 may cover the end wall 13(s) on one side of the circuit housing 101 facing the rear hook 90 and optionally a portion of the main side wall(s) 11 and the auxiliary side wall(s) 12 near the rear hook 90. In some embodiments, the open end 211 and the open end 911 may be coupled to each other on the main side wall(s) 11 and the auxiliary side wall(s) 12 of the circuit housing 101 so as to cover the entire circuit housing 101.

In an exemplary application scenario, the first housing sheath 21 and the second housing sheath 92 may not completely cover the entire circuit housing 101. For example, an exposure hole may be disposed at the circuit housing 101 for mounting a button and/or a charging interface to facilitate user operation.

After the first housing sheath 21 and the second housing sheath 92 are placed outside the periphery of the circuit housing 101, the two housing sheaths may be fixed on the circuit housing 101 by a certain means, thereby fixing the circuit housing 101 to the housing sheaths.

Specifically, in some embodiments, an inner surface of the first housing sheath 21 corresponding to the main side wall(s) may include positioning convex block(es) 212. An inner surface of the second housing sheath 92 corresponding to the main side wall(s) 11 may include positioning convex block(es) 315. An outer surface of the main side wall(s) 11 may be provided with positioning groove(s) 111 corresponding to the positioning convex block(es) 212 and positioning groove(s) 112 matching the positioning convex block(es) 315.

The positioning convex block(es) 212 may be located on an inner side wall near the open end 211. For example, the positioning convex block(es) 212 may include a ring-shaped convex surrounding the inner side wall of the first housing sheath 21, or a plurality of convexes disposed at intervals on the inner side wall of the first housing sheath 21, which may be determined according to actual needs. In some embodiments, a count of the positioning convex block(es) 212 may be two. The two positioning convex blocks 215 may be located on the inner side walls of the first housing sheath 21 corresponding to two side walls 11 of the circuit housing 101, respectively. Similarly, a count of the positioning convex block(es) 315 may also be two. The two positioning convex blocks 315 may be located on the inner side walls of the second housing sheath 92 corresponding to the two main side walls 11 of the circuit housing 101, respectively.

In some embodiments, after the first housing sheath 21 and the second housing sheath 92 are sleeved on both sides of the circuit housing 101, respectively, the positioning convex block(es) 212 may be embedded into the positioning groove(s) 111, and the positioning convex block(es) 315 may be embedded into the positioning groove(s) 112, such that the open end 211 of the first housing sheath 21 and the open end 911 of the second housing sheath 92 may be elastically abutted together, thereby covering the circuit housing 101.

Further, in some embodiments, an outer side wall 317 of a region of the second housing sheath 92 that covers the end wall(s) 13 of the circuit housing 101 may be arranged obliquely with respect to the auxiliary side wall(s) 12. Specifically, when the user wears the speaker device, a direction from a side of the outer side wall 317 of the second housing sheath 92 near the upper side of the user's head to a side near the lower side of the user's head may be oblique in a direction away from the rear hook 90.

In some embodiments, the positioning convex block(es) 212 and the positioning convex block(es) 315 may be in the form of strip(s) along the open end 211 and the open end 911, respectively, and may be arranged obliquely with respect to the auxiliary side wall(s) 12. Further, coupled regions between the first housing sheath 21 and the second housing sheath 92 on the main side wall and the auxiliary side wall may be arranged obliquely with respect to the auxiliary side wall(s) 12. For example, a seam between the first housing sheath 21 and the second housing sheath 92 on the main side wall(s) 11 of the circuit housing 101 may be arranged obliquely with respect to the auxiliary side wall(s) 12. The oblique directions the positioning convex block(es) 212, the positioning convex block(es) 315, and the seam between the first housing sheath 21 and the housing sheath 31 on the main side wall(s) 11 of the circuit housing 101 may be the same as an oblique direction of the outer side wall 317 of the region of the second housing sheath 92 that covers the end wall(s) 13 of the circuit housing 101, thereby making the speaker device more consistent in appearance.

In an exemplary application scenario, a cover area of one of the first housing sheath 21 or the second housing sheath 92 on the circuit housing 101 may be not smaller than a half of a cover area of the other one of the first housing sheath 21 or the second housing sheath 92 on the circuit housing 101. For example, the cover area of the first housing sheath 21 on the circuit housing 101 may be not smaller than half of the cover area of the second housing sheath 92 on the circuit housing 101. Alternatively, the cover area of the second housing sheath 92 on the circuit housing 101 may be not smaller than half of the cover area of the first housing sheath 21 on the circuit housing 101. It should be noted that the cover area of the first housing sheath 21 on the circuit housing 101, the cover area of the second housing sheath 92 on the circuit housing 101, and the ratio between the two cover areas may be modified according to needs. For example, the two cover areas may be the same, which is not specifically limited here.

In some embodiments, the circuit housing 101 and the rear hook 90 may be formed in one body, or connected together by means of plugging, snapping, or the like.

In some embodiments, the rear hook 90 may further include a plug end 37 facing an end of the circuit housing 101 as shown in FIG. 3. The second housing sheath 92 may be sleeved on a periphery of at least a part of the plug end 37. Specifically, the plug end 37 may be injection-molded at an end of the second elastic wire. The rear hook protective sleeve 93 may be further injection-molded outside the second elastic wire and part of the plug end 37, and a second housing sheath 92 may be integrally molded at the plug end 37, such that the second housing sheath 92 may be sleeved on a peripheral region of the plug end 37 that is not covered by the rear hook protective sleeve 93.

Further, the circuit housing 101 may include a socket 14 facing the rear hook 90. The socket 14 may be located on an end wall 13 of the circuit housing 101 near the rear hook 90, and extended from a side of the end wall 13 near an auxiliary side wall 12 to the rear hook 90.

The plug end 37 may be at least partially inserted into the socket 14. Two slots 331 perpendicular to an insertion direction of the plug end 37 relative to the socket 14 may be located on opposite sides of the plug end 37, respectively. The plug end 37 may include two slots 331 disposed on two opposite sides of the plug end 37. The two slot 331 may be perpendicular to an insertion direction of the plug end 37 relative to the socket 14, and spaced apart from each other by a distance and arranged on the opposite sides of the plug end 37 symmetrically. Further, the two slots 331 may be connected to a side wall corresponding to the plug end 37 in a direction perpendicular to the insertion direction of the plug end 37.

Accordingly, a first side wall 15 of the socket 14 may be provided with a first through-hole 151 corresponding to the positions of the two slots 331. The first side wall 15 of the socket 14 may be placed outside the periphery of the socket 14 and face the lower side of the user's head when the user wears the loudspeaker.

In some embodiments, the speaker device may further include a fixing component 53. The fixing component 53 may include two pins 531 disposed in parallel and a connecting part 532 for connecting the pins 531. In some embodiments, the two pins 531 may be disposed in parallel, and the connecting part 532 may be vertically connected to a same side of the two pins 531, thereby forming a U-shaped fixing component 53.

The pins 531 may be inserted into the slots 331 through the through-hole from an outer side wall of the first side wall 15 of the socket 14 so as to block the connecting part 532 outside the socket 14, thereby achieving a plug-in connection between the circuit housing 101 and the rear hook 90.

In some embodiments, a second through-hole 161 opposite to the first through-hole 151 may be disposed on a second side wall 16 opposite to the first side wall 15 on the socket 14. The pins 531 may be further inserted into the second through-hole 161 through the slots 331. The second side wall 16 may be an auxiliary side wall 12 of the circuit housing 101 near the socket 14, and when the speaker device is worn by the user, the auxiliary side wall 12 may face the upper side of the user's head.

In some embodiments, the pins 531 may be inserted into the slots 331 through the first through-hole 151 and further inserted into the second through-hole 161 through the slots 331. In other words, the pins 531 may completely penetrate and establish a connection between the plug end 37 and the two opposite side walls of the plug end 37, thereby achieving a more stable plug-in connection between the circuit housing 101 and the rear hook 90.

In some embodiments, the plug end 37 may be divided into a first plug section 332 and a second plug section 333 along an insertion direction of the plug end 37 relative to the socket 14. A cross-section area of the first plug section 332 may be larger than that of the second plug section 333 in a sectional direction perpendicular to the insertion direction of the plug end 37 relative to the socket 14.

The rear hook protective sleeve 93 may be injection-molded on the first plug section 332 of the plug end 37, and the second housing sheath 92 may be integrally injection-molded at a connected portion between the first plug section 332 and the second plug section 333. Further, the slots 331 may be located on the second plug section 333, and the second plug section 333 may be inserted into the socket 14. The plug end 37 may be exposed outside the socket 14.

In some embodiments, the first plug section 332 may include a first wiring channel 3321 extending along an insertion direction of the plug end 37 relative to the socket 14. The second plug section 333 may include a second wiring channel 3331 located on an outer end surface of the second plug section 333 that is away from the first plug section 332. The second wiring channel 3331 may extend along a direction perpendicular to the insertion direction of the plug end 37 and penetrate at least one outer side. Specifically, the first wiring channel 3321 may be located on a side of the first plug section 332 near the auxiliary side wall(s) 12 of the socket 14, and penetrate both end surfaces of the first plug section 332 along the insertion direction of the plug end 37 relative to the socket 14. The second wiring channel 3331 may penetrate two outer sides of the second plug section 333 perpendicular to an extending direction of the second wiring channel 3331.

In addition, an inner side wall of the socket 14 may include a third wiring channel 162 including one end connected to the first wiring channel 3321 and the other end connected to the second wiring channel 3331. The third wiring channel 162 may be formed by recessing an inner wall surface of the second side wall 16.

In some embodiments, the circuit housing 101 may include an inner partition wall 17 inside the housing to form an accommodating cavity 18 spaced apart from the socket 14. Specifically, the main side wall(s) 11, the auxiliary side wall(s) 12, and the end wall(s) 13 of the circuit housing 101 may form an accommodating space. The inner partition wall 17 may divide the accommodating space into two parts including the accommodating cavity 18 and the socket 14.

The inner partition wall 17 may further include a wiring hole 171 connecting the socket 14 and the accommodating cavity 18.

In some embodiments, the speaker device may further include a rear hook wire 94. The rear hook wire 94 may pass through the rear hook 90. Two ends of the rear hook wire 94 may be connected to the control circuit and the battery, respectively. Specifically, the rear hook wire 94 may pass through the rear hook 90, the first wiring channel 3321, the third wiring channel 162, and the second wiring channel 3331 successively, pass through the wiring hole 171, and enter the accommodating cavity 18, so as to connect to the control circuit or the battery.

It should be noted that the above descriptions of the earphone core housing of the speaker device are merely a specific example, and should not be regarded as the only feasible implementation solution. Obviously, for those skilled in the art, after understanding the basic principle of earing of an earphone core of the speaker device, it is possible to make various modifications and alterations in the form and details of the structure and/or related methods of the earphone core housing (or a portion thereof) without departing from this principle, but these amendments and alterations are still within the scope described above. For example, the circuit housing may be integrated with the rear hook. All such variations are within the protection scope of the present disclosure.

In some embodiments, the ear hook 20 in the present disclosure may be ear hooks for various speaker devices, such as earphones, near-sightedness glasses, far sightedness glasses, sunglasses, 3D speaker devices, etc. In some embodiments, the functional components 80 (e.g., the speaker assembly 83) may be connected to the ear hook 20 by a hinge assembly 122, so that the speaker assembly may include other functions components. In some embodiments, the speaker assembly may be connected to an end of the ear hook 20 away from the circuit housing 101 through the hinge assembly 122. The hinge assembly 122 may be able to rotate to change a location of the speaker assembly 83 relative to the ear hook 20, so that the speaker assembly 83 may be attached to a front side or a rear side of a user's ear.

Further, as described in the foregoing embodiments, the speaker assembly 83 may include an earphone core. The earphone core and the ear hook 20 may be connected through a hinge, and the hinge may be arranged on an end of the ear hook 20 near the earphone core.

Figure 5:
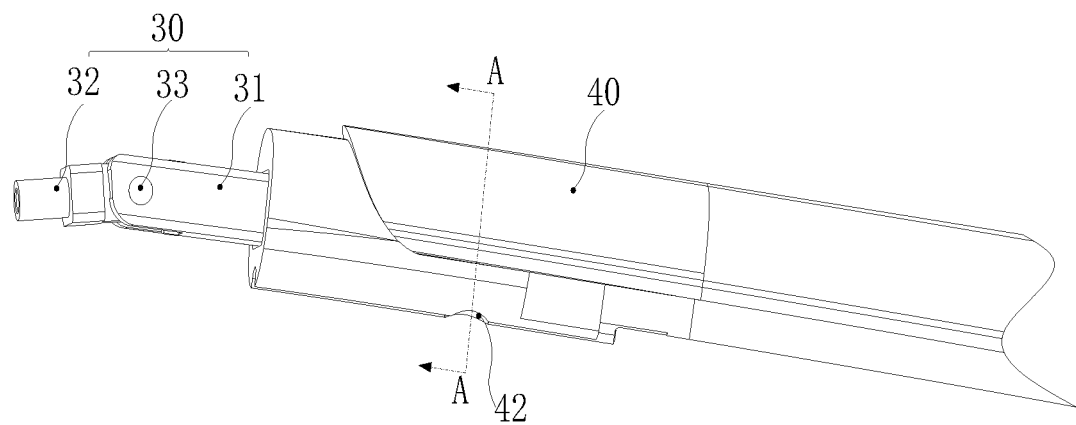
FIG. 5 is a schematic structural diagram illustrating an exemplary hinge assembly according to some embodiments of the present disclosure.
Figure 6:
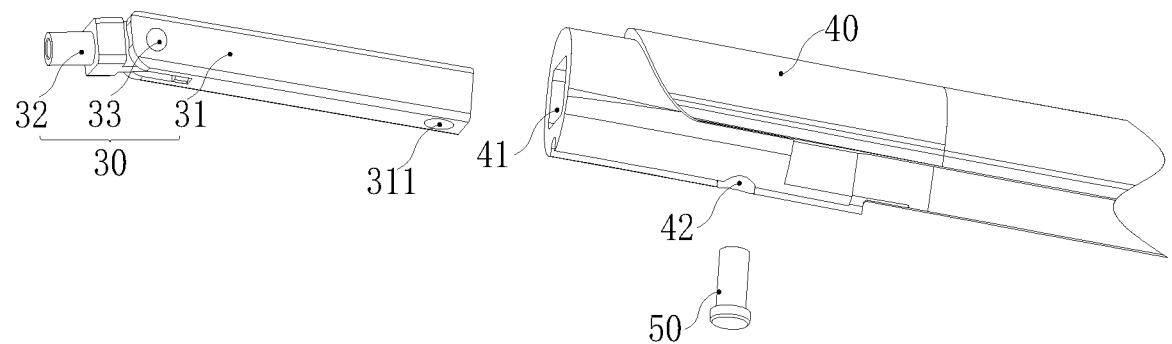
FIG. 6 is a schematic diagram illustrating an exploded view of an exemplary hinge assembly according to some embodiments of the present disclosure.

FIGS. 5-18 are schematic structural diagrams illustrating an exemplary hinge assembly according to some embodiments of the present disclosure. FIG. 5 is a schematic structural diagram illustrating an exemplary hinge assembly according to some embodiments of the present disclosure. FIG. 6 is a schematic diagram illustrating an exploded view of an exemplary hinge assembly according to some embodiments of the present disclosure. In some embodiments, the hinge assembly 122 may be used in the speaker device in some embodiments of the present disclosure.

In some embodiments, the hinge assembly 122 may include a hinge 30, which is a structure used to connect two solid bodies and allow relative rotation between them.

In some embodiments, the hinge assembly 122 may be disposed at an end of the ear hook 20 away from the circuit housing 101. The hinge assembly 122 may connect the function components 80 to the end of the ear hook 20 away from the circuit housing 101 through the hinge 30.

In some embodiments, the hinge assembly 122 may include a rod-like component 40 and a fixing component 50. In some embodiments, the hinge 30 may include a hinge base 31 and a hinge arm 32. In some embodiments, the hinge arm 32 may be rotatably connected to the hinge base 31 through a rotating axial 33. The hinge base 31 and the hinge arm 32 may be respectively connected to two components that need to be rotationally connected. The two components may be rotationally connected together through the rotating axial 33 of the hinge 30.

In some embodiments, the hinge base 31 of the hinge 30 may be connected to the rod-like component 40. In some embodiments, the rod-like component 40 may be a partial structure or an overall structure of one of the two members rotationally connected through the hinge 30. In some embodiments, the rod-like component 40 may be a connection structure in which one of the two members that need a rotational connection is connected to the hinge 30. When the hinge assembly 122 is used in the speaker device in the present disclosure, the rod-like component 40 may be at least a part of the ear hook 20 of the speaker device. For example, the rod-like component 40 may be the ear hook 20. As another example, the rod-like component 40 may be a part of the end of the ear hook 20 away from the circuit housing 101. In some embodiments, the hinge 30 may be set at the end of the ear hook away from the circuit housing 101 through the part of the ear hook 20.

In some embodiments, the rod-like component 40 may be disposed along the length direction with a hinge cavity 41 communicating with the end surface of the rod like component 40. A sidewall of the rod-like component 40 may be disposed with a first insertion hole 42 communicating with the hinge cavity 41. The end of the hinge base 31 away from the hinge arm 32 may be inserted into the hinge cavity 41 from the end surface of the rod-like component 40, and may be fixed in the hinge cavity 41 by the fixing component 50 inserted in the first insertion hole 42.

In some embodiments, the hinge cavity 41 may communicate with the ear hook 20 away from the end face of the end of the circuit housing 101. The hinge base 31 may be inserted into the hinge cavity 41. The hinge 30 may be connected to the ear hook 20.

In some embodiments, the hinge cavity 41 may be formed by the rod-like component 40 during the molding process. For example, the material of the rod-like component 40 may be rubber, plastic, etc., and the hinge cavity 41 may be formed by injection molding. The shape of hinge cavity 41 may match that of the hinge base 31 so that the hinge base 31 may be accommodated into the hinge cavity 41. In some embodiment, the ear hook 20 may be a long straight rod along the length direction of the ear hook 20, and the rod-like component 40 may be a straight rod along the length direction of the rod-like component 40. The hinge cavity 41 may be arranged in the straight rod. In some embodiments, the hinge base 31 may be matched with the hinge cavity 41 to accommodate the hinge cavity 41, thus achieving the installation of hinge 30. In some embodiments, the shape of the od-like component 40 may also be other shapes, such as an arc.

In some embodiments, the first insertion hole 42 may be formed by the rod-like component 40 during the molding process, or may be formed on the side wall of the rod-shaped member by a mean such as drilling after the molding. In some embodiments, the shape of the first insertion hole 42 may be a circle. In some embodiments, the shape of the first insertion hole 42 may be other shapes (e.g., a square, a triangle, etc.). The shape of the fixing component 50 may match the shape of the first insertion hole 42. The fixing component 50 may be inserted into the first insertion hole 42 from the outside of the rod-like component 40. The hinge base 31 may be fixed in the hinge cavity 41 by abutting the side wall of the hinge base 31. In some embodiments, the hinge base 31 may be fixed in the hinge cavity 41 by penetrating and inserting into the outer wall of the hinge base 31. In some embodiments, a matching thread may be disposed on the inner wall of the first insertion hole 42 and the outer wall of the fixing component 50. The fixing component 50 may be connected to the first insertion hole 42 by screwing to further fix the hinge base 31 in the hinge cavity 41. In some embodiments, the first insertion hole 42 and the fixing component 50 may be connected by other manners, such as an interference fit.

In some embodiments, the hinge arm 32 may be connected with other components. After a component is connected with the hinge arm 32, the component may be further able to rotate around the rotating axial 33 by being mounted in the hinge cavity 41 of the rod-like component 40 with the hinge base 31 or other components connected with the rod-like component 40. For example, when the hinge assembly 122 is used in the speaker device, the function components 80 (e.g., the speaker assembly 83) may be connected to the end of the hinge arm 32 away from the hinge base 31. The core housing 82 of the earphone core 50 may be connected to the end of the ear hook 20 away from the circuit housing 101 through the hinge 30.

In some embodiments, the rod-like component 40 may be disposed with the hinge cavity 41 connected to an end surface of the rod-like component 40. The hinge 30 may accommodate the hinge seat 31 in the hinge cavity 41, and further penetrate the fixing component 50 through the sidewall of the rod-like component 40 through the first insertion hole 42, thereby fixing the hinge base 31 accommodated in the hinge cavity 41 in the hinge cavity 41. The hinge 30 may be detached from the rod-like component 40 to facilitate replacement of the hinge 30 or the rod-like component 40. When the hinge assembly 122 is used in the speaker device, the hinge 30 and the function components 80 may be detachable relative to the ear hook 20, thereby facilitating the replacement of the function components 80, rear hook 90, or the ear hook 20 when the function components 80, rear hook 90, or the ear hook 20 are damaged.

As shown in FIG. 6, the hinge base 31 may be disposed with a second insertion hole 311 corresponding to the first insertion hole 42. The fixing component 50 may be further inserted into the second insertion hole 311.

In some embodiments, the shape of the second insertion hole 311 may match the shape of the fixing component 50. The fixing component 50 may be inserted into the second insertion hole 311 to fix the hinge base 31 after the fixing component 50 passing through the first insertion hole 42. The shaking of the hinge base 31 in the hinge cavity 41 may be reduced, and the hinge 30 may be fixed more firmly. In some embodiments, similar to the connection of the first insertion hole 42 and the fixing component 50, the inner wall of the second insertion hole 311 may be disposed with matching threads on the outer wall corresponding to the fixing component 50. The fixing component 50 and the hinge base 31 may be screwed together. In some embodiments, the inner wall of the second insertion hole 311 and the outer side wall at the corresponding contact positions of the fixing component 50 may be smooth surfaces. The fixing component 50 and the second insertion hole 311 may be in an interference fit.

In some embodiments, the second insertion hole 311 may be disposed through both sides of the hinge base 31. The fixing component 50 may further penetrate the entire hinge base 31. The hinge base 31 may be firmly fixed in the hinge cavity 41.

Figure 7:
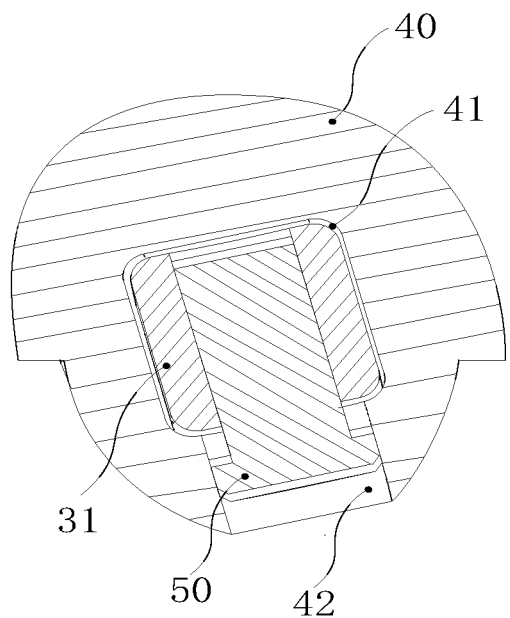
FIG. 7 is a cross-sectional view of the hinge assembly along the A-A axis in FIG. 5.

FIG. 7 is a cross-sectional view of the hinge assembly along the A-A axis in FIG. 5. As shown in FIG. 7, the cross-sectional shape of the hinge base 31 may match the cross-sectional shape of the hinge cavity 41 in a cross section perpendicular to the length direction of the rod-like component 40. A seal may be formed between the hinge base 31 and the rod-like component 40 after insertion.

In some embodiments, the cross-sectional shape of the hinge base 31 and the cross-sectional shape of the hinge cavity 41 may be any shapes on the cross-section shown in FIG. 7, as long as the hinge base 31 may be inserted into the hinge cavity 41 from the end of the rod-like component 40 away from the hinge arm 32. In some embodiments, the first insertion hole 42 may be disposed on the sidewall of the hinge cavity 41, penetrate the side wall of the hinge cavity 41, and communicate with the hinge cavity 41.

In some embodiments, both the cross-sectional shape of the hinge base 31 and the cross-sectional shape of the hinge cavity 41 may be rectangles. The first insertion hole 42 may be perpendicular to one side of the rectangle.

In some embodiments, the corners of the outer wall of the hinge base 31 or the corners of the inner wall of the hinge cavity 41 may be rounded. The contact between the hinge base 31 and the hinge cavity 41 may be smooth. The hinge base 31 may be smoothly inserted into the hinge cavity 41.

In some embodiments, a certain amount of gas is stored in the hinge cavity 41 before the assembly of hinge 30. If the hinge cavity 41 is only a cavity with an opening at one end, it will be difficult for the gas in the hinge cavity 41 to be discharged, which is not conducive to the insertion of hinge base 31 during the assembly process, thus affecting the assembly. In some embodiments, the first insertion hole 42 may be connected with the hinge cavity 41 through the side wall of the hinge cavity 41, which may assist in discharging the internal gas from the first insertion hole 42 through the hinge cavity 41 during the assembly process, thus facilitating the assembly of the hinge 30.

Figure 8:
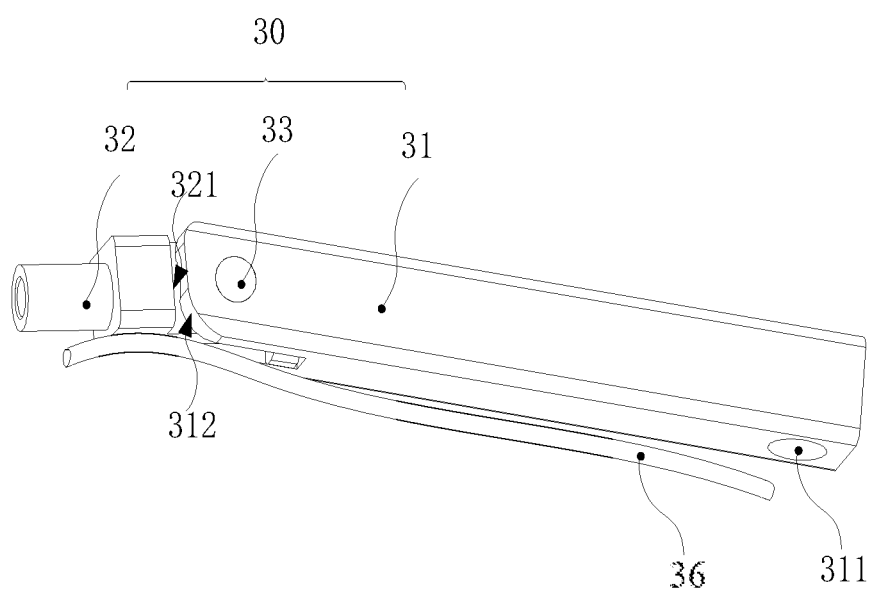
FIG. 8 is a schematic structural diagram illustrating an exemplary hinge assembly according to some embodiments of the present disclosure.

FIG. 8 is a schematic structural diagram illustrating an exemplary hinge assembly according to some embodiments of the present disclosure. As shown in FIG. 8, the hinge assembly 122 may include a connection line 36 provided outside the hinge 30.

In some embodiments, the connection line 36 may be a connection line having an electrical connection function and/or a mechanical connection function. When the hinge assembly 122 is used in the speaker device, the hinge assembly 122 may be configured to connect the function components 80 to the end of the ear hook 20 away from the circuit housing 101. The control circuit, or the like, related to the function components 80 may be disposed in the ear hook 20. The connection line 36 may electrically connect the function components 80 with a control circuit in the ear hook 20. In some embodiments, the connection line 36 may be located at one side of the hinge base 31 and the hinge arm 32. The hinge 30 may be disposed in the same accommodating space.

In some embodiments, the hinge base 31 may include a first end surface 312. The hinge arm 32 may have a second end surface 321 opposite to the first end surface 312. It is easily understood that there is a certain gap between the first end surface 312 and the second end surface 321, so that the hinge base 31 and the hinge arm 32 may be relatively rotated around the rotating axial 33. In some embodiments, during the relative rotation of the hinge arm 32 and the hinge base 31, the relative position between the first end surface 312 and the second end surface 321 changes accordingly, so that the gap between the two becomes larger or smaller.

In some embodiments, the gap between the first end surface 312 and the second end surface 321 may be larger than or smaller than the diameter of the connection line 36. The connection line 36 located outside the hinge 30 may not be caught in the gap between the first end surface 312 and the second end surface 321 during the relative rotation of the hinge base 31 and the hinge arm 32, thereby reducing the damage of the connection line 36 by the hinge. In some embodiments, the ratio of the gap between the first end surface 312 and the second end surface 321 to the diameter of the connection line 36 during the relative rotation of the hinge arm 32 and the hinge base 31 may be greater than 1.5 (e.g., greater than 1.5, 1.7, 1.9, 2.0, etc.) or smaller than 0.8 (e.g., smaller than 0.8, 0.6, 0.4, 0.2, etc.).

Figure 9:
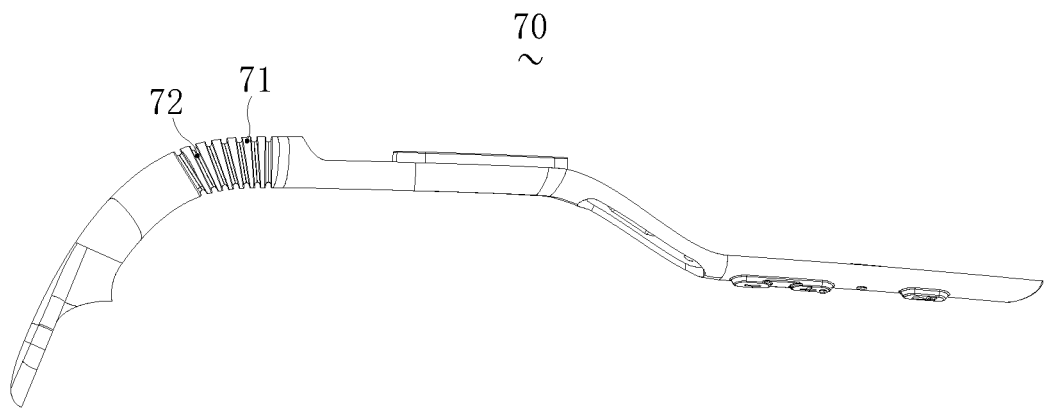
FIG. 9 is a schematic diagram illustrating an exemplary protective sleeve in an original state of a hinge assembly according to some embodiments of the present disclosure.
Figure 10:
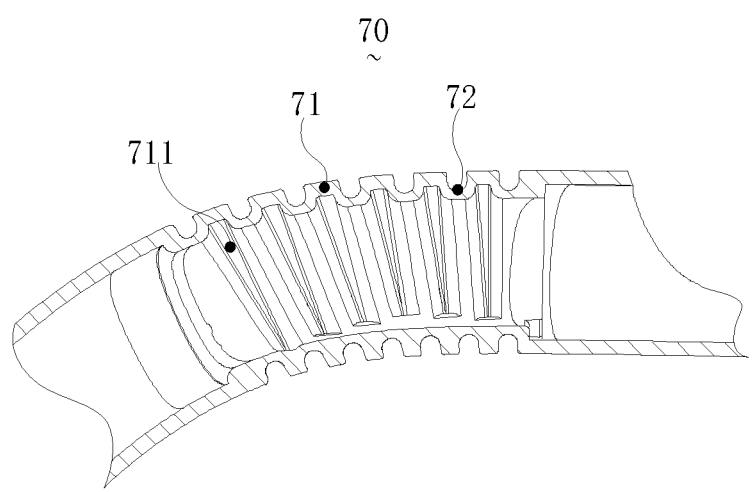
FIG. 10 is a schematic diagram illustrating a partial cross-sectional view of an exemplary protective sleeve in an original state of a hinge assembly according to some embodiments of the present disclosure.
Figure 11:
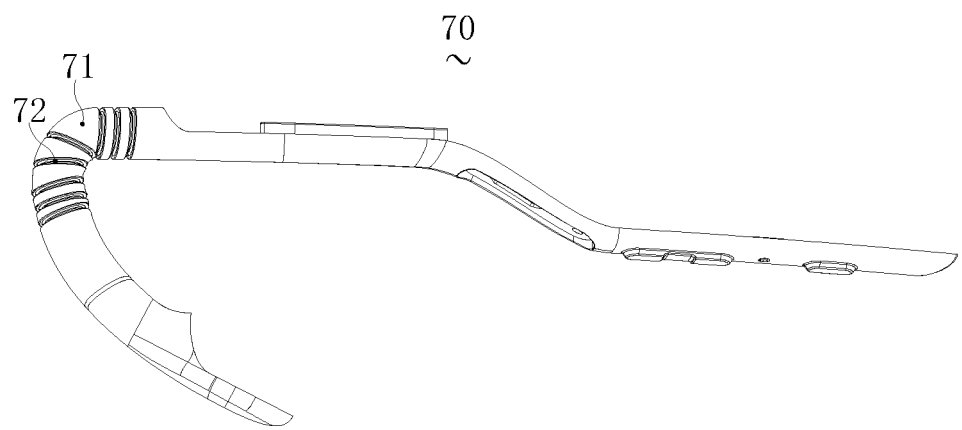
FIG. 11 is a schematic diagram illustrating an exemplary protective sleeve in a bent state of a hinge assembly according to some embodiments of the present disclosure.
Figure 12:
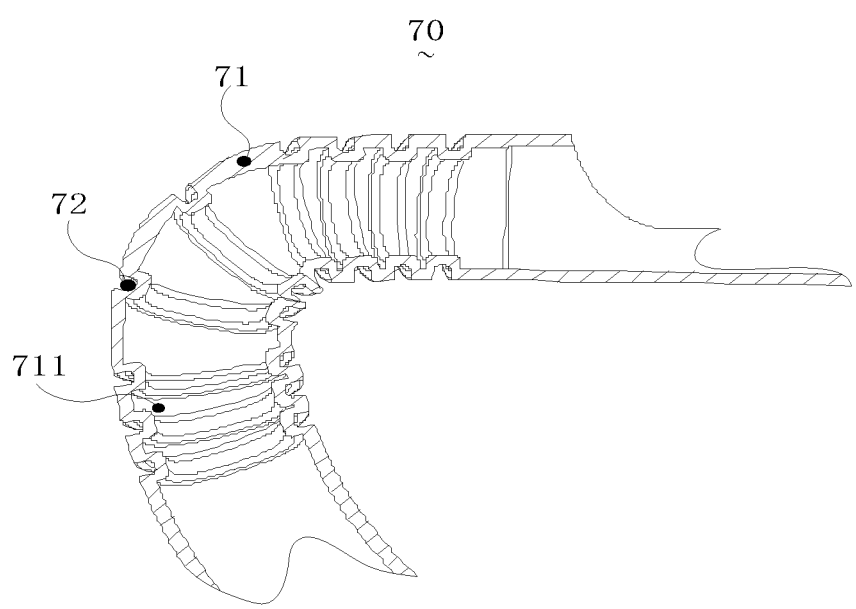
FIG. 12 is a schematic diagram illustrating a partial cross-sectional view of an exemplary protective sleeve in a bent state of a hinge assembly according to some embodiments of the present disclosure.

FIG. 9 is a schematic diagram illustrating an exemplary protective sleeve in an original state of a hinge assembly according to some embodiments of the present disclosure. FIG. 10 is a schematic diagram illustrating a partial cross-sectional view of an exemplary protective sleeve in an original state of a hinge assembly according to some embodiments of the present disclosure. FIG. 11 is a schematic diagram illustrating an exemplary protective sleeve in a bent state of a hinge assembly according to some embodiments of the present disclosure. FIG. 12 is a schematic diagram illustrating a partial cross-sectional view of an exemplary protective sleeve in a bent state of a hinge assembly according to some embodiments of the present disclosure. As shown in FIGS. 5 and 9-12, in some embodiments, the hinge assembly 122 may further include a protective sleeve 70.

The protective sleeve 70 may be sleeved on the periphery of the hinge 30 and may be bent along with the hinge 30. In some embodiments, the protective sleeve 70 may include a plurality of annular ridge portions 71 spaced apart along the length direction of the protective sleeve 70 and an annular connection portion 72 provided between the annular ridge portions 71. The protective sleeve 70 may be used to connect two adjacent annular ridge portions. In some embodiments, the tube wall thickness of the annular ridge portion 71 may be greater than the tube wall thickness of the annular connection portion 72.

In some embodiments, the length direction of the protective sleeve 70 may be consistent with the length direction of the hinge 30. The protection sleeve 70 may be specifically disposed along the length direction of the hinge base 31 and the hinge arm 32. The protective sleeve 70 may be made of soft materials, such as the soft silicone, the rubber, or the like, or any combination thereof.

In some embodiments, the annular ridge portion 71 may be formed by protruding outwardly from the outer side wall of the protective sleeve 70. The shape of the inner side wall of the protective sleeve 70 corresponding to the annular ridge portion 71 may be not limited herein. For example, the surface of inner wall may be smooth. As another example, a recess on the inner wall may be disposed at a position corresponding to the annular ridge portion 71.

In some embodiments, the annular connection portion 72 may be configured to connect adjacent annular ridge portions 71, specifically, connected to the edge region of the annular ridge portion 71 near the inside of the protective sleeve 70. A side of the outer wall of the protective sleeve 70 may be disposed in a recess with respect to the annular ridge portion 71.

In some embodiments, a count of the annular ridge portion 71 and the annular connection portion 72 may be set according to an actual need. For example, the count of the annular ridge portion 71 and annular connection portion 72 may be set according to the length of the protective sleeve 70, the width of the annular ridge portion 71, and/or the width of the annular connection portion 72 in the direction of the length of the protective sleeve 70.

In some embodiments, the tube wall thicknesses of the annular ridge portion 71 and the annular connection portion 72 refer to the thickness between the inner and outer walls of the protective sleeve 70 corresponding to the annular ridge portion 71 and the annular connection portion 72, respectively. In some embodiments, the tube wall thickness of the annular ridge portion 71 may be greater than the tube wall thickness of the annular connection portion 72.

When the hinge base 31 and the hinge arm 32 of the hinge 30 are relatively rotated around the rotating axial 33, the angle between the hinge base 31 and the hinge arm 32 may change. The protective sleeve 70 may be bent. As shown in FIGS. 11 and 12, in some embodiments, when the protective sleeve 70 is bent with the hinge 30, the annular ridge 71 and the annular connection portion 72 located in the outer region of the bent shape formed by the protective sleeve 70 may be in a stretched state. The annular ridge 71 and annular connection portion 72 located in the inner region of the bent shape may be in a squeezed state.

In some embodiments, the thickness of the pipe wall of the annular ridge portion 71 may be greater than the thickness of the pipe wall of the annular connection portion 72. The annular ridge portion 71 may be harder than the annular connection portion 72. Therefore, when the protective sleeve 70 is in a bent state, the protective sleeve 70 on the outer side of the bent shape may be in a stretched state. The annular ridge portion 71 may provide a certain strength support for the protective sleeve 70. When the protective sleeve 70 region on the inner side in the bent state is squeezed, the annular ridge portion 71 may withstand a certain pressing force, thereby protecting the protective sleeve 70 and improving the stability of the protective sleeve 70. The service life of the protective sleeve 70 may be extended.

In some embodiments, the shape of the protective sleeve 70 may be consistent with the state of the hinge 30. In some embodiments, two sides of the protective sleeve 70 along the length direction and rotated around the rotation axis may be stretched or squeezed. In some embodiments, the hinge base 31 and the hinge arm 32 of the hinge 30 may only rotate around the rotating axial 33 within a range of smaller than or equal to 180°. The protective sleeve 70 may only be bent toward one side. ne side of the two sides of the protective sleeve 70 in the length direction may be squeezed, and the other side may be stretched. At this time, according to the different forces on both sides of the protective sleeve 70, the two sides of the protective sleeve 70 under different forces may have different structures.

In some embodiments, the width of the annular ridge portion 71 along the length direction of the protective sleeve 70 when the protective sleeve 70 is in a bent state toward the outside of the bent shape formed by the protective sleeve 70 may be greater than the width in the longitudinal direction of the protective sleeve 70 toward the inside of the bent shape.

The strength of the protective sleeve may be improved by increasing the width of the annular ridge 71 in the length direction of the protective sleeve 70. In some embodiments, an angle value of an initial angle between the hinge base 31 and the hinge arm 32 may be smaller than 180°. If the annular ridges 71 of the protective sleeve 70 are evenly arranged, the protective sleeve 70 will be squeezed in the original state. In some embodiments, the width of the annular ridge 71 corresponding to the outer region side of the bent shape in the bent state is larger, thereby enlarging the length of the side protective sleeve 70. The strength of the protective sleeve 70 may be improved. The extent of the stretching side may be reduced when the protective sleeve 70 is bent. At the same time, the width of the annular ridge portion 71 along the longitudinal direction of the protective sleeve 70 may be smaller when the protective sleeve 70 is bent toward the inner region side of the bent shape, which can increase the space of the extruded annular connection portion 72 in the length direction of the protective sleeve 70 and alleviate the extrusion of the extrusion side.

In some embodiments, the width of the annular ridge portion 71 may gradually decrease from the side of the outer region toward the bent shape to the side of the inner region toward the bent shape. When the protective sleeve 70 is in the bent state, the width toward the outer region side of the bent shape formed by the protective sleeve 70 may be greater than the width toward the inner region side of the bent shape.

The annular ridge portion 71 may be disposed around the periphery of the protective sleeve 70. In the length direction of the protective sleeve 70, one side of the annular ridge portion 71 may correspond to the stretched side, and the other side of the annular ridge portion 71 may correspond to the squeezed side. In some embodiments, the width of the annular ridge portion 71 may gradually decrease from the side of the outer region facing the bent shape to the side of the inner region facing the bent shape, thereby making the width more uniform. The stability of the protective sleeve 70 may be improved.

In some embodiments, when the protective sleeve 70 is in a bent state, the annular ridge portion 71 may be disposed with a groove 711 on an inner circumferential surface of the protective sleeve 70 inside the protective sleeve 70 on the outer region side of the bent shape formed by the protective sleeve 70.

In some embodiments, the groove 711 may be disposed along a length direction perpendicular to the protective sleeve 70. The corresponding annular ridge portion 71 may be appropriately extended when the protective sleeve 70 is stretched in the length direction.

When the protective sleeve 70 is in a bent state, the protective sleeve 70 on the outer side of the bent shape formed by the protective sleeve 70 may be in a stretched state. A groove 711 may be disposed on the inner ring surface inside the protective sleeve 70 corresponding to the corresponding annular ridge portion 71, so that when the protective sleeve 70 on the outer side is stretched, the annular ridge portion 71 corresponding to the groove 711 may be appropriately extended to bear a partial stretch, thus reducing the tensile force exerted on the protective sleeve 70 on the outer side, thereby protecting the protective sleeve 70.

It should be noted that when the protective sleeve 70 is in a bent state, the annular ridge portion 71 on the side facing the inner region of the bent shape may not be disposed with a groove 711 on the inner side wall of the corresponding protective sleeve 70. In some embodiments, the width of the groove 711 along the length of the protective sleeve 70 gradually decreases from the side of the outer region facing the bent shape to the side of the inner region facing the bent shape, so that no groove 711 is disposed on the inner sidewall of the protective sleeve 70 corresponding to the annular ridge portion 71 facing the inner region side of the bent shape.

In some embodiments, when the hinge assembly 122 is used to a speaker device of the present disclosure, the protective sleeve 70 may be connected to the ear hook 20 and the function components 80 which are respectively disposed on both sides in the longitudinal direction of the protective sleeve 70. In some embodiments, the protective sleeve 70 may also be other structures in the speaker device. For example, the protective cover of some components may be integrally formed, so that the speaker device may be more closed and integrated.

It should be noted that the hinge assembly 122 in the present disclosure may not only be used in the speaker device, but may also be used in other apparatuses. In some embodiments, the hinge assembly 122 may also include the rod-like component 40, the fixing component 50, the connection line 36, the protective sleeve 70, etc., or other components related to the hinge 30. The hinge assembly 122 may realize the corresponding functions of the other components.

Figure 13:
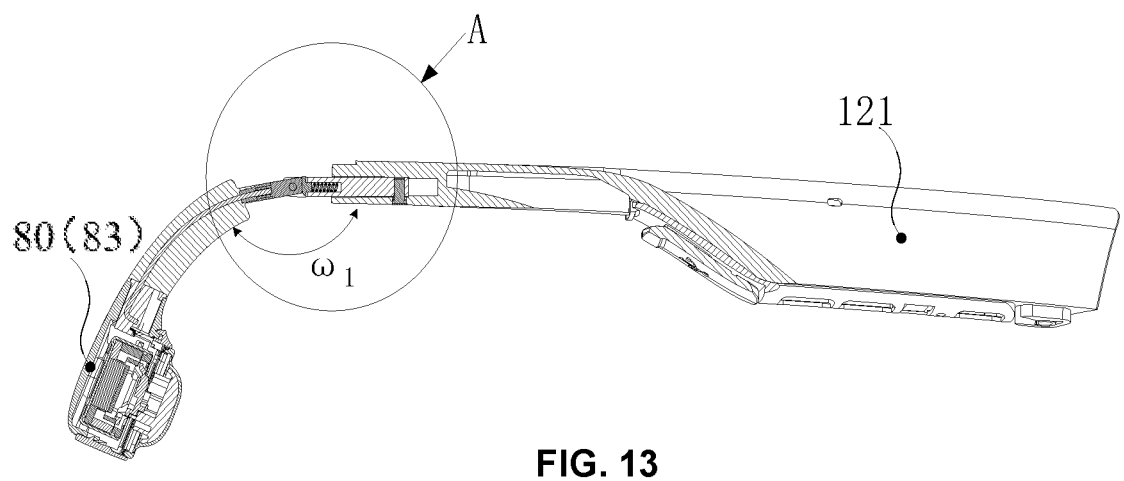
FIG. 13 illustrates a partial sectional view of a speaker device according to some embodiments of the present disclosure.
Figure 14:
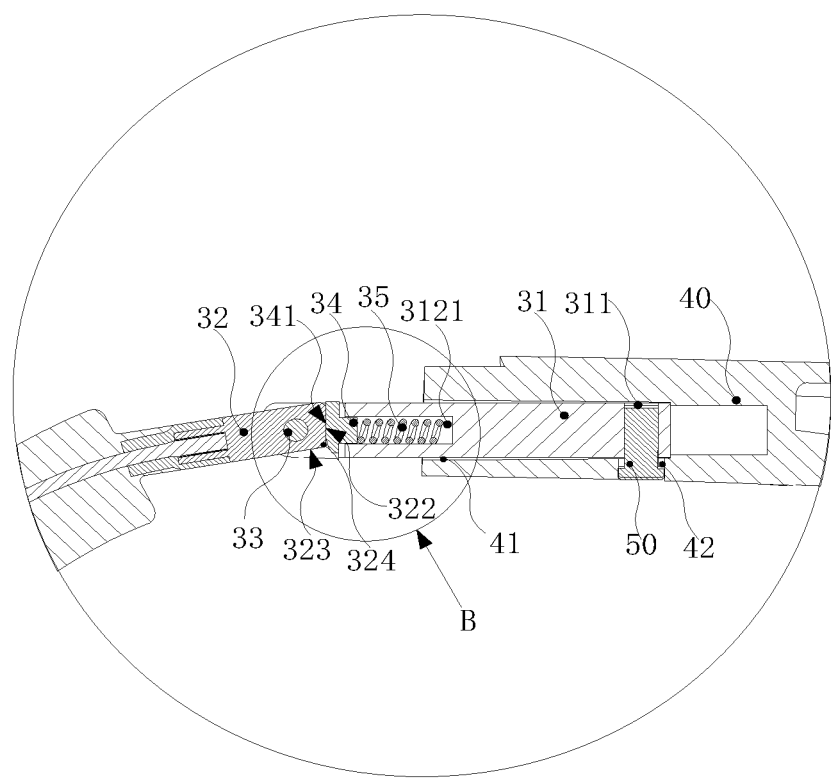
FIG. 14 illustrates an enlarged view of part A in FIG. 13.
Figure 15:
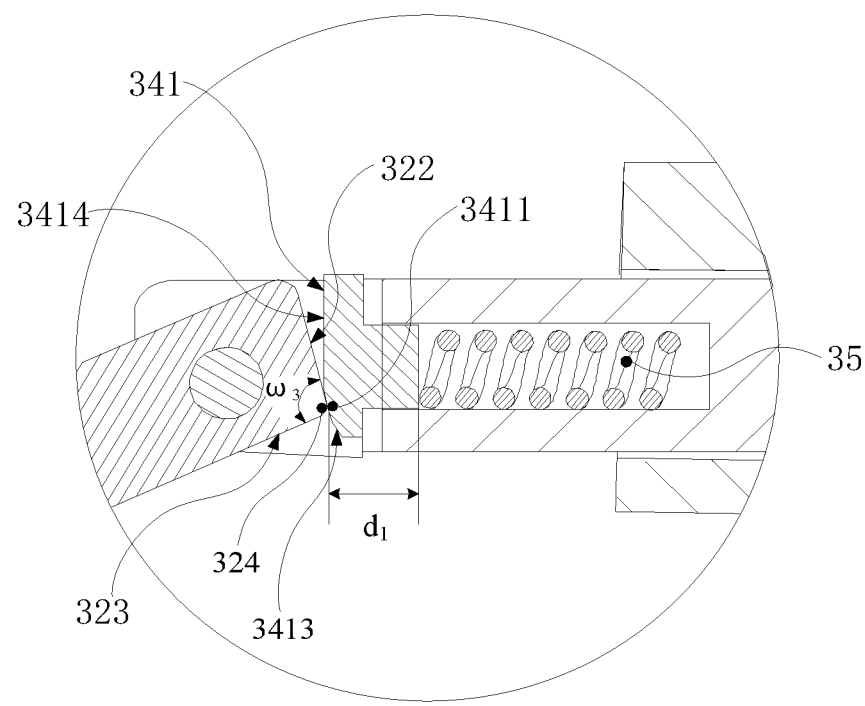
FIG. 15 illustrates an enlarged view of part B in FIG. 14.
Figure 16:
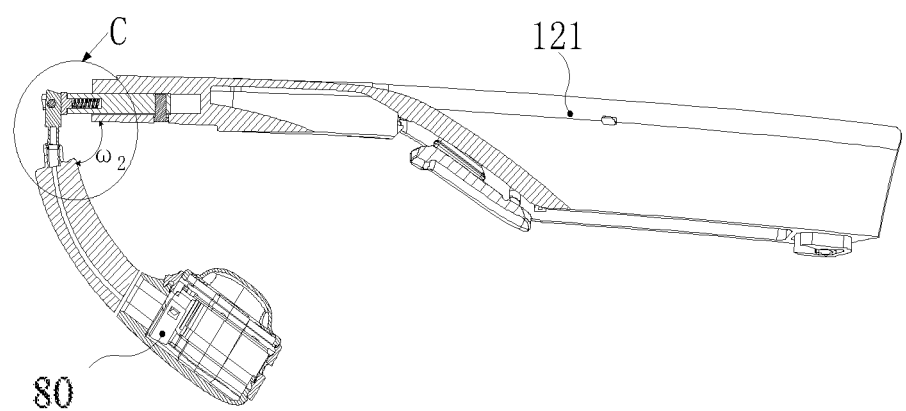
FIG. 16 illustrates a partial sectional view of a hinge according to some embodiments of the present disclosure.
Figure 17:
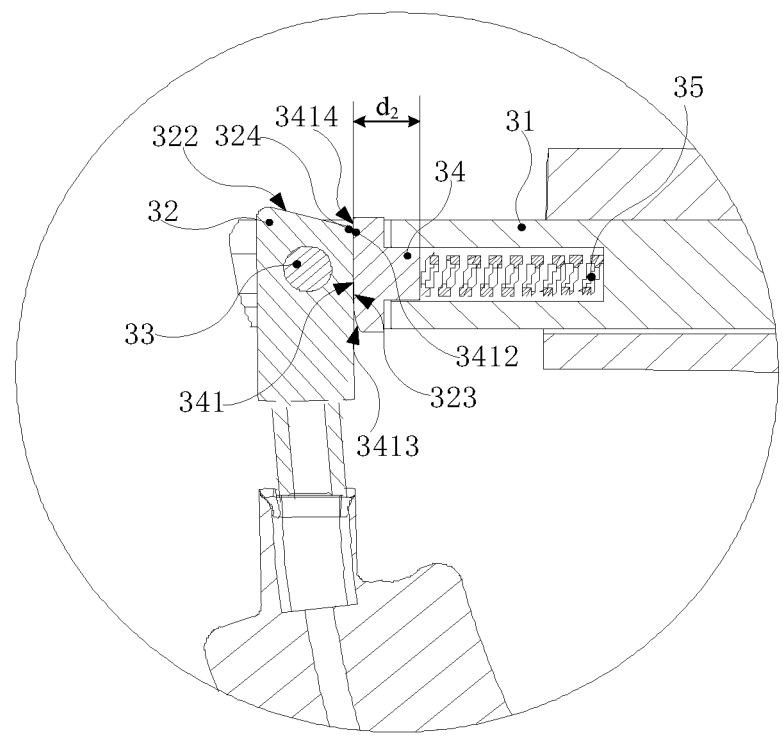
FIG. 17 illustrates an enlarged view of part C in FIG. 16.

Specifically, further referring to FIG. 13 to FIG. 17 as a combination, FIG. 13 illustrates a partial sectional view of a speaker device according to some embodiments of the present disclosure. FIG. 14 illustrates an enlarged view of part A in FIG. 13. FIG. 15 illustrates an enlarged view of part B in FIG. 14. Specifically, FIG. 15 shows an enlarged view of part B in FIG. 14 when the abutting between a first supporting surface and a third supporting surface is changed to the abutting between a second supporting surface and the third supporting surface so that a connection between the first supporting surface and the second supporting surface initially touches the third supporting surface. FIG. 16 illustrates a partial sectional view of a hinge according to some embodiments of the present disclosure. FIG. 17 illustrates an enlarged view of part C in FIG. 16. It should be noted that the hinge 30 in this embodiment of the present disclosure may be used in the speaker device in this embodiment of the present disclosure. The hinge 30 may be used in the hinge assembly 122 in this embodiments of the present disclosure, or used in other devices, and be not specifically limited herein.

In this embodiment, the hinge arm 32 of the hinge 30 may have a first supporting surface 322 and a second supporting surface 323 connected to each other.

The hinge 30 may also include a supporting element 34 and an elastic element 35. The supporting element 34 may be flexibly disposed on the hinge mount 31 and have a third supporting surface 341. The elastic element 35 may be used to elastically bias the supporting element 34 toward the hinge arm 32, so that the third supporting surface 341 may elastically abut against the first supporting surface 322 and the second supporting surface 323, respectively.

In some embodiments, when the hinge arm 32 is rotated relative to the hinge mount 31 under an external force, a connection 324 of the first supporting surface 322 and the second supporting surface 323 may drive the supporting element 34 against the elastic bias of the elastic element 35 to move in the opposite direction. Therefore, the third supporting surface 341 may be switched from elastically abutting against one of the first supporting surface 322 or the second supporting surface 323 to elastically abutting against the other of the first supporting surface 322 or the second supporting surface 323.

In an application scenario, the supporting element 34 may be connected to an end of the elastic element 35 towards the hinge arm 32. The third supporting surface 341 may face the side toward the hinge arm 32. In the process that the hinge arm 32 is rotated relative to the hinge mount 31 around the rotating axial 33 under the external force, the third supporting surface 341 may be pushed so that the supporting element 34 may compress the elastic element 35. Further, the elastic bias may occur under the action of the elastic element 35. Of course, the elastic element 35 may not be connected to the supporting element 34, and only abut against one side of the supporting element 34 as long as the supporting element 34 implements the elastic bias.

In some embodiments, the first supporting surface 322 and the second supporting surface 323 may be two side surfaces adjacent to the hinge arm 32 and at least partially parallel to the central axis of the rotating axial 33, or a portion of the two side surfaces. When the hinge arm 32 rotates relative to the hinge mount 31, the first supporting surface 322 and the second supporting surface 323 may rotate with the hinge arm 32 around the rotating axial 33. Therefore, different side surfaces of the hinge arm 32 may face the hinge mount 31. Thus, the hinge arm 32 may have different positions relative to the hinge mount 31.

In addition, the elastic element 35 may be a member that may provide an elastic force and be compressed in an elastic direction to provide a compression space. For example, the elastic element 35 may include a spring. One end of the spring may abut against the supporting element 34. When the third supporting surface 341 of supporting element 34 is pushed toward the elastic element 35, the elastic element 35 may be against the supporting element 34 and be compressed to provide a space in a direction that the third supporting surface 341 of the supporting element 34 faces. Therefore, when a relative position of the rotating axial 33 is unchanged, there may be still enough space for different sides of the hinge arm 32 to rotate between the rotating axial 33 and the third supporting surface 341.

Specifically, when the hinge arm 32 rotates relative to the hinge mount 31, the relative position of the rotating axial 33 may be unchanged. A contact position of the hinge arm 32 and the third supporting surface 341 of the hinge mount 31 may change. Since distances between different positions of the hinge arm 32 and the rotating axial 33 are different, the needed space between the rotating axial 33 and the contact position of the hinge arm 32 and the third supporting surface 341 may be different when different positions of the hinge arm 32 (e.g., different positions of the first supporting surface 322 and the second supporting surface 323) contact with the third supporting surface 341. Due to the limitation of the elastic force and the space, the space provided by the compression of the elastic element 35 may be limited. Therefore, during the rotation of the hinge arm 32 relative to the hinge mount 31, if a distance between a position of the hinge arm 32 and the rotating axial 33 is too large in a section perpendicular to a central axis of the rotating axial 33, the position may be locked at another position of the third supporting surface during the rotation process, so that the hinge arm 32 may not continue to rotate. Therefore, the hinge arm 32 and the hinge mount 31 only rotates relatively within a range. In an application scenario, during the relative rotation between the hinge arm 32 and the hinge mount 31 around the rotating axial 33, only the first supporting surface 322, the second supporting surface 323, and a region corresponding to the connection 324 between the first supporting surface 322 and the second supporting surface 323 may abut against the third supporting surface 341.

Further, in this embodiment, both the first supporting surface 322 and the second supporting surface 323 may be planes. A distance from the rotating axial 33 to the connection 324 of the two supporting surfaces may be greater than a distance from the rotating axial 33 to the first supporting surface 322 and a distance to the second supporting surface 323. The hinge 30 may have two relatively stable states that the third supporting surface 341 abuts against the first supporting surface 322 and the third supporting surface 341 abuts against the second supporting surface 323.

Of course, in this embodiment, the first supporting surface 322 and the second supporting surface 323 may also be curved surfaces with a radian or even include different sub-supporting surfaces, as long as a positional relationship between the hinge arm 32 and the hinge mount 31 may have at least two corresponding relatively stable states, and be not specifically limited herein. In addition, the hinge arm 32 may be disposed with more supporting surfaces. The hinge arm 32 and the hinge mount 31 may have various relative positional relationships by the different supporting surfaces elastically abutting against the third supporting surface 341 when the hinge arm 32 rotates relative to the hinge mount 31 around the rotating axial 33 under an external force, and be not specifically limited herein.

Specifically, as shown in FIG. 14 and FIG. 15, an original state that the first supporting surface 322 abuts against the third supporting surface 341 of the supporting element 34 may be taken as an example. At this time, the elastic element 35 may have an elastic compression deformation, or be in an original natural state, and be not limited herein. When the hinge 30 is subject to an external force, the hinge arm 32 may rotate relative to the hinge mount 31 around the rotating axial 33, so that the second supporting surface 323 gradually approaches the third supporting surface 341. In this case, the connection 324 between the first supporting surface 322 and the second supporting surface 323 may touch the third supporting surface 341. Since the distance from the connection 324 to the rotating axial 33 may be greater than the distance from the first supporting surface 322 to the rotating axial 33, the connection 324 may abut against the supporting element 34 and push the supporting element 34 to move toward the elastic element 35, thereby allowing the elastic element 35 against the pull to compress. When the hinge arm 32 is further stressed, the connection 324 may gradually approach a region between the rotating axial 33 and the third supporting surface 341. In the process, the distance between the rotating axial 33 and the third supporting surface 341 may gradually increase. It should be understood when a connection line between the connection 324 and the rotating axial 33 is perpendicular to the third supporting surface 341, the distance from the rotating axial 33 to the third supporting surface 341 may be equal to the distance from the rotating axial 33 to the connection 324 in a section perpendicular to the central axis of the rotating axial 33. At this time, the rotating axial 33 may be farthest from the third supporting surface 341. At this time, if the force is continuously applied to the hinge 30, the distance from the rotating axial 33 to the third supporting surface 341 may gradually become smaller, so that the needed compression space of the elastic element 35 may be reduced. Then the elastic element 35 may gradually release the elastic force and recover until the connection 324 leaves the third supporting surface 341 and the second supporting surface 323 abuts against the third supporting surface 341, thereby switching from a case or state that the first supporting surface 322 abuts against the third supporting surface 341 to a case or state that the second supporting surface 323 abuts against the third supporting surface 341.

Similarly, the process (as shown in FIG. 16 and FIG. 17) for switching from an original state that the second supporting surface 323 abuts against the third supporting surface 341 of the supporting element 34 to a state that the first supporting surface 322 abuts against the third supporting surface 341 of the supporting element 34 may be similar to the above process.

It should be noted that the hinge 30 in this embodiment may be applied to the hinge assembly 122 in this embodiment of the present disclosure. In one embodiment, the function member 80 may be the speaker assembly 83. In some embodiments, when the third supporting surface 341 is switched from elastically abutting against one of the first supporting surface 322 and the second supporting surface 323 to elastically abutting against the other of the first supporting surface 322 and the second supporting surface 323, the hinge assembly 122 may drive the speaker assembly 83 to switch between a first relatively fixing position and a second relatively fixing position relative to the ear hook 20. The hinge assembly 122 may fit on the back of an auricle of the user when the speaker assembly 83 is in the first relatively fixing position. As used herein, the auricle may be a portion of an external ear and mainly composed of cartilage. In some embodiments, the speaker assembly 83 may include a bone conduction speaker assembly 83. By fitting the speaker assembly 83 to the back of the auricle, the cartilage of the auricle may be used to transmit bone conduction sound/vibration. The speaker assembly 83 may be fitted to the back of the auricle, thereby improving the sound quality and reducing the impact on an ear canal during the sound transmission.

It should be noted that the distance from the rotating axial 33 to the connection 324 may be greater than a vertical distance from the first supporting surface 322 and the second supporting surface 323. Therefore, in the process that the third supporting surface 341 is switched from elastically abutting against one of the first supporting surface 322 and the second supporting surface 323 to elastically abutting against the other of the first supporting surface 322 and the second supporting surface 323, the state of the hinge 30 may change abruptly.

The switch from a case or state that the first supporting surface 322 elastically abuts against the third supporting surface 341 to a case or state that the second supporting surface 323 elastically abuts against the third supporting surface 341 may be taken as an example. When a ratio of the maximum distance h1 between the rotating axial 33 and the connection 324 to the shortest distance h2 between the rotating axial 33 and the first supporting surface 322 is different, the change of the state of the hinge 30 during the switching process may be different.

In some embodiments, the ratio between the maximum distance h1 from the rotating axial 33 to the connection 324 and the shortest distance h2 from the rotating axial 33 to the first supporting surface 322 may be between 1.1 and 1.5 in the section perpendicular to the central axis of the rotating axial 33.

Specifically, the maximum distance h1 between the rotating axial 33 and the connection 324 may be larger than the shortest distance h2 between the rotating axial 33 and the first supporting surface 322 by disposing the rotating axial 33 away from the second supporting surface 323 and close to the side of the hinge arm 32 opposite to the second supporting surface 323, thereby satisfying the ratio described above.

It should be noted that the change of the state of the hinge 30 may become obvious when the ratio between h1 and h2 is too large. However, a large force may be needed to switch from a case or state that the first supporting surface 322 elastically abuts against the third supporting surface 341 to a case or state that the second supporting surface 323 elastically abuts against the third supporting surface 341, thereby causing inconvenience. If the ratio between h1 and h2 is too small, although it is easier to switch the state, the change may be small. For example, when the user pulls the hinge 30, there may be no obvious handle sense, causing inconvenience. In this embodiment, the ratio of h1 to h2 may be set between 1.1 and 1.5, and the hinge 30 may have a more obvious change when the third supporting surface 341 is switched from elastically abutting against the first supporting surface 322 to elastically abutting against the second supporting surface 323. Thus, during use, the user may have a relatively obvious handle sense of pulling the hinge 30. At the same time, the change of the state of the hinge 30 may not be too abrupt to making it difficult for the user to switch the state of the hinge 30.

In an application scenario, the ratio of h1 to h2 may also be between 1.2 and 1.4. Specifically, the ratio of h1 to h2 may also be 1.1, 1.2, 1.3, 1.4, 1.5, etc., and be not specifically limited herein.

In addition, the positions of the first supporting surface 322 and the second supporting surface 323 set on the hinge arm 32 may affect the included angle between the hinge arm 32 and the hinge mount 31 when the third supporting surface 341 abuts against one of the first supporting surface 322 and the second supporting surface 323. Therefore, the positions of the first supporting surface 322 and the second supporting surface 323 on the hinge arm 32 may be set differently according to specific needs of users. In some embodiments, the included angle between the hinge arm 32 and the hinge mount 31 may be specifically shown in FIG. 12 and FIG. 15. Angle ω1 may be an included angle between the hinge arm 32 and the hinge mount 31 when the third supporting surface 341 abuts against the first supporting surface 322. Angle ω2 may be an included angle between the hinge arm 32 and the hinge mount 31 when the third supporting surface 341 abuts against the second supporting surface 323. In some embodiments, each of the hinge arm 32 and the hinge mount 31 may have a length. The hinge arm 32 may be disposed on one end side of the hinge mount 31 in the length direction. The first supporting surface 322 may be disposed at the end of the hinge arm 32 near the hinge mount 31 in the length direction. The second supporting surface 323 may be disposed at one end in the width direction of the hinge arm 32 and parallel to the central axis of the rotating axial 33. At this time, when the third supporting surface 341 elastically abuts against the first supporting surface 322, the included angle between the hinge arm 32 and the hinge mount 31 may be the largest. When the third supporting surface 341 elastically abuts against the second supporting surface 323, the included angle between the hinge arm 32 and the hinge mount 31 may be the smallest. Therefore, the included angle between the hinge mount 31 and the hinge arm 32 may be changed from ω1 to ω2 and become smaller when the third supporting surface 341 is switched from elastically abutting against the first supporting surface 322 to elastically abutting against the second supporting surface 323.

It should be noted if the direction of the force applied to the hinge arm 32 is the same as the direction of the gravity of the hinge arm 32 when the third supporting surface 341 is switched from elastically abutting against the first supporting surface 322 to elastically abutting against the second supporting surface 323, the switching in this state may make the included angle between the hinge mount 31 and the hinge arm 32 smaller. The setting of the ratio between the h1 and h2 in this embodiment may also make the hinge arm 32 not or hardly reduce the angle between the hinge arm 32 and the hinge mount 31 spontaneously due to the own gravity when the third supporting surface 341 elastically abut against the first supporting surface 322.

In some embodiments, referring to FIG. 15, the included angle ω3 between the first supporting surface 322 and the second supporting surface 323 may be an obtuse angle in a section perpendicular to the central axis of the rotating axial 33.

In some embodiments, when the hinge 30 switches from the state of the first supporting surface 322 elastically abuts against the third supporting surface 341 to the state o the second supporting surface 323 elastically abuts against the third supporting surface 341, the smaller the included angle ω3 between the first supporting surface 322 and the second supporting surface 323 is, the larger the relative rotation angle between the hinge mount 31 and the hinge arm 32 may be when the state is switched. That is, when the hinge mount 31 is fixed, the user may need to move the hinge arm 32 to a larger angle to switch the state of the hinge 30, so that the user may be laborious and it may bring inconvenience to the user.

Since the hinge arm 32 has a length, and the first supporting surface 322 is disposed at one end in the length direction of the hinge arm 32, the second supporting surface 323 may be disposed adjacent to the first supporting surface 322 in the width direction of the hinge arm 32. Normally, the first supporting surface 322 and the second supporting surface 323 may be arranged vertically. At this time, when the hinge 30 is switched between the two states, the hinge arm 32 and the hinge mount 31 may need to be moved relative to each other by 90°.

In this embodiment, in the section perpendicular to the central axis of the rotating axial 33, the included angle ω3 between the first supporting surface 322 and the second supporting surface 323 may be an obtuse angle. Thus, the angle needed for the relative movement of the hinge arm 32 and the hinge mount 31 may be smaller than 90° when the hinge 30 switches between the two states, which may facilitate the user.

Specifically, when the hinge 30 in this embodiment is used in this embodiment of the speaker device in the present disclosure, the hinge 30 may be used to connect the ear hook 20 and the speaker assembly 83. In some embodiments, the speaker assembly 83 may be a bone conduction speaker assembly 83. For example, when the hinge 30 is in a second state of the second supporting surface 323 elastically abuts against the third supporting surface 341, the speaker assembly 83 may be in the first relatively fixing position to fit the back of the auricle of the user. Therefore, when the user needs to use the function of the speaker assembly 83 of the speaker device, the user may only need to rotate the speaker assembly 83 by an angle smaller than 90° to fit it to the back of the auricle of the user. In addition, when the hinge 30 is in a first state of the first supporting surface 322 elastically abuts against the third supporting surface 341, the hinge arm 32 and the connected speaker assembly 83 may form an angle. Therefore, the hinge arm 32 and the connected speaker assembly 83 may be located behind an ear of the user and face the direction of the ear of the user when the user wears the speaker device. Therefore, the speaker device may be blocked and fixed, and prevented from falling off the head of the user.

It should be noted that the included angle ω3 between the first supporting surface 322 and the second supporting surface 323 may be set according to actual needs. If the included angle is too large, the included angle between the hinge arm 32 and the hinge mount 31 and the angle between the function member 80 connected to the end of the hinge arm 32 away from the hinge mount 31 and the hinge mount 31 may be smaller. Therefore, the hinge arm 32 and the function member 80 may be too close to the ears of the user to compress the ears when the user wears it, thus reducing the comfort of the user. If the included angle is too small, on the one hand, the needed angle may be too large, which is inconvenient for the user when the user moves the speaker assembly 83 to switch between the first relative position and the second relative position. On the other hand, the included angle between the ear hook 20 and the hinge 30 and the included angle between the ear hook 20 and the speaker assembly 83 may be too small to play a role in blocking and fixing the speaker device. Therefore, the speaker device may be easily dropped from the front side of the head of the user when the user wears the speaker device. Specifically, the included angle between the first supporting surface 322 and the second supporting surface 323 may be set according to the shape of the head of the user.

Specifically, in an application scenario, in the section perpendicular to the central axis of the rotating axial 33, the included angle ω3 between the first supporting surface 322 and the second supporting surface 323 may be between 100° and 120°, and specifically be 100°, 110°, 120°, or the like. The setting of the angle may enable the user to wear the speaker device, and the speaker assembly 83 may not be too close to the ears of the user to cause discomfort to the ears of the user when the speaker assembly 83 is in the first relatively fixing position. It may be unnecessary to rotate the hinge by an excessive angle upon switching between the two relative positions of the speaker assembly 83, which is convenient for users.

In some embodiments, in the process that the third supporting surface 341 is switched from elastically abutting against one of the first supporting surface 322 or the second supporting surface 323 to elastically abutting against the other of the first supporting surface 322 or the second supporting surface 323, the connection 324 between the first supporting surface 322 and the second supporting surface 323 may abut against the third supporting surface 341, and drive the supporting element 34 against the elastic bias of the elastic element 35 to move in the opposite direction. Elastically abutting between the third supporting surface 341 and the first supporting surface 322 before the switching may be taken as an example. At the beginning of the state switching process, while the first supporting surface 322 gradually moves away from the third supporting surface 341, the connection 324 may gradually abut against the third supporting surface 341 and slide from one side of the third supporting surface 341 to the other side of the third supporting surface 341 during the switching process. Finally, the second supporting surface 323 and the third supporting surface 341 may further turn to elastically abut. During the entire state switching process, the connection 324 may abut against and interact with the third supporting surface 341. The shape of the connection 324 may have an effect on the state switching process. For example, if the first supporting surface 322 and the second supporting surface 323 are line-connected, the connection 324 may have a relatively sharp angle. Therefore, when the user pulls the hinge mount 31 and/or the hinge arm 32 to switch the state of the hinge 30, on the one hand, the buffer may be small and the switching may be abrupt upon switching from abutting between the connection 324 and the third supporting surface 341 to abutting between the connection 324 and the first supporting surface 322 and the second supporting surface 323. The user may have a poor feeling when a user pulls the hinge 30. On the other hand, the connection 324 may be relatively sharp, which may cause wear to the third supporting surface 341 during repeated switching processes.

In some embodiments of the present disclosure, in a section perpendicular to the central axis of the rotating axial 33, the connection 324 may have a shape of an arc. As a result, the connection between the first supporting surface 322 and the second supporting surface 323 may be a connection with an arc surface. During the state switching process of the hinge 30, the connection 324 abutting against the third supporting surface 341 may be relatively smooth, so that the user may have a better feeling when *** pulls the hinge 30. The damage to the third supporting surface 341 may be reduced during repeated switching processes.

Specifically, in some embodiments, the connection 324 may have a shape of a circular arc. If a curvature of the arc is different, effects brought by the curvatures may be different. The curvature may be set in combination with actual use situations. The curvature of the arc in this embodiment may be between 5 and 30, and specifically 5, 10, 15, 20, 25, 30, etc., which is not limited here.

It should be noted when the hinge 30 in this embodiment is applied to the speaker device in this embodiment described above, the circular arc shape of the curvature of the connection 324 may enable the user to have a better feeling when the hinge 30 is pulled to drive the speaker to switch between the first relatively fixing position and the second relatively fixing position.

In some embodiments, the third supporting surface 341 may be set so that the external force needed when the third supporting surface 341 is switched from elastically abutting against the first supporting surface 322 to elastically abutting against the second supporting surface 323 may be different from the external force needed when the third supporting surface 341 is switched from elastically abutting against the second supporting surface 323 to elastically abutting against the first supporting surface 322.

It should be noted that, in a specific application scenario, different states of the hinge 30 may correspond to different functions of the hinge 30 or structures connected to the hinge 30. Alternatively, due to a setting problem of the position of the hinge 30, it may not be convenient for the user to exert a force to switch from one state to another. When the user switches the state of the hinge 30, it may be necessary to distinguish the strength of pulling the hinge 30 to facilitate the user to exert the force, or to provide the user with an intuitive experience to distinguish the two hinge states.

Specifically, when the hinge 30 in this embodiment is applied to the speaker device, the state switching of the hinge 30 may drive the speaker assembly 83 to switch between the first relatively fixing position and the second relatively fixing position relative to the ear hook 20. Correspondingly, the two relatively fixing positions may correspond to two situations where the user uses the speaker assembly 83 and where the user does not use the speaker assembly 83. When the user wears the speaker device, difficulties of applying forces to the back of the head to switch between the two states may be different. Therefore, the design of applying different external forces to correspondingly switching between different states may facilitate the convenience of use of the speaker device by the user.

Specifically, in some embodiments, when the third supporting surface 341 is switched from elastically abutting against the first supporting surface 322 to elastically abutting against the second supporting surface 323, the speaker assembly 83 may move from the second relatively fixing position to the first relatively fixing position so as to fit the back of the auricle of the user.

Further, in this embodiment, the third supporting surface 341 may be set such that the external force needed when the third supporting surface 341 is switched from elastically abutting against the first supporting surface 322 to elastically abutting against the second supporting surface 323 may be smaller than the external force needed when the third supporting surface 341 is switched from elastically abutting against the second supporting surface 323 to elastically abutting against the first supporting surface 322.

It should be noted when the speaker assembly 83 is used, the third supporting surface 341 may need to be switched from elastically abutting against the first supporting surface 322 to elastically abutting against the second supporting surface 323 upon being applied to the speaker device. When the speaker assembly 83 is not used, the third supporting surface 341 may need to be switched from elastically abutting against the second supporting surface 323 to elastically abutting against the third supporting surface 341. According to the embodiment, the force needed when the user uses the speaker assembly 83 may be smaller than the force needed when the speaker assembly 83 is not used. Therefore, it may be convenient for the user to use the function of the speaker assembly 83 of the speaker device.

Specifically, referring to FIG. 15 and FIG. 17 as a combination, in an application scenario, when the third supporting surface 341 is switched from elastically abutting against the first supporting surface 322 to elastically abutting against the second supporting surface 323, the connection 324 may initially contact a first position 3411 of the third supporting surface 341. When the third supporting surface 341 is switched from elastically abutting against the second supporting surface 323 to elastically abutting against the first supporting surface 322, the connection 324 may initially contact a second position 3412 of the third supporting surface 341. In some embodiments, in a section perpendicular to the central axis of the rotating axial 33, a distance d1 between the first position 3411 and a contact point of the elastic element 35 and the supporting element 34 along the direction of the elastic bias of the elastic element 35 may be smaller than a distance d2 between the second position 3412 and the contact point in the direction of the elastic bias.

It should be noted when the third supporting surface 341 elastically abuts against the first supporting surface 322, the connection 324 may be located near a position of one end of the third supporting surface 341. When the third supporting surface 341 elastically abuts against the second supporting surface 323, the connection 324 may be located near a position of another end of the third supporting surface 341. Therefore, the first position 3411 and the second position 3412 may be located near the two ends of the third supporting surface 341, respectively. That is, in this embodiment, a distance between the positions of the third supporting surface 341 of the supporting element 34 near the two ends may be different from a distance between the elastic element 35 and the contact point of the supporting element 34 in the direction of the elastic bias of the elastic element 35. The distance corresponding to the second position 3412 may be smaller than the distance corresponding to the first position 3411. At this time, when the third supporting surface 341 is switched from elastically abutting against the first supporting surface 322 to elastically abutting against the second supporting surface 323, the connection 324 may not immediately abut against the third supporting surface 341 and receive a reaction force of the elastic element 35, but gradually abut against the third supporting surface 341 and receive the reaction force of the elastic element 35 during the switching process. When the third supporting surface 341 is switched from elastically abutting against the first supporting surface 322 to elastically abutting against the second supporting surface 323, the connection 324 may initially abut against the third supporting surface 341 and receive the reaction force of elastic element 35, or at least receive the reaction force of elastic element 35 earlier than that the third supporting surface 341 is switched from elastically abutting against the second supporting surface 323 to elastically abutting against the first supporting surface 322. Therefore, in this case, the hinge 30 may need a smaller force to switch from elastically abutting against the first supporting surface 322 to elastically abutting against the second supporting surface 323. Therefore, the force needed to move the speaker assembly 83 may be small when the user uses the speaker assembly 83, which is convenient for the user.

Further, the third supporting surface 341 may include a first sub-supporting surface 3413 and a second sub-supporting surface 3414. In some embodiments, the first position 3411 may be disposed on the first sub-supporting surface 3413. The second position 3412 may be disposed on the second sub-supporting surface 3414. That is, the first sub-supporting surface 3413 and the second sub-supporting surface 3414 may be disposed near the two ends of the third supporting surface 341, respectively.

In some embodiments, the second sub-supporting surface 3414 may be a plane. Specifically, when the first supporting surface 322 or the second supporting surface 323 elastically abuts against the third supporting surface 341, the second sub-supporting surface 3414 may be parallel to the first supporting surface 322 or the second supporting surface 323. The first sub-supporting surface 3413 may be a flat surface or a curved surface, which is not limited here.

Further, the first sub-supporting surface 3413 and the second sub-supporting surface 3414 may not be located in a same plane. The first sub-supporting surface 3413 may be inclined relative to the second sub-supporting surface 3414. An included angle between the two sub-supporting surfaces may be no greater than 10°, for example, no greater than 2°, 4°, 6°, 8°, 10°, etc. Specifically, the first sub-supporting surface 3413 may be disposed in a direction away from the hinge arm 32. Therefore, in the section perpendicular to the central axis of the rotating axial 33, the distance between the first position 3411 and the elastic element 35 and the distance between the first position 3411 and the contact point of the elastic element 35 in the direction of the elastic bias of the elastic element 35 may be smaller than the distance between the second position 3412 and the contact point in the direction of the elastic bias. In some embodiments, when the first sub-supporting surface 3413 is a curved surface and the second sub-supporting surface 3414 is a flat surface, the included angle between the first sub supporting surface 3413 and the second sub-supporting surface 3414 may be an included angle between a plane tangent to the first sub supporting surface 3413 and the second sub supporting surface 3414 at the intersection of the two sub-supporting surfaces.

Figure 18:
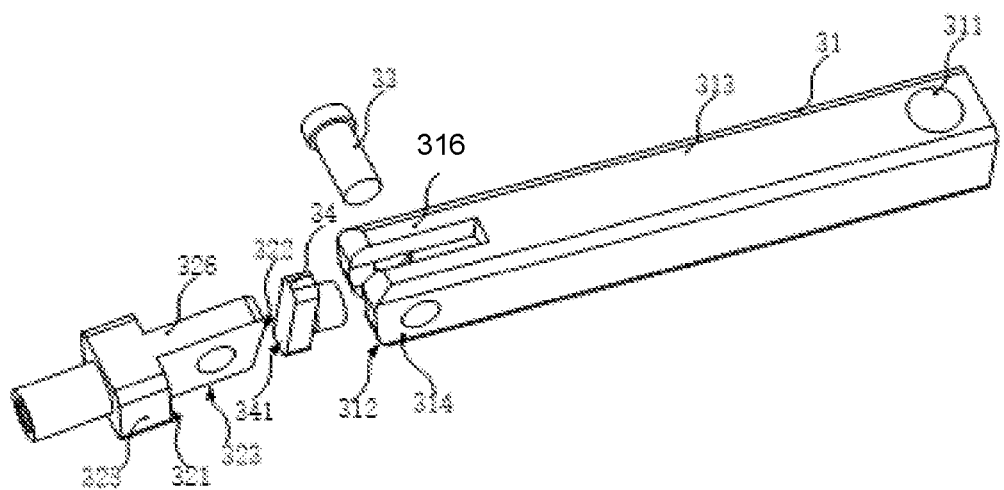
FIG. 18 is an exploded structural diagram illustrating a hinge according to some embodiments of the present disclosure.

Referring to FIG. 18, FIG. 18 is an exploded structural diagram illustrating a hinge according to some embodiments of the present disclosure. In this embodiment, the hinge mount 31 may include a mount body 313, and a first lug 314 and a second lug 316 protruding from the mount body 313 and spaced from each other. The hinge arm 32 may include an arm body 325 and a third lug 326 protruding from the arm body 325. The third lug 326 may be inserted into an interval region between the first lug 314 and the second lug 316, and rotatably connected to the first lug 314 and the second lug 316 via the rotating axial 33. The first supporting surface 322 and the second supporting surface 323 may be disposed on the third lug 326. The supporting element 34 may be at least partially disposed in the interval region and located at the side of the third lug 326 towards the mount body 313. The mount body 313 may be disposed with an accommodation chamber 3121 communicating with the interval region. The elastic element 35 may be disposed inside the accommodation chamber 3121, and allow the supporting element 34 elastically bias towards the third lug 326.

Specifically, corresponding positions of the first lug 314, the second lug 316, and the third lug 326 may be respectively disposed with a first through-hole, a second through-hole, and a third through-hole located in a same axial direction. Inner diameters of the three through-holes may be no smaller than the outer diameter of the rotating axial 33. Thus, when the rotating axial 33 passes through a corresponding through-hole, the hinge mount 31 where the first lug 314 and the second lug 316 are located may be rotatably connected to the hinge arm 32 where the third lug 326 is located.

In some embodiments, both the first supporting surface 322 and the second supporting surface 323 may be disposed on the third lug 326 and parallel to the central axis of the rotating axial 33. Therefore, the first supporting surface 322 and the second supporting surface 323 may enter the interval region between the first lug 314 and the second lug 316 when the hinge arm 32 rotates around the rotating axial 33 relative to the hinge mount 31.

Further, the supporting element 34 may be located between the first lug 314 and the second lug 316 of the mount body 313. The third supporting surface 341 of the supporting element 34 may be disposed toward the third lug 326. In one application scenario, the elastic element 35 may be completely set inside the accommodation chamber 3121, and touch the supporting element 34 at the side towards the interval region between the first lug 314 and the second lug 316. When the elastic element 35 is in a natural state, a region of the supporting element 34 near the elastic element 35 may be at least partially located inside the accommodation chamber 3121. It should be noted that the shape of the portion of the supporting element 34 inside the accommodation chamber 3121 may match the shape of the accommodation chamber 3121. Therefore, the portion of the supporting element 34 located inside the accommodation chamber 3121 may stably slide inside the accommodation chamber 3121 when the supporting element 34 is elastically biased via the elastic element 35.

In an application scenario, a sectional area of the accommodation chamber 3121 may be smaller than a sectional area of the interval region between the first lug 314 and the second lug 316 in a section perpendicular to the length direction of the hinge mount 31. The shape of the supporting element 34 region outside the accommodation chamber 3121 may match the interval region. Therefore, the supporting element 34 may not completely enter the accommodation chamber 3121 upon moving toward a side of the elastic element 35.

Of course, in other embodiments, the sectional shape of the accommodation chamber 3121 may be the same as the interval region between the first lug 314 and the second lug 316 in the section perpendicular to the length direction of the hinge mount 31. At this time, the supporting element 34 may completely enter the accommodation chamber 3121. Therefore, the supporting element 34 may slide inside the entire accommodation chamber 3121 upon receiving a pushing force.

Further, when the hinge 30 in this embodiment is applied to the hinge assembly 122 in this embodiment of the hinge assembly described in present disclosure, the first end surface 312 of the hinge mount 31 may be an end surface of the first lug 314 and the second lug 316 toward the hinge arm 32. The third lug 326 facing a protrusion toward the arm body 325 may be located inside the interval region between the first lug 314 and the second lug 316. Therefore, the first end surface 312 of the first lug 314 and the second lug 316 may be disposed toward the arm body 325. In a section of the central axis direction of the rotating axial 33, the arm body 325 may be further protruded from the third lug 326 to form a second end surface 321 of the first lug 314 and the second lug 316 toward the hinge mount 31.

In this embodiment, during the relative rotation of the hinge arm 32 and the hinge mount 31, a gap between the first end surface 312 of the first lug 314 and the second lug 316 and the second end surface 321 of the arm body 325 may be larger or smaller than the diameter of the connection wire 36. Therefore, the connection wire 36 may not be sandwiched between the first lug 314 and the second lug 316 and the arm body 325 during the relative rotation of the hinge mount 31 and the hinge arm 32, thereby reducing the damage of the connection wire 36 by the hinge 30.

In an application scenario, the gap between the second end surface 321 of the first lug 314 and the second lug 316 and the first end surface 312 of the arm body 325 may be kept much larger or smaller than the diameter of the connection wire 36 during the relative rotation of the hinge arm 32 and the hinge mount 31, thereby further reducing the damage of the connection wire 36 by the hinge 30.

It should be noted that, in this embodiment, the gap between the first end surface 312 and the second end surface 321 may be a gap with a uniform width, thereby satisfying the above condition of being greater than or smaller than the diameter of the connection wire 36. Alternatively, in another embodiment, only gaps of positions at both end surfaces close to the connection wire 36 may be greater than or smaller than the diameter of the connection wire 36. Gaps of other positions at both end surfaces may not need to satisfy the condition.

Specifically, in an application scenario, in a section perpendicular to the central axis of the rotating axial 33, at least one of end surfaces of the first lug 314 and the second lug 316 towards the hinge arm 32 and an end surface of the arm body 325 towards the hinge mount 31 may be in a chamfer setting. Therefore, during the relative rotation of the hinge arm 32 and the hinge mount 31, the positions close to the connection wire 36 may be kept larger than the diameter of the connection wire 36.

In some embodiments, the chamfer setting may be filleted, or directly chamfered.

In the application scenario, it may be only necessary to chamfer at least one of the end surface of the first lug 314 and the second lug 316 near the connection wire 36 towards the hinge arm 32 and the end surface of the arm body 325 towards the hinge mount 31. Therefore, during the relative rotation of the hinge arm 32 and the hinge mount 31, the connection wire 36 may not be clamped into the gap between the two end surfaces.

The hinge in this embodiments of the present disclosure may be applied to the embodiments of the hinge assembly in the present disclosure, and not be limited herein. In other embodiments, it may also be applied to other hinge assemblies, or a direct connection of two components that need to be rotatably connected.

It should be noted that the above descriptions of the hinge assembly of the speaker device are merely a specific example, and should not be regarded as the only feasible implementation solution. Obviously, for those skilled in the art, after understanding the basic principle of the hinge assembly of speaker device, it may be possible to make various modifications and changes in the form and details of the specific method and operation of implementing the hinge assembly of the speaker device without departing from these principles, but these modifications and changes are still within the scope described above. For example, the hinge assembly of the speaker device may also have a third fixing position. When a user is not using the speaker device, the hinge assembly may be adjusted to the third fixing position, which is convenient for keeping or storing the speaker device. All such variations may be within the protection scope of the present disclosure.

In some embodiments, as shown in FIG. 1, the speaker assembly 83 may be operably connected to the ear hook 20. In some embodiments, the speaker assembly 83 may include, but is not limited to, earphones, MP3 players, hearing aids, and the like.

In an application scenario, the bone conduction speaker component in this embodiment is an example of the speaker assembly 83 for illustrative purposes only. The following may further describe the fitting position of the speaker assembly 83 on the human body based on the bone conduction speaker component. It should be noted that without violating the principle, the following descriptions may also be applied to the air conduction speaker component.

In some embodiments, the position of the speaker assembly 83 in the MP3 player may not be fixed, and the speaker assembly 83 may fit different parts of the user's cheek (for example, in front of the ear, behind the ear, etc.), so that the user may feel different sound quality. Users can adjust the sound quality according to their own preferences, and it is also convenient for users with different head sizes. The speaker device may be fixed on the human ear through the ear hook 20, and the speaker assembly 83 may be located in front of the ear. In some embodiments, the ear hook 20 may be elastically deformable, and the ear hook 20 may be bent to change the fitting position of the speaker assembly 83 on the human body. In some embodiments, the connection end of the ear hook 20 with the speaker assembly 83 may be set according to the position that the user is accustomed to. For example, if the user is accustomed to wearing the speaker assembly 83 behind the ear, the connection end of the ear hook 20 may be set behind the ear under the premise that the fixing function of the ear hook 20 is maintained. More descriptions about the snap connection between the ear hook 20 and the speaker assembly 83 may be found elsewhere in this application. It should be noted that the connection between the ear hook 20 and the speaker assembly 83 is not limited to the above-mentioned snap connection. For example, the ear hook 20 and the speaker assembly 83 may also be connected by a hinge. More descriptions about the hinge may be found elsewhere in this application.

In some embodiments, the speaker assembly 83 may fit on any position of the user's head, for example, the top of the head, forehead, cheeks, hips, auricles, back of auricles, or the like. In some embodiments, the way of fitting the speaker assembly 83 to the head may include surface fitting or point fitting. The fitting surface may be provided with a gradient structure which refers to the area where the height of the contact surface changes. The gradient structure may include a convex/concave or stepped structure on an outer side of the contact surface (the side that is attached to the user), or a convex/concave or stepped structure on an inner side of the contact surface (the side facing away from the user).

It should be noted that the above descriptions of the hinge assembly of the speaker device are merely a specific example, and should not be regarded as the only feasible implementation solution. Obviously, for those skilled in the art, after understanding the basic principle of the hinge assembly of speaker device, it may be possible to make various modifications and changes in the form and details of the specific method and operation of implementing the hinge assembly of the speaker device without departing from these principles, but these modifications and changes are still within the scope described above. For example, the shape of the ear hook 20 may be adjusted based on the position where the speaker assembly 83 fits on the user's head. All such variations may be within the protection scope of the present disclosure.

Under normal circumstances, the sound quality of the speaker device may be affected by various factors, such as the physical properties of the components of the speaker device, the vibration transmission relationship among the components, the vibration transmission relationship between the speaker device and the outside world, the efficiency of the vibration transmission system in transmitting vibration, or the like. The components of the speaker device may include components (such as but not limited to earphone cores) that generate vibrations, components (such as but not limited to ear hooks 20) that fix the speaker device, and components (such as but not limited to panels on the core housing, vibration transmission layer, etc.) that transmit vibrations. The vibration transmission relationship among the components and the vibration transmission relationship between the loudspeaker and the outside are determined by the contact mode (such as but not limited to clamping force, contact area, contact shape, etc.) between the speaker device and the user.

Figure 19:
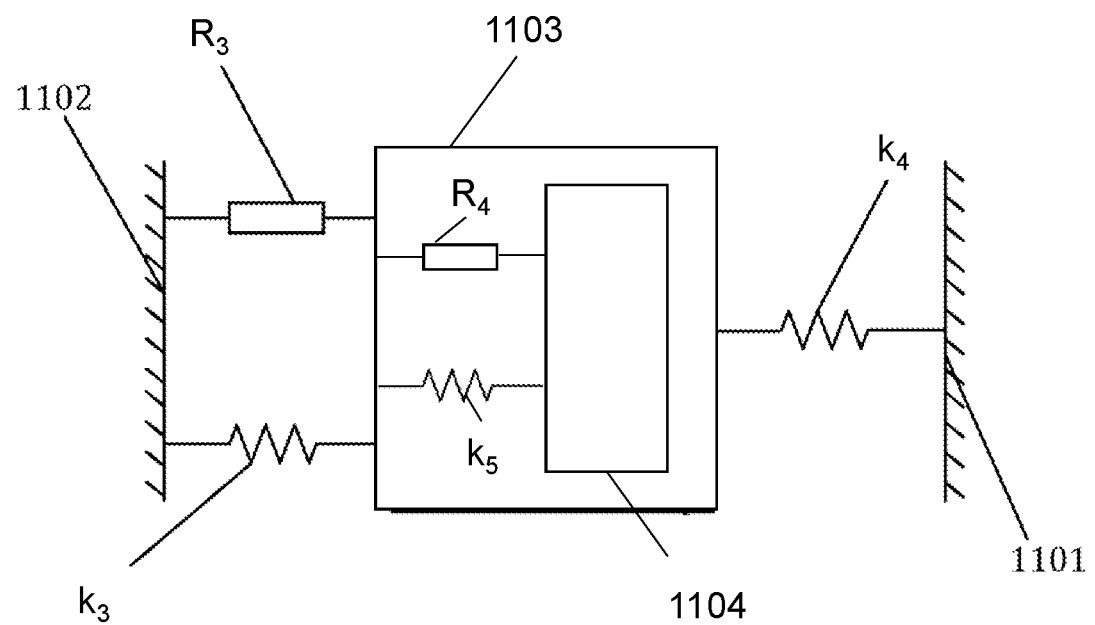
FIG. 19 is a schematic diagram illustrating an equivalent model of a vibration generation and transmission system of an exemplary speaker device according to some embodiments of the present disclosure.

For illustration purposes, the following descriptions may further illustrate the relationship between sound quality and each component of the speaker device based on a speaker device. It should be understood that without violating the principle, the embodiments illustrated below may also be applied to an air conductive speaker device or a bone conductive speaker device. FIG. 19 is a schematic diagram illustrating an equivalent model of a vibration generation and transmission system of an exemplary speaker device according to some embodiments of the present disclosure. As shown in FIG. 19, the vibration generation and transmission system may include a fixed end 1101, a sensing terminal 1102, a vibration unit 1103, and an earphone core 1104. In some embodiments, the fixed end 1101 may be connected to the vibration unit 1103 through a transfer relationship K1 ($k_4$ in FIG. 19). The sensing terminal 1102 may be connected to the vibration unit 1103 through a transfer relationship K2 ($k_3$ in FIG. 19). The vibration unit 1103 may be connected to the earphone core 1104 through a transfer relationship K3 ($k_4$ and $k_5$ In FIG. 19).

The vibration unit mentioned herein is the core housing 82, and the transfer relations K1, K2, and K3 are the illustrations of the functional relations among the corresponding components in the MP3 player equivalent system (more detailed descriptions may be illustrated below). The vibration equation of the equivalent system may be represented by:

$$m_3 x_3'' + R_3 x_3' - R_4 x_4' + (k_3+k_4)x_3 + k_5(x_3-x_4) = f_3 \quad (1)$$

$$m_4 x_4'' + R_4 x_4'' - k_5(x_3-x_4) = f_4 \quad (2)$$

where $m_3$ represents an equivalent mass of the vibration unit 1103; $m_4$ represents an equivalent mass of the earphone core 1104; $x_3$ represents an equivalent displacement of the vibration unit 1103; $x_4$ represents an equivalent displacement of the earphone core 1104; $k_3$ represents an equivalent elastic coefficient between the sensing terminal 1102 and the vibration unit 1103; $k_4$ represents an equivalent elastic coefficient between the fixed end 1101 and the vibration unit 1103; $k_5$ represents an equivalent elastic coefficient between the earphone core 1104 and the vibration unit 1103; $R_3$ represents an equivalent damping between the sensing terminal 1102 and the vibration unit 1103; $R_4$ represents an equivalent damping between the earphone core 1104 and the vibration unit 1103; and $f_3$ and $f_4$ represent interaction forces between the vibration unit 1103 and the earphone core 1104, respectively. The equivalent amplitude $A_3$ of the vibration unit 1103 in the system may be represented by:

$$A_3 = -\frac{m_4\omega^2}{\left(m_3\omega^2 + j\omega R_3 - (k_3+k_4+k_5)\right)} \cdot f_0, \quad (3)$$
$$\left(m_4\omega^2 + j\omega R_4 - k_5\right) - k_5(k_5 - j\omega R_4)$$

where $f_0$ represents a unit driving force; and ω denotes a vibration frequency. Therefore, the factors that may affect the frequency response of the speaker device may include the vibration generation portions (e.g., the vibration unit 1103, the earphone core 1104, the housing, and the interconnection ways thereof, such as $m_3$, $m_4$, $k_5$, $R_4$, etc., in Equation (3)), and vibration transmission portions (e.g., the way of contacting the skin, the property of the ear hook, such as $k_3$, $k_4$, $R_3$, etc., in Equation (3)). The frequency response and the sound quality of the speaker device may be changed by changing the structure of the various components of the speaker device and the parameters of the connections between the various components. For example, changing the magnitude of the clamping force is equivalent to changing $k_4$, changing the bonding way of glue is equivalent to changing $R_4$ and $k_5$, and changing the hardness, elasticity, and damping of the materials is equivalent to changing $k_3$ and $R_3$.

In a specific embodiment, the fixed end 1101 may be a relatively fixed point or a relatively fixed area (e.g., the top of an ear hook) of the speaker device during the vibration process. The point or area may be regarded as the fixed end of the speaker device during the vibration process. The fixed end may be composed of specific components, or may be a position determined according to the structure of the speaker device. For example, the speaker device may be hung, glued, or adsorbed near the human ear by a specific device, and the structure and shape of the speaker device may also be designed to make the speaker assembly 83 stick to the human skin.

The sensing terminal 1102 may include an auditory system for the human body to receive sound signals. The vibration unit 1103 may be a part of the speaker device used to protect, support, and connect the earphone core 1104. The vibration unit 1103 may include a part directly or indirectly touching the user, such as a vibration transmission layer or panel that transmits vibration to the user (e.g., the side of the core housing close to the human body), as well as the housing that protects and supports other vibration generating components, or the like.

The transmission relationship K1 may connect the fixed end 1101 and the vibration unit 1103, which indicates the vibration transmission relationship between the vibration generation components of the speaker device and the fixed end. K1 may be determined based on the shape and structure of the speaker device. For example, the speaker device may be fixed to the head of the human in the form of a U-shaped earphone rack/earphone strap, and may also be installed on devices such as a helmet, a fire mask, or other special-purpose masks, speaker device, etc. The different shapes and structures of the speaker device may affect the vibration transmission relationship K1. Further, the structure of the speaker device may also include physical properties such as the material and quantity of different components of the speaker device. The transmission relationship K2 may connect the sensing terminal 402 and the vibration unit 1103.

In some embodiments, K2 may be determined based on the composition of the transmission system. The transmission system may include transmitting sound vibration to the auditory system through the user's tissue (also referred to as human tissue). For example, when the sound is transmitted to the auditory system through the skin, the subcutaneous tissue, bones, etc., the physical properties of different human tissues and their interconnections may affect K2. Further, the vibration unit 1103 may be in contact with the human tissue. In different embodiments, the contact surface on the vibration unit may be a side of the vibration transmission layer or the panel. The surface shape, size of the contact surface, and the interaction force of the contact surface with the human tissue may affect the transmission relationship K2.

In some embodiments, the transmission relationship K3 between the vibration unit 1103 and the earphone core 1104 may be determined by internal connection properties of the vibration generation components of the speaker device. The connection mode (e.g., rigid or elastic connection mode) of the earphone core 1104 and the vibration unit 1103, or the relative position of the connector between the earphone core 1104 and the vibration unit 1103 may change the transmission efficiency of the earphone core 1104 to transmit vibration to the vibration unit 1103, especially the transmission efficiency of the panel, which affects the transmission relationship K3.

During the use of the speaker device, the generation and transmission process of the sound may affect the sound quality felt by the human (or the user). For example, the fixed end 1101, the sensing terminal 1102, the vibration unit 1103, the earphone core 1104, the transmission relationships K1, K2, and K3, etc., may affect the sound quality of the speaker device. It should be noted that K1, K2, and K3 are only a representation of the connection ways of different components or systems during the vibration transmission process, which may include, but not limited to physical connection ways, force transmission ways, sound transmission efficiency, etc.

Figure 20:
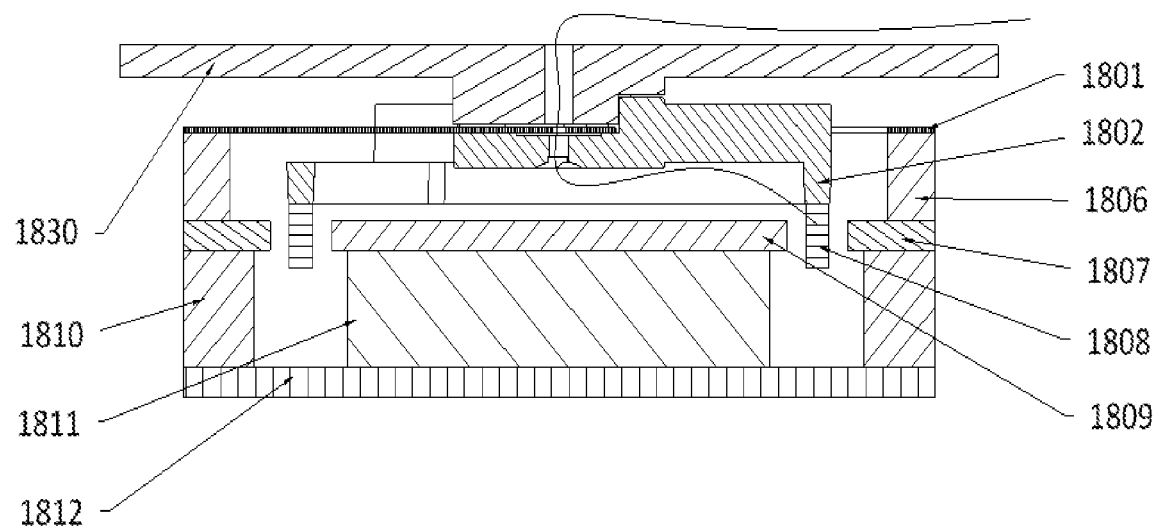
FIG. 20 is a structure diagram illustrating a composite vibration assembly of an exemplary speaker device according to some embodiments of the present disclosure.
Figure 21:
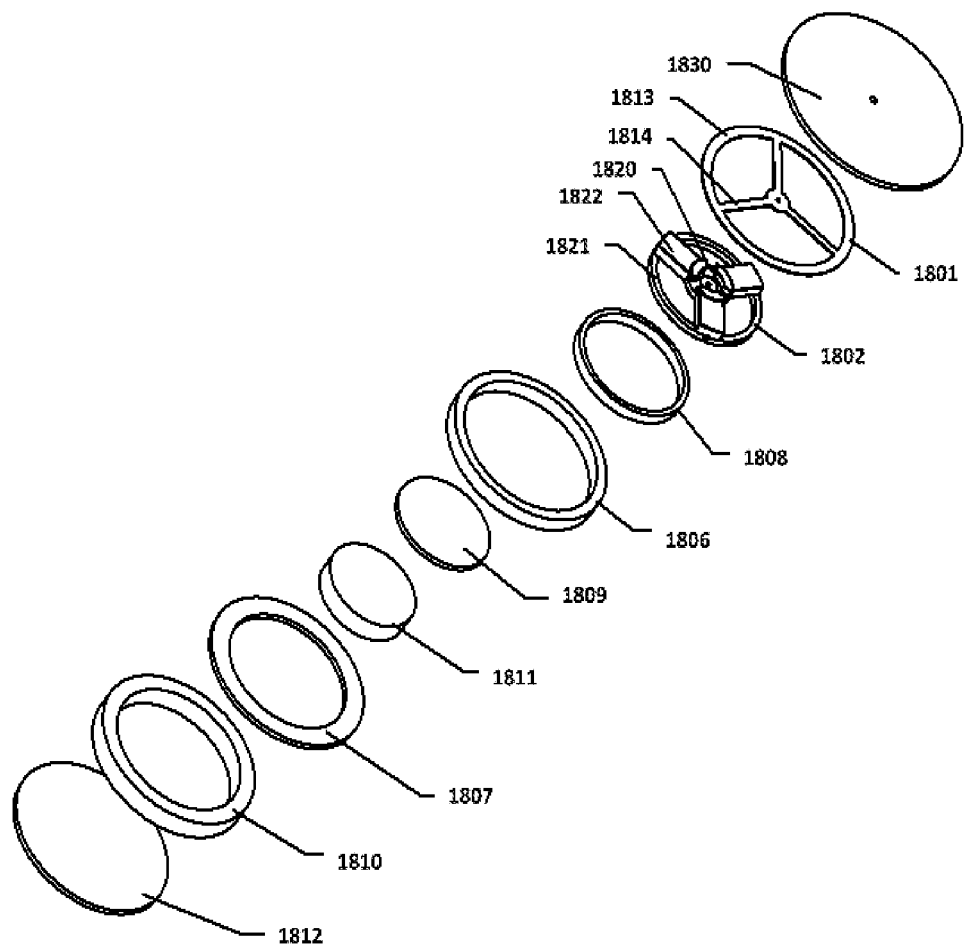
FIG. 21 is a structure diagram illustrating an exploded view of a speaker device and a composite vibration assembly thereof according to some embodiments of the present disclosure.

FIG. 20 is a structure diagram illustrating a composite vibration assembly of an exemplary speaker device according to some embodiments of the present disclosure. FIG. 21 is a structure diagram illustrating an exploded view of a speaker device and a composite vibration assembly thereof according to some embodiments of the present disclosure.

In some embodiments, the speaker device may include the composite vibration assembly. In some embodiments, the composite vibration assembly may be part of an earphone core. Embodiments of the composite vibration assembly on the speaker device are shown in FIG. 20 and FIG. 21, the composite vibration assembly may be composed of a vibration conductive plate 1801 and a vibration plate 1802. The vibration conductive plate 1801 may be disposed as a first annular body 1813. Three first support rods 1814 that are converged toward a center may be disposed in the first annular body 1813. The position of the converged center may be fixed to a center of the vibration plate 1802. The center of the vibration plate 1802 may be a groove 1820 that matches the converged center and the first support rods. The vibration plate 1802 may be disposed with a second annular body 1821 having a radius different from that of the vibration conductive plate 1801, and three second support rods 1822 having different thicknesses from the first support rods 1814. The first support rods 1814 and the second support rods 1822 may be staggered, and may have an angle of 60°.

Figure 22:
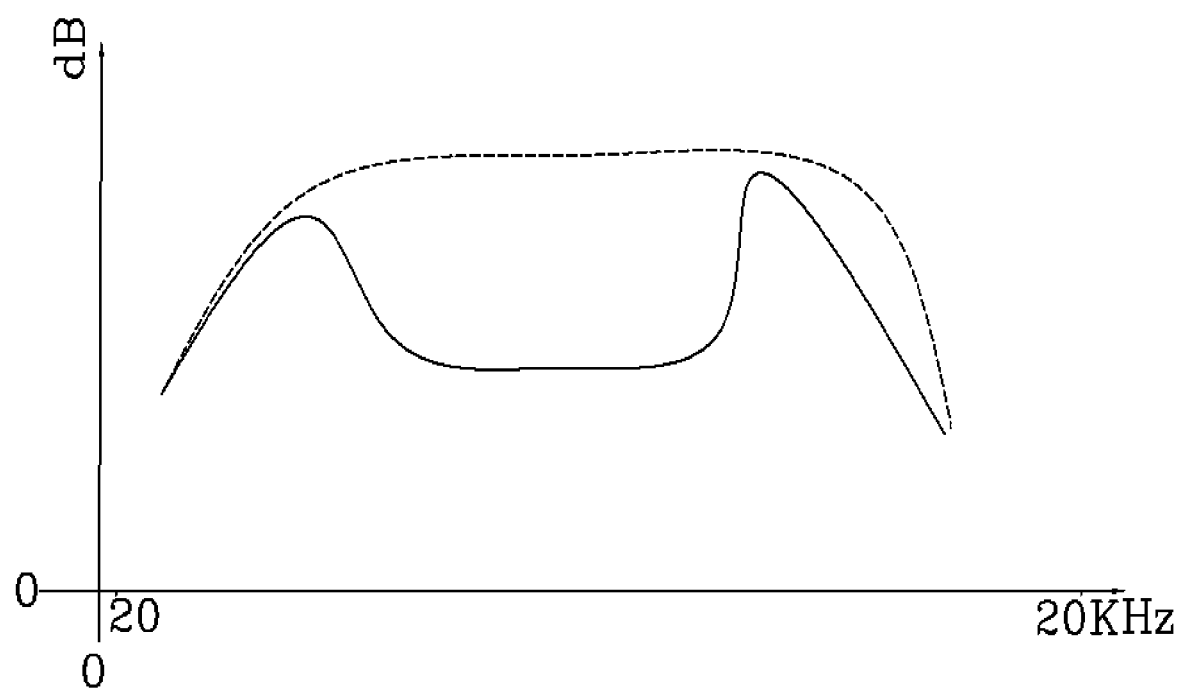
FIG. 22 is a frequency response curve of a speaker device according to some embodiments of the present disclosure.

The first and second support rods may be straight rods or have other shapes that meet specific requirements. The count of the support rods may be more than two, which are symmetrically or asymmetrically arranged to meet the requirements of economic and practical effects. The vibration conductive plate 1801 may have a small thickness and can increase elastic force. The vibration conductive plate 1801 may be stuck in the center of the groove 1820 of the vibration plate 1802. A voice coil 1808 may be attached to a lower side of the second annular body 1821 of the vibration plate 1802. The composite vibration assembly may include a bottom plate 1812 on which an annular magnet 1810 is disposed. An inner magnet 1811 may be concentrically disposed in the annular magnet 1810. An inner magnetic plate 1809 may be disposed on the top of the inner magnet 1811, and an annular magnetic plate 1807 may be disposed on the annular magnet 1810. A gasket 1806 may be fixedly disposed above the annular magnetic plate 1807. The first annular body 1813 of the vibration conductive plate 1801 may be fixedly connected to the gasket 1806. The composite vibration assembly may be connected to outside component(s) through a panel 1830. The panel 1830 may be fixedly connected to the position of the converged center of the vibration transmission plate 1801, and may be fixed to the center of the vibration transmission plate 1801 and the vibration plate 1802. Using the composite vibration assembly composed of the vibration plate and the vibration conductive plate, a frequency response curve as shown in FIG. 22 can be obtained, and two resonance peaks may be generated. By adjusting parameters such as the size and material of the two components (e.g., the vibration conductive plate and the vibration plate) may make the resonance peaks appear in different positions. For example, a low-frequency resonance peak appears at a position at a lower frequency, and/or a high-frequency resonance peak appears at a position at a higher frequency. In some embodiments, the stiffness coefficient of the vibration plate may be greater than the stiffness coefficient of the vibration conductive plate. The vibration plate may generate the high-frequency resonance peak of the two resonance peaks, and the vibration conductive plate may generate the low-frequency resonance peak of the two resonance peaks. The resonance peaks may be or may not be within the frequency range of sound perceivable by human ears. In some embodiments, the resonance peaks may not be within the frequency range of sound perceivable by human ears. In some embodiments, one resonance peak may be within the frequency range of sound perceivable by human ears, and the other resonance peak may not be within the frequency range of sound perceivable by human ears. In some embodiments, both the resonance peaks may be within the frequency range of sound perceivable by human ears. In this way, the resonance response ranges of the speaker device may be widened, and the sound quality satisfying certain conditions may be obtained. It should be noted that, in actual use, a plurality of vibration conductive plates and vibration plates may be provided to form a multilayer vibration structure that corresponds to different frequency response ranges, which may realize high-quality vibration in the full range and frequency, or make the frequency response curve meet the requirements in some specific frequency ranges. For example, in a bone conduction hearing aid, in order to meet normal hearing requirements, an earphone core composed of one or more vibration plates and vibration conductive plates with resonance frequencies in a range of 100 Hz-10000 Hz may be selected. The descriptions of the composite vibration assembly composed of the vibration plate and the vibration conductive plate may be found in, e.g., Chinese Patent Application No. 201110438083.9 entitled "Bone conduction speaker and composite vibration assembly thereof" filed on Dec. 23, 2011, the contents of which are hereby incorporated by reference.

Figure 23:
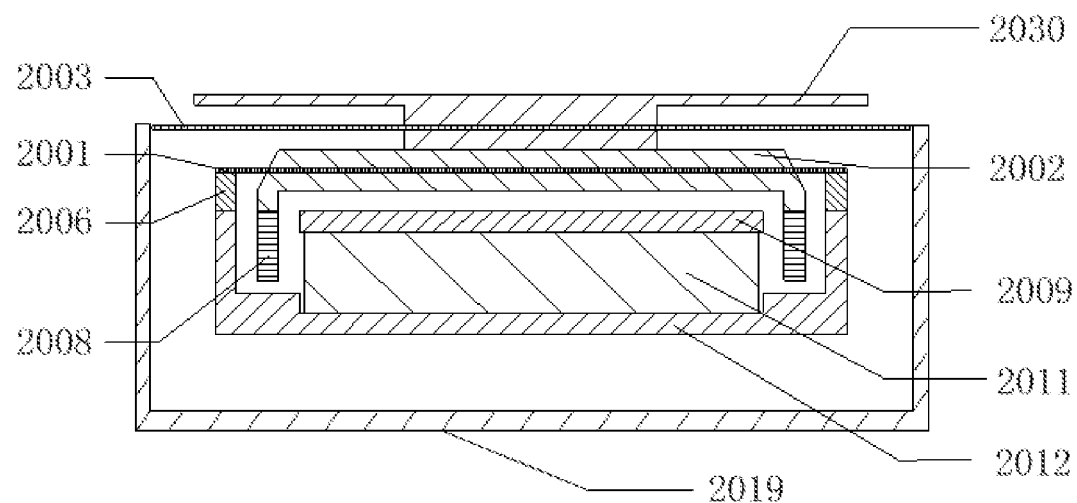
FIG. 23 is a structure diagram illustrating a sectional view of a speaker device and a composite vibration assembly of the speaker device according to some embodiments of the present disclosure.
Figure 24:
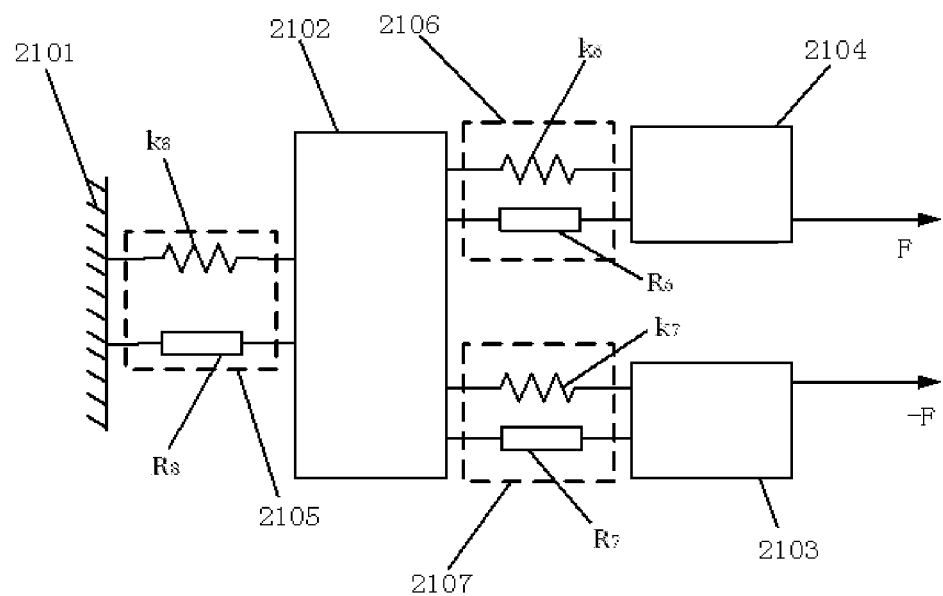
FIG. 24 is a diagram illustrating an equivalent model of a vibration generating component of a speaker device according to some embodiments of the present disclosure.

FIG. 23 is a structure diagram illustrating a sectional view of a speaker device and a composite vibration assembly of the speaker device according to some embodiments of the present disclosure. FIG. 24 is a diagram illustrating an equivalent model of a vibration generating component of a speaker device according to some embodiments of the present disclosure.

As shown in FIG. 23, the composite vibration assembly may include a vibration plate 2002, a first vibration conductive plate 2003, and a second vibration conductive plate 2001. The first vibration conductive plate 2003 may fix the vibration plate 2002 and the second vibration conductive plate 2001 on a core housing 8219 (i.e., the core housing 82). The composite vibration assembly composed of the vibration plate 2002, the first vibration conductive plate 2003, and the second vibration conductive plate 2001 may produce at least two resonance peaks. A flatter frequency response curve may be generated within an audible range of the auditory system, thereby improving the sound quality of a speaker device.

Figure 25:
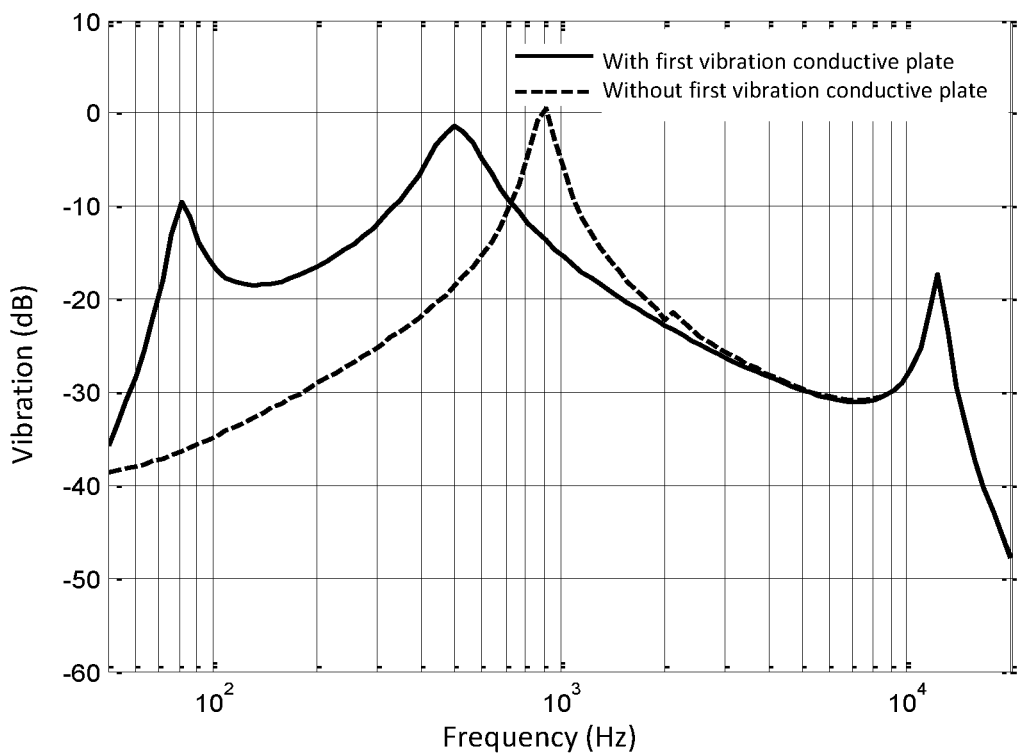
FIG. 25 is a vibration response curve of a speaker device according to some embodiments of the present disclosure.

A count of resonance peaks generated by the triple composite vibration system of the first vibration conductive plate 2003 may be more than the count of resonance peaks generated by the composite vibration system without the first vibration conductive plate 2003. In some embodiments, the triple composite vibration system may produce at least three resonance peaks. In some embodiments, at least one resonance peak may not be within the frequency range of sound perceivable by human ears. In some embodiments, all the resonance peaks may be within the frequency range perceivable by human ears. In some embodiments, all the resonance peaks may be within the frequency range perceivable by human ears, and their frequencies may not be greater than 18000 Hz. In some embodiments, all the resonance peaks may be within the frequency range of sound perceivable by human ears, and their frequencies may be 100 Hz-15000 Hz. In some embodiments, all the resonance peaks may be within the frequency range of sound perceivable by human ears, and their frequencies may be 200 Hz-12000 Hz. In some embodiments, all the resonance peaks may be within the frequency range of sound perceivable by human ears, and their frequencies may be 500 Hz and 11000 Hz. In one embodiment, by using a triple composite vibration system composed of a vibration plate, a first vibration conductive plate, and a second vibration conductive plate, a vibration response curve as shown in FIG. 25 may be obtained, which generates three distinct resonance peaks, and further greatly improves the sensitivity of the speaker device in the low frequency range (about 600 Hz) and improves the sound quality.

By changing parameters such as the size and material of the first vibration conductive plate, the position of the resonance peak may be moved to obtain a more ideal frequency response. In some embodiments, the first vibration conductive plate may include an elastic plate. The elasticity may be determined by various aspects such as the material, thickness, and structure of the first vibration conductive plate. The material of the first vibration conductive plate may include, but not limited to, steel (such as but not limited to stainless steel, carbon steel, etc.), light alloy (such as but not limited to aluminum alloy, beryllium copper, magnesium alloy, titanium alloy, etc.), and plastic (such as but not limited to high molecular polyethylene, blown nylon, engineering plastics, etc.), or other single or composite materials capable of achieving the same or similar performance. The composite materials may include, but not limited to, reinforcement materials such as glass fiber, carbon fiber, boron fiber, graphite fiber, graphene fiber, silicon carbide fiber, or aramid fiber; compounds of organic and/or inorganic materials such as glass fiber reinforced unsaturated polyester, various types of glass steel composed of epoxy resin or phenolic resin. The thickness of the first vibration conductive plate may be not smaller than 0.005 mm. In some embodiments, the thickness may be 0.005 mm-3 mm. In some embodiments, the thickness may be 0.01 mm-2 mm. In some embodiments, the thickness may be 0.01 mm-1 mm. In some embodiments, the thickness may be 0.02 mm-0.5 mm. The structure of the first vibration conductive plate may be disposed as a ring shape. In some embodiments, the first vibration conductive plate may include at least one ring. In some embodiments, the first vibration conductive plate may include at least two rings, such as a concentric ring, a non-concentric ring, etc. The rings may be connected by at least two support rods that radiate from the outer ring to the center of the inner ring. In some embodiments, the first vibration conductive plate may include at least one elliptical ring. In some embodiments, the first vibration conductive plate may include at least two elliptical rings. Different elliptical rings may have different radii of curvature. In some embodiments, the first vibration conductive plate may include at least one square ring. The structure of the first vibration conductive plate may be disposed as a sheet shape. In some embodiments, a hollow pattern may be disposed on the first vibration conduction plate, and the area of the hollow pattern may not be smaller than the area without the hollow pattern. The materials, thicknesses, and structures described above may be combined into different vibration conductive plates. For example, a ring-shaped vibration conductive plate may have different thickness distributions. In some embodiments, the thickness of the support rod(s) may be equal to the thickness of the ring(s). In some embodiments, the thickness of the support rod(s) may be greater than the thickness of the ring(s). In some embodiments, the thickness of the inner ring may be greater than the thickness of the outer ring.

Figure 26:
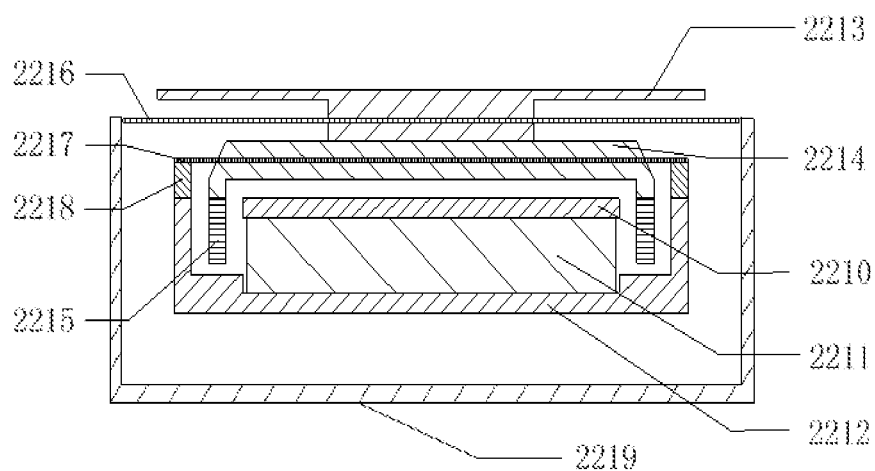
FIG. 26 is a diagram illustrating a sectional view of a vibration generating component of a speaker device according to some embodiments of the present disclosure.

Contents disclosed in the present disclosure also discloses specific embodiments about the vibration plate, the first vibration conductive plate, and the second vibration conductive plate for the content set forth above. FIG. 26 is a diagram illustrating a sectional view of a vibration generating component of a speaker device according to some embodiments of the present disclosure. As shown in FIG. 26, the earphone core may include a magnetic circuit assembly composed of a magnetic conduction plate 2210, a magnet 2211, and a magnetic conductive material 2212, a vibration plate 2214, a coil 2215, a first vibration conductive plate 2216, and a second vibration conductive plate 2217. The panel 2213 may protrude from the housing 2219 and be bonded with the vibrating board 2214 by glue. The first vibration conductive plate 2216 may connect and fix the earphone core to the housing 2219 to form a suspension structure.

In some embodiments, the core housing and the housing in the above embodiments may have the same structure, and both refer to a structure of an outer housing that accommodates the speaker device. In some embodiments, the panels in the above embodiments may have the same structure, and refer to a part of the outer housing of the speaker device that is in contact with the human body.

Figure 27:
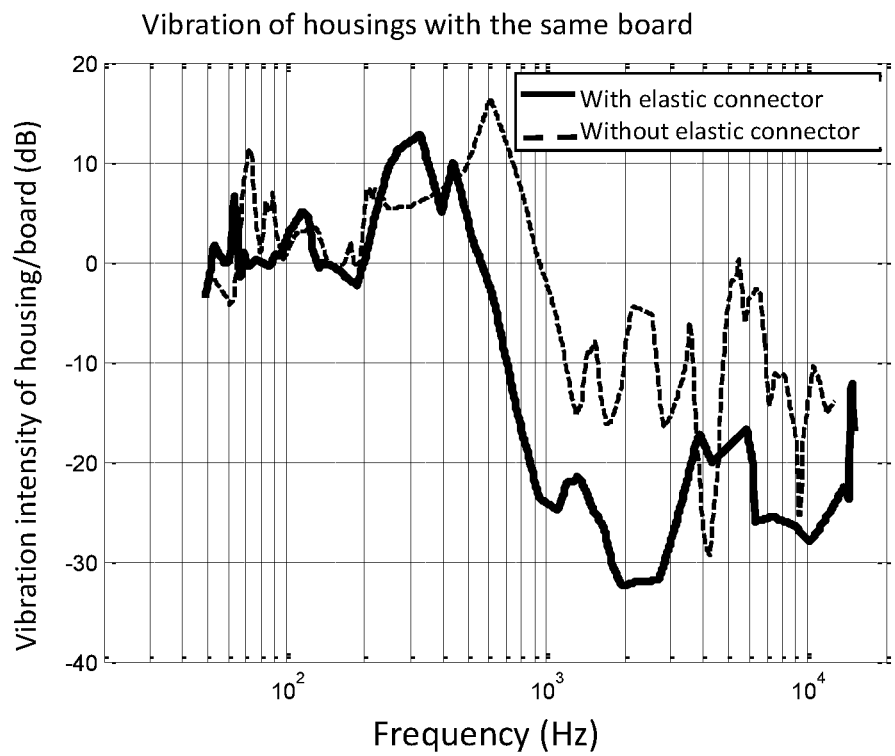
FIG. 27 is a schematic diagram illustrating vibration response curves of a vibration generating component of a speaker device according to some embodiments of the present disclosure.
Figure 28:
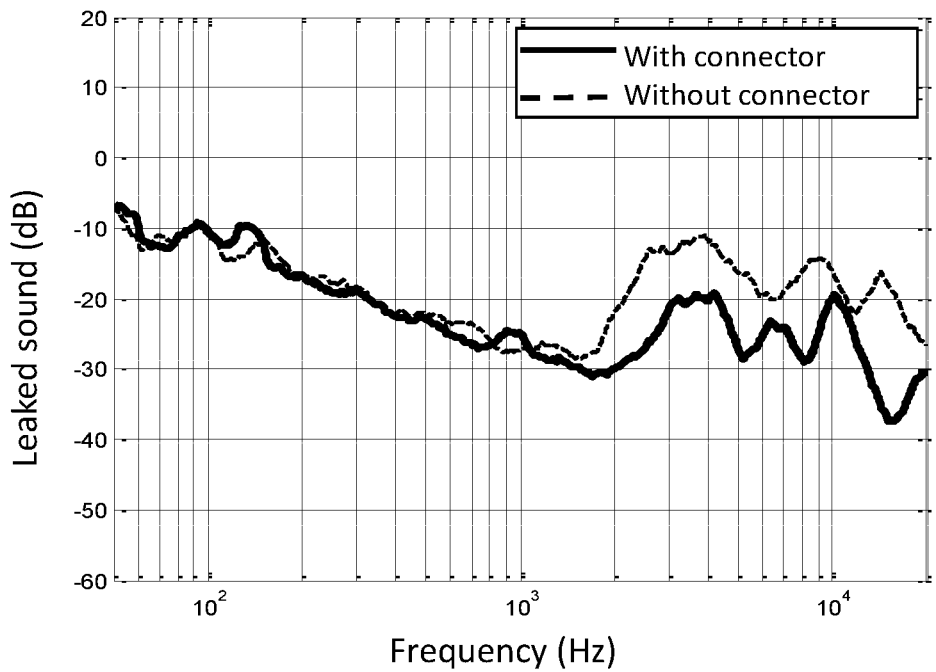
FIG. 28 is a schematic diagram illustrating a comparison of a leaked sound in a case of including a first vibration conductive plate and in a case of excluding the first vibration conductive plate according to some embodiments of the present disclosure.

During the working of a speaker device, a triple vibration system composed of the vibration plate 2214, the first vibration conductive plate 2216, and the second vibration conductive plate 2217 may produce a flatter frequency response curve, thereby improving the sound quality of the speaker device. The first vibration conductive plate 2216 may elastically connect the earphone core to the housing 2219, which may reduce the vibration transmitted by the earphone core to the housing, thereby effectively reducing a leaked sound caused by the vibration of the housing, and reducing the influence of the vibration of the housing on the sound quality of the speaker device. FIG. 27 is a schematic diagram illustrating vibration response curves of a vibration generating component of a speaker device according to some embodiments of the present disclosure. As used herein, a thick line shows the frequency response of the vibration generating component when the first vibration conductive plate 2216 is used, and a small line shows the frequency response of the vibration generating component when the first vibration conductive plate 2216 is not used. It may be seen that the vibration of the housing of the speaker device without the first vibration conductive plate 2216 is significantly greater than the vibration of the housing of the speaker device with the first vibration conductive plate 2216 in a frequency range above 500 Hz. FIG. 28 is a schematic diagram illustrating a comparison of a leaked sound in a case of including the first vibration conductive plate 2216 and in a case of excluding the first vibration conductive plate 2216 according to some embodiments of the present disclosure. The leaked sound of the speaker device having the first vibration conductive plate 2216 in the intermediate frequency (e.g., about 1000 Hz) is smaller than the leaked sound of the speaker device without the first vibration conductive plate 2216 in the corresponding frequency range. In some embodiments, when the first vibration conductive plate is used between the panel and the housing, the vibration of the housing may be effectively reduced, thereby reducing the leaked sound. In some embodiments, the first vibration conductive plate may be a material including stainless steel, beryllium copper, plastic, polycarbonate materials, etc. The thickness of the first vibration conductive plate may be in the range of 0.01 mm-1 mm.

Figure 29A:
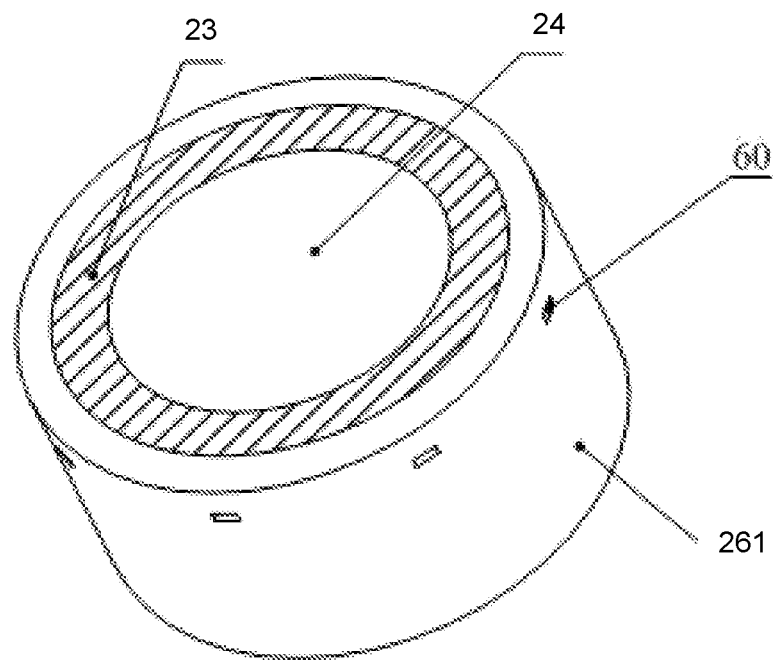
FIG. 29A is a schematic diagram illustrating a structure of a vibration generating portion of a speaker device according to some embodiments of the present disclosure.
Figure 29B:
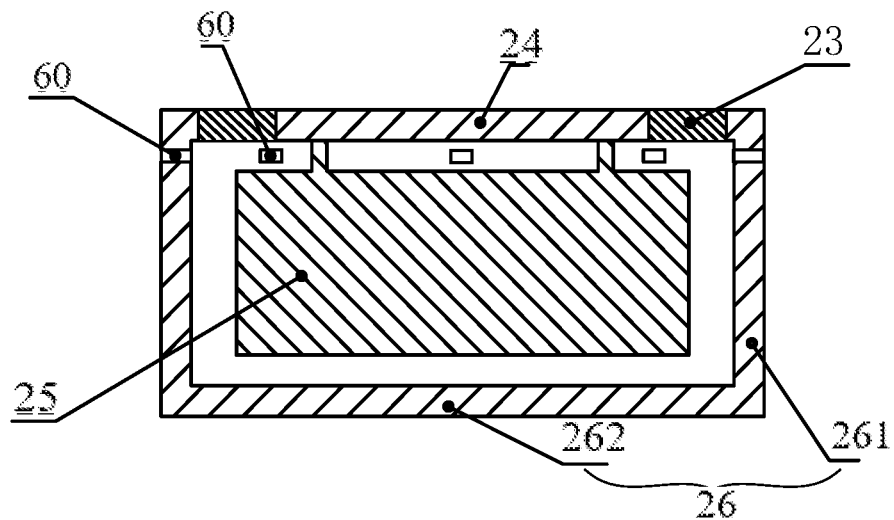
FIG. 29B is a longitudinal section view illustrating a vibration generating portion of a speaker device according to some embodiments of the present disclosure.

FIG. 29A is a schematic diagram illustrating a structure of a vibration generating portion of a speaker device according to some embodiments of the present disclosure. FIG. 29B is a longitudinal section view illustrating a vibration generating portion of a speaker device according to some embodiments of the present disclosure. In this embodiment, the speaker device may include a housing 26 (i.e., the core housing 82), a panel 24, and an earphone core 25. In some embodiments, the housing 26 may be consistent with the core housing 82 mentioned above, both of which refer to a housing of a speaker module. The earphone core 25 may include the composite vibration assembly described in the foregoing embodiments. Similarly, the panel 24 may follow this principle. In some embodiments, the earphone core 25 may be accommodated inside the housing 26 and generate a vibration. The vibration of the earphone core 25 may cause the housing 26 to vibrate, thereby pushing the air outside the housing to vibrate and generate a leaked sound. At least one sound guiding hole 60 may be disposed in at least a portion of the housing 26. The sound guiding holes 60 may be used to lead sound waves in the housing formed by the air vibration inside the housing 26 to the outside of the housing 26, and interfere with leaked sound waves formed by the air outside the housing pushed by the vibration of the housing 26. In some embodiments, the interference may reduce the amplitude of the leaked sound waves.

The panel 24 may be fixedly connected to the earphone core 25, and synchronously vibrated by the earphone core 25. The panel 24 may protrude from the housing 26 through an opening of the housing 26, and at least fit at least a part of human skins. The vibration may be transmitted to auditory nerves through human tissues and bones, so that a person may hear sound. The earphone core 25 and the housing 26 may be connected through a connection piece 23. The connection piece 23 may position the earphone core 25 inside the housing 26.

The connection piece 23 may be one or more independent components, or disposed with the earphone core 25 or the housing 26 as a whole. In some embodiments, in order to reduce a constraint on the vibration, the connection piece 23 may be made of an elastic material.

In some embodiments, the sound guiding holes 60 may be disposed in an upper portion of the height of a side wall, for example, a portion of the side wall from the top (the vibration panel 24) to ⅓ height along the height direction.

Taking a cylindrical housing as an example, for the disposing position, the sound guiding holes 60 may be opened in a side wall and/or a bottom wall of the housing according to different requirements. Preferably, the sound guiding holes 60 may be opened in an upper portion and/or a lower portion of the side wall 261 of the housing. The count of sound guiding holes in the side wall 261 of the housing may be at least two, and preferably uniformly distributed in a circularly circumferential direction. The count of sound guiding holes in the bottom wall 262 of the housing may be at least two. With a center of the bottom wall as the center of the ring, the holes may be uniformly distributed in a ring shape. The sound guiding holes distributed in the ring may be disposed as at least one ring. The count of sound guiding holes disposed in the bottom wall 262 of the housing may be only one. The sound guiding holes may be disposed at the center of the bottom wall 262.

As for the count, the sound guiding holes may be one or more, preferably multiple, and evenly arranged. For ring-shaped distributed sound guiding holes, the count of sound guiding holes of each ring may be, for example, 6-8.

The shapes of the sound guiding holes may be a ring shape, an oval shape, a rectangular shape, or a long strip shape. The long strip shape refers to a long strip along a straight line, a curve, an arc, or the like. Various shapes of the sound guiding holes 60 on the speaker device may be the same or different.

In some embodiments, the sound guiding holes 60, as through-holes, may be disposed in the lower portion of the side wall of the housing 26 (a portion of the side wall from ⅔ height to the bottom along the height direction). The count of the sound guiding holes 60 may be, for example, eight, and the shape may be, for example, a rectangle. Each sound guiding hole 60 may be uniformly distributed in a ring shape on the side wall of the housing 26.

In some embodiments, the housing 26 may be cylindrical. The sound guiding holes 60 may be disposed in a middle portion of the side wall of the housing 26 (a portion of the side wall from ⅓ to ⅔ height along the height direction). The count of the sound guiding holes 60 may be, for example, eight, and the shapes may be, for example, rectangles. Each sound guiding hole 60 may be uniformly distributed in a ring shape on the side wall of the housing 26.

In some embodiments, the sound guiding holes 60 may be disposed in a circumferential direction of the bottom wall of the housing 26. The count of the sound guiding holes 60 may be, for example, eight, and the shapes may be, for example, rectangles. Each sound guiding hole 60 may be uniformly distributed in a ring shape on the side wall of the housing 26.

In some embodiments, the sound guiding holes 60 may be formed in the upper and lower portions of the side wall of the housing 26, respectively. The sound guiding holes 60 may be uniformly distributed in the upper portion and the lower portion of the side wall of the housing 26 in a ring shape. The count of the sound guiding holes 60 of each ring may be eight. In addition, the sound guiding holes 60 disposed at the upper and lower portions may be symmetrically disposed relative to a middle portion of the housing 26. The shape of each sound guiding hole 60 may be a ring.

In some embodiments, the sound guiding holes 60 may be disposed in the upper portion and the lower portion of the side wall of the housing 26, and the bottom wall of the housing 26, respectively. The sound guiding holes 60 opened on the side wall may be evenly distributed in the upper portion and the lower portion of the side wall of the housing 26. The count of the holes of each ring may be eight. The sound guiding holes 60 disposed at the upper portion and the lower portion may be symmetrically arranged relative to a middle portion of the housing 26. Each sound guiding hole 60 opened on the side wall may be rectangular. The shapes of the sound guiding holes 60 opened on the bottom wall may be a long strip shape arranged along an arc. The count of the holes may be four. The holes may be uniformly distributed in a ring shape with the center of the bottom wall as the ring center. The sound guiding holes 60 opened on the bottom wall may also include a ring-shaped through-hole opened at the center.

In some embodiments, the penetrating sound guiding holes 60 may be opened in the upper portion of the side wall of the housing 26. The holes may be evenly distributed in the upper portion of the side wall of the housing 26. The count may be, for example, eight, and the shape of the sound guiding holes 60 may be a ring.

In some embodiments, in order to show a better effect of suppressing leaked sound, the sound guiding holes 60 may be uniformly distributed in the upper portion, the middle portion, and the lower portion of the side wall 261, respectively, and a ring of the sound guiding holes 60 may also be disposed in the bottom wall 262 of the housing 26 in the circumferential direction. The aperture of each sound guiding hole 60 and the count of the holes may be the same.

In some embodiments, the sound guiding holes 60 may be unobstructed through-holes, so that a damping layer can be disposed at the opening of the sound guiding holes 60. The material and position of the damping layer may be set in many manners. For example, the damping layer may be made of tuning paper, tuning cotton, non-woven fabric, silk, cotton, sponge, rubber, or other materials with a certain damping for sound quality conduction. The damping layer may be attached to an inner wall of the sound guiding holes 60, or placed on the outside of the sound guiding holes 60.

In some embodiments, corresponding to different sound guiding holes, the damping layer may be disposed to have a same phase difference between the different sound guiding holes 60 to suppress the leaked sound of the same wavelength, or different phase differences between the different sound guiding holes 60 to suppress the leaked sound of different wavelengths (i.e., a specific band of leaked sound).

In some embodiments, different portions of the same sound guiding holes 60 may be disposed to have the same phase (e.g., using a pre-designed step or step-shaped damping layer) to suppress leaked sound waves of the same wavelength. Alternatively, different portions of the same sound guiding hole 60 may be disposed to have different phases to suppress leaked sound waves of different wavelengths.

The earphone core 25 may not only drive the panel 24 to vibrate, but also be a vibration source, which is accommodated inside the housing 26. The vibration of the surface of the earphone core 25 may cause the air in the housing to vibrate with the surface. Sound waves may be formed inside the housing 26, which may be referred to as in-housing sound waves. The panel 24 and the earphone core 25 may be located at the housing 26 through the connection piece 23. It may be inevitable that the vibration may be applied to the housing 26 to drive the housing 26 to vibrate synchronously. Therefore, the housing 26 may push the air outside the housing to vibrate to form the leaked sound wave. The leaked sound wave may propagate outward, forming the leaked sound.

According to the following equation to determine a position of the sound guiding hole to suppress the leaked sound, the reduction of the leaked sound may be proportional to:

$$(\iint_{S_{opening}} P ds - \iint_{S_{housing}} P_d ds) \tag{4}$$

where $S_{opening}$ denotes an opening area of the sound guiding hole, and $S_{housing}$ denotes a housing area that is not in contact with the face.

An in-housing pressure may be represented by:

$$P = P_a + P_b + P_c + P_e \tag{5}$$

where $P_a$, $P_b$, $P_c$, and $P_e$ denote sound pressures generated at any point of a-plane, b-plane, c-plane, and e-plane in the accommodating space, respectively.

$$P_a(x, y, z) = -j\omega\rho_0 \iint_{S_a} W_a(x'_a, y'_a) \cdot \frac{e^{jkR(x'_a, y'_a)}}{4\pi R(x'_a, y'_a)} dx'_a dy'_a - P_{aR} \tag{6}$$

$$P_b(x, y, z) = -j\omega\rho_0 \iint_{S_b} W_b(x', y') \cdot \frac{e^{jkR(x', y')}}{4\pi R(x', y')} dx' dy' - P_{bR} \tag{7}$$

$$P_c(x, y, z) = -j\omega\rho_0 \iint_{S_c} W_c(x'_c, y'_c) \cdot \frac{e^{jkR(x'_c, y'_c)}}{4\pi R(x'_c, y'_c)} dx'_c dy'_c - P_{cR} \tag{8}$$

$$P_e(x, y, z) = -j\omega\rho_0 \iint_{S_e} W_e(x'_e, y'_e) \cdot \frac{e^{jkR(x'_e, y'_e)}}{4\pi R(x'_e, y'_e)} dx'_e dy'_e - P_{eR} \tag{9}$$

where, $R(x', y') = \sqrt{(x-x')^2 + (y-y')^2 + z^2}$ denotes the distance from an observation point $(x, y, z)$ to a point $(x', y', 0)$ on a b-plane sound source, $S_a$, $S_b$, $S_c$, and $S_e$ denote the areas of a-plane, b-plane, c-plane, and e-plane, respectively, $R(x_a', y_a') = \sqrt{(x-x_a')^2 + (y-y_a')^2 + (z-z_a)^2}$ denotes the distance from the observation point $(x, y, z)$ to a point $(x_a', y_a', z_a)$ on a a-plane sound source, $R(x_c', y_c') = \sqrt{(x-x_c')^2+(y-y_c')^2+(z-z_c')^2}$ denotes the distance from the observation point (x, y, z) to a point $(x_c', y_c', z_c)$ on a c-plane sound source, $R(x_e', y_e') = \sqrt{(x-x_e')^2+(y-y_e')^2+(z-z_e')^2}$ denotes the distance from the observation point (x, y, z) to a point $(x_e', y_e', z_e)$ on an e-plane sound source, k=ω/u denotes a wave count (u may be the speed of sound), $\rho_0$ denotes a density of air. In some embodiments, ω may be an angular frequency of vibration, and $P_{aR}$, $P_{bR}$, $P_{cR}$, and $P_{eR}$ denote sound resistances of air itself, which respectively may be:

$$P_{aR} = A \cdot \frac{z_a \cdot r + j\omega \cdot z_a \cdot r'}{\varphi} + \delta, \quad (10)$$

$$P_{bR} = A \cdot \frac{z_b \cdot r + j\omega \cdot z_b \cdot r'}{\varphi} + \delta, \quad (11)$$

$$P_{cR} = A \cdot \frac{z_c \cdot r + j\omega \cdot z_c \cdot r'}{\varphi} + \delta, \quad (12)$$

$$P_{eR} = A \cdot \frac{z_e \cdot r + j\omega \cdot z_e \cdot r'}{\varphi} + \delta, \quad (13)$$

where r denotes a sound damping of each unit length, r' denotes a sound mass of each unit length, $z_a$ denotes a distance from the observation point to the a-plane sound source, $z_b$ denotes a distance from the observation point to the b-plane sound source, $z_c$ denotes a distance from the observation point to the c-plane sound source, $z_e$ denotes a distance from the observation point to the e-plane sound source.

$W_a(x, y)$, $W_b(X, y)$, $W_c(x, y)$, $W_e(x, y)$, and $W_d(x, y)$ denote sound source intensities of each unit area of the a-plane, b-plane, c-plane, e-plane, and d-plane, and may be derived from the following equation group (17):

$$F_e = \quad (14)$$

$$\begin{cases} F_a = F - k_1 \cos \omega t - \iint_{S_a} W_a(x,y)dxdy - \iint_{S_e} W_e(x,y)dxdy - f \\ F_b = -F + k_1 \cos \omega t + \iint_{S_b} W_b(x,y)dxdy - \iint_{S_e} W_e(x,y)dxdy - L \\ F_c = F_d = F_b - k_2 \cos \omega t - \iint_{S_c} W_c(x,y)dxdy - f - \gamma \\ F_d = F_b - k_2 \cos \omega t - \iint_{S_d} W_d(x,y)dxdy \end{cases}$$

where F denotes a driving force converted by the earphone core, $F_a$, $F_b$, $F_c$, $F_d$, $F_e$ denote driving forces of a, b, c, d, and e, respectively, $S_d$ denotes the housing (d-plane) area, f denotes a viscous resistance formed by a small gap of the side wall, f=ηΔs(dv/dy), L denotes an equivalent load of the face when the vibration plate acts on the face, y denotes energy dissipated on an elastic element 2, $k_1$, $k_2$ denote elastic coefficients of an elastic element 1 and the elastic element 2, respectively, η denotes a fluid viscosity coefficient, dv/dy denotes a fluid velocity gradient, Δs denotes a sectional area of an object (plate), Δ denotes the amplitude, Φ denotes an area of a sound field, Δ denotes a high-order quantity (derived from an incomplete symmetry of the shape of the housing). At any point outside the housing, a sound pressure generated by the vibration of the housing may be:

$$P_d = -j\omega\rho_0 \int\int W_d(x_d', y_d') \cdot \frac{e^{jkR(x_d', y_d')}}{4\pi R(x_d', y_d')} dx_d' dy_d', \quad (15)$$

where $R(x_d', y_d') = \sqrt{(x-x_d')^2+(y-y_d')^2+(z-z_d')^2}$ denotes the distance from the observation point (x, y, z) to a point $(x_d', y_d', z_d)$ on the d-plane sound source.

$P_a$, $P_b$, $P_c$, $P_e$ may be all functions of position. When a hole is opened at any position of the housing, and the area of the hole is S, the total effect of sound pressure at the hole may be $\iint_{S_{opening}} Pds$.

Since the panel 24 on the housing 26 is closely attached to the human tissue, and its output energy may be absorbed by the human tissue, only the d-plane may push the air outside the housing to vibrate to form the leaked sound. The total effect of vibration of the air outside the housing pushed by the housing may be $\iint_{S_{housing}} P_d ds$.

In some application scenarios, our goal may be to make $\iint_{S_{opening}} Pds$ and $\iint_{S_{housing}} P_d ds$ equal in magnitude and opposite in direction, so as to achieve the effect of reducing the leaked sound. Once the basic structure of the device is determined, $\iint_{S_{housing}} P_d ds$ may be an amount that we can not adjust, $\iint_{S_{opening}} Pds$ may be adjusted $S_{housing}$ to bias $\iint_{S_{housing}} P_d ds$. $\iint_{S_{opening}} Pds$ may include complete phase and amplitude information. The phase and amplitude may be closely related to the size of the housing 26 of the speaker device, the vibration frequency of the earphone core, the positions, shapes, count, sizes of the sound guiding holes 60, and whether there is a damping on each hole, which may allow us to implement the purpose of suppressing the leaked sound by adjusting the opening position, shape and count of sound guiding holes, and/or increasing damping and/or adjusting damping material.

The in-housing sound wave(s) and leaked sound wave(s) may be equivalent to two sound sources shown in the figure. The penetrating sound guiding holes 60 may be opened on the wall surface of the housing 26 in some embodiments of the present disclosure, which may guide the in-housing sound wave(s) to propagate to the outside of the housing, propagate in the air with the leaked sound waves(s), and interfere therewith, thereby reducing the amplitude of the leaked sound wave(s), that is, reducing the leaked sound. Therefore, the technical solution of the present disclosure, through the convenient improvement of opening sound guiding holes in the housing, may solve the problem of the leaked sound to a certain extent without increasing the volume and weight of the speaker device.

According to the equation derived by the inventor, those skilled in the art may easily understand that the elimination effect of leaked sound wave(s) may be closely related to the housing size of the speaker device, the vibration frequency of the earphone core, the opening position, shape, count, and size of the sound guiding holes 60, and whether there is a damping on the hole, such that the opening position, shape, count, and the damping material of the sound guiding holes 60 may have a variety of different solutions according to needs.

Figure 30:
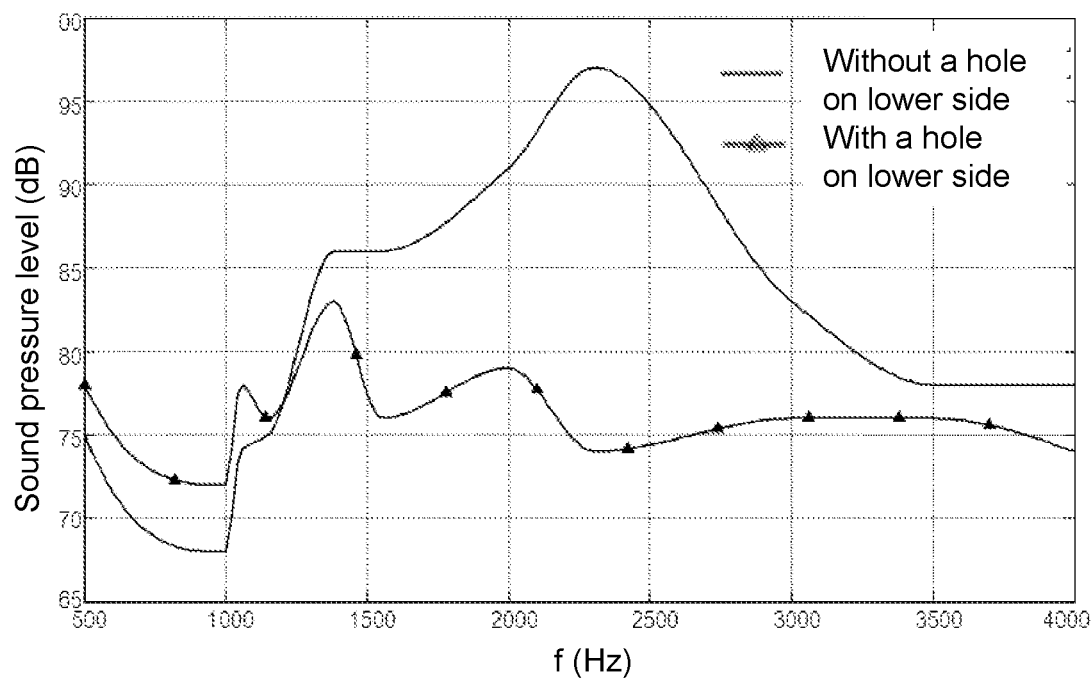
FIG. 30 is a diagram illustrating an effect of suppressing leaked sound of a speaker device according to some embodiments of the present disclosure.

FIG. 30 is a diagram illustrating an effect of suppressing leaked sound of a speaker device according to some embodiments of the present disclosure. In a target region near the speaker device (e.g., the speaker device shown in FIGS. 29A and 29B), a difference between a phase of a leaked sound wave transmitted to the target region and a phase of an in-housing sound wave propagating to the target region through sound guiding holes may be close to 180°. In this way, the leaked sound wave generated by the housing may be significantly reduced or even eliminated in the target region.

As shown in FIG. 30, the leaked sound wave may be significantly suppressed in a frequency band from 1500 Hz to 4000 Hz. As used therein, within a frequency band from 1500 Hz to 3000 Hz, the suppressed leaked sound may basically exceed 10 dB. Especially within a frequency band from 2000 Hz to 2500 Hz, the leaked sound may be reduced by more than 20 dB after the sound guiding holes is opened in a lower side of the housing compared with a case without opening the sound guiding holes.

It should be noted that the illustration of the speaker device described above is only a specific example, and should not be regarded as the only feasible implementation. Obviously, for those skilled in the art, after the basic principles of the loudspeaker device, it may be possible to make various modifications and changes in forms and details of the specific methods and steps for implementing the speaker device without departing from the principles, but the modifications and changes are still within the scope illustrated above. For example, the sizes of the sound guiding holes 60 may be different to suppress leaked sound wave in different frequency bands. All such variations may be within the protection scope of the present disclosure.

Figure 31:
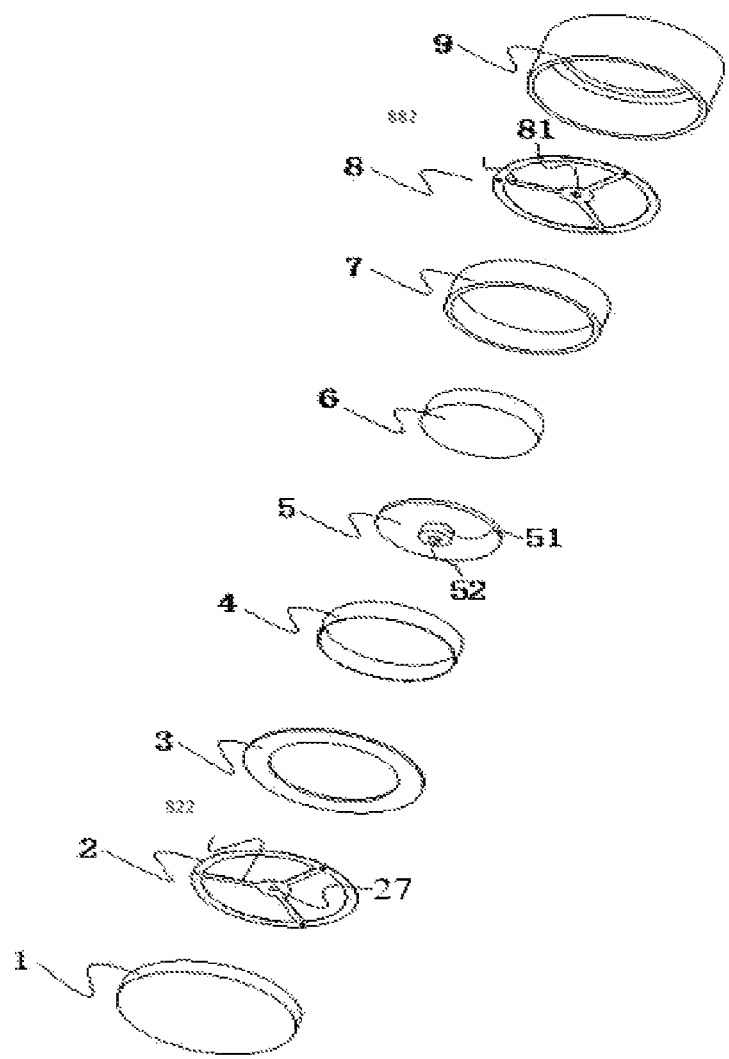
FIG. 31 is an exploded three-dimensional schematic diagram of a dual positioning speaker device according to some embodiments of the present disclosure.
Figure 32:
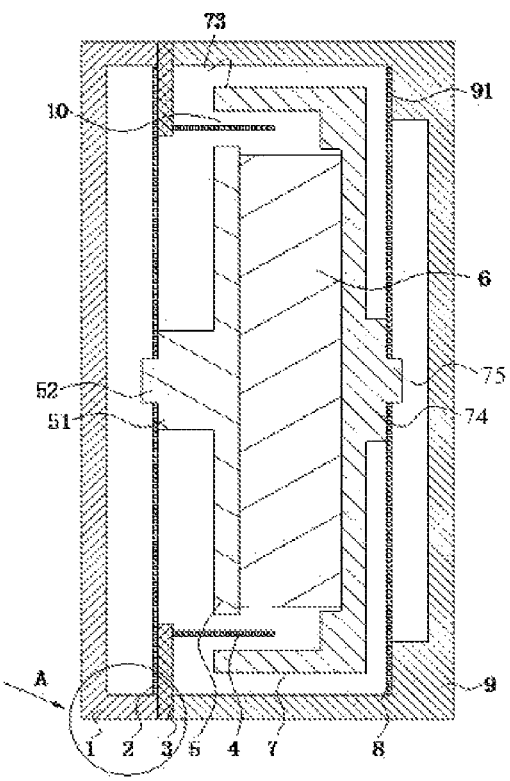
FIG. 32 is a cross-sectional view of a dual positioning speaker device according to some embodiments of the present disclosure.
Figure 33:
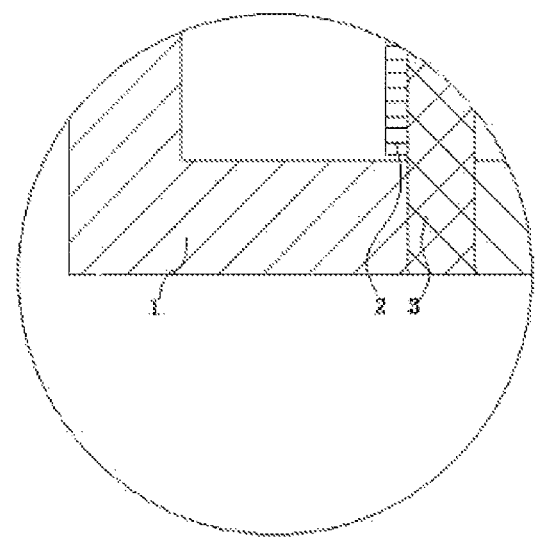
FIG. 33 is partial enlarged view along the direction A in FIG. 32.
Figure 34:
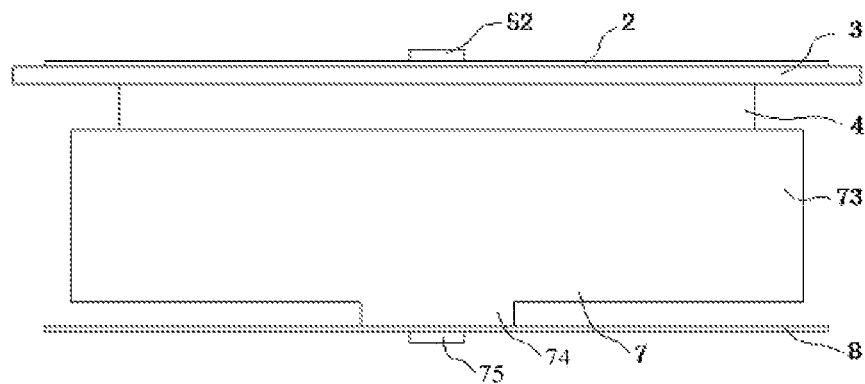
FIG. 34 is a combined schematic diagram of a dual positioning speaker device (removing the support part) according to some embodiments of the present disclosure.
Figure 35:
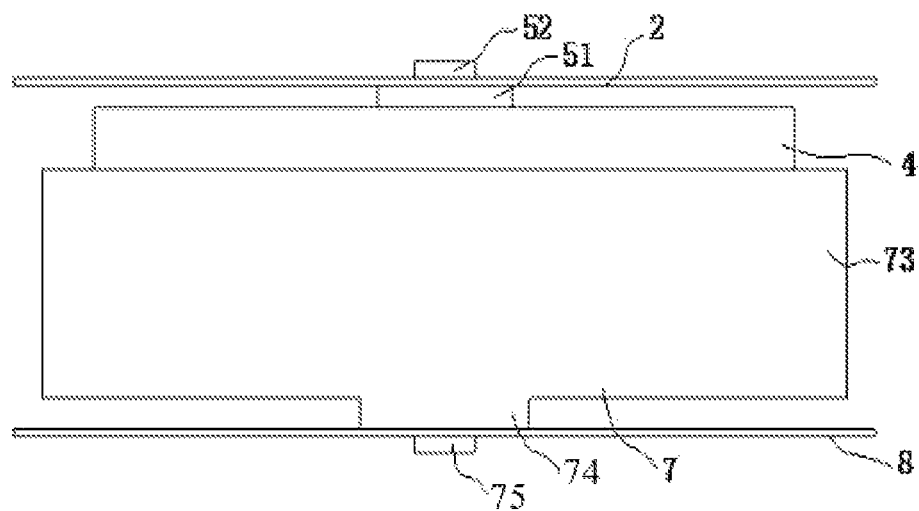
FIG. 35 is an assembly schematic diagram of a magnetic assembly, a positioning assembly, and a voice coil in FIG. 34.
Figure 36:
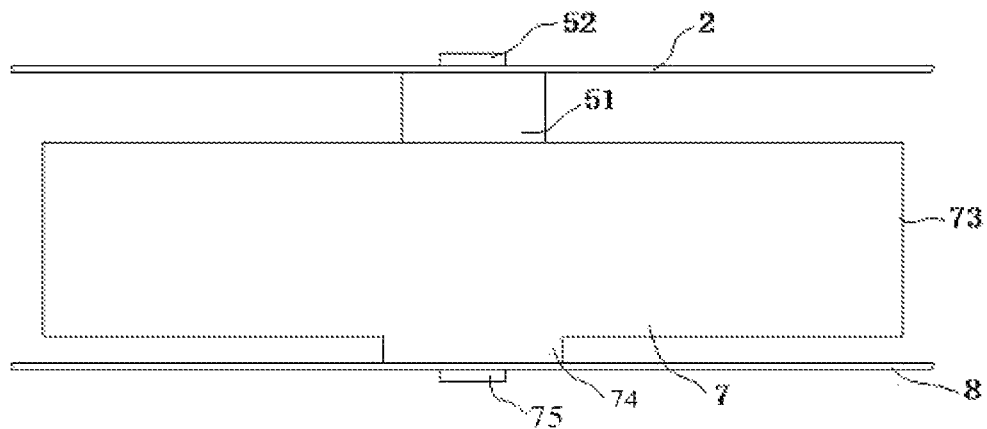
FIG. 36 is an assembly diagram of a magnetic assembly and a positioning assembly in FIG. 34.
Figure 37:
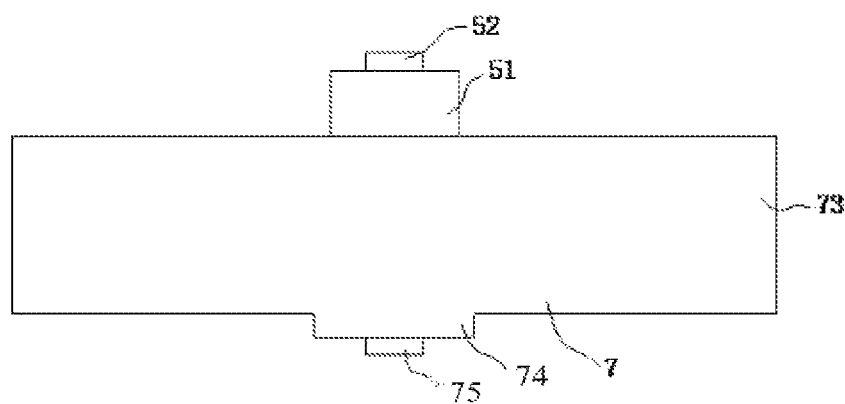
FIG. 37 is a schematic structural diagram of a magnetic assembly in FIG. 34.
Figure 38:
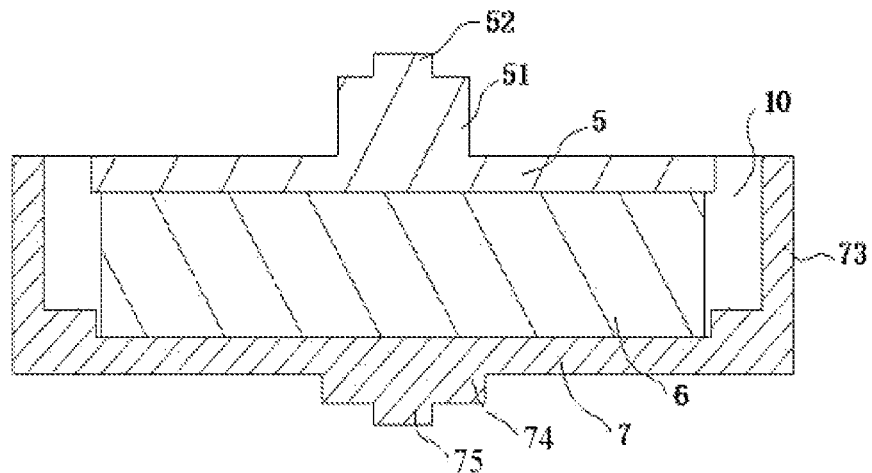
FIG. 38 is a sectional view of FIG. 37.

FIG. 31 is an exploded three-dimensional schematic diagram of a dual positioning speaker device according to some embodiments of the present disclosure. FIG. 32 is a cross-sectional view of a dual positioning speaker device according to some embodiments of the present disclosure. FIG. 33 is partial enlarged view along the direction A in FIG. 32. FIG. 34 is a combined schematic diagram of a dual positioning speaker device (removing the support part) according to some embodiments of the present disclosure. FIG. 35 is an assembly schematic diagram of a magnetic assembly, a positioning assembly, and a voice coil in FIG. 34. FIG. 36 is an assembly diagram of a magnetic assembly and a positioning assembly in FIG. 34. FIG. 37 is a schematic structural diagram of a magnetic assembly in FIG. 34. FIG. 38 is a sectional view of FIG. 37. Referring to FIG. 31 to FIG. 38, in some embodiments, the dual positioning speaker device may include an earphone core and a support part (i.e., the core housing in the foregoing embodiment). The earphone core may include a magnetic assembly, an (elastic) positioning assembly arranged between the magnetic assembly and the support part, a voice coil, and a gasket.

In some embodiments, the magnetic assembly may include a first magnetic conductive magnet 5, a second magnetic conductive magnet 7 and a magnet 6. The magnet mentioned here may be, but is not limited to, aluminum-iron-boron, cobalt-nickel-aluminum, rare earth materials, composite materials, and permanent magnet ferrites. The magnetic conductive magnet mentioned here is also referred to a magnetic field concentrator or an iron core, which may be but not limited to laminations or block elements made of soft magnetic materials. The soft magnetic materials mentioned here may be, but not limited to, silicon steel sheets, ferrite, and iron. The magnet 6 may be arranged between the first magnetic conductive magnet 5 and the second magnetic conductive magnet 7. Preferably, the first magnetic conductive magnet 5 and the second magnetic conductive magnet 7 may be fixed on both sides of the magnet 6 respectively. The first magnetic conductive magnet 5, the second magnetic conductive magnet 7, and the magnet 6 may be connected as a whole in a certain way, which may be a physical way, such as clamping and welding, or a chemical way, such as bonding. Preferably, the first magnetic conductive magnet 5, the second magnetic conductive magnet 7, and the magnet 6 may be connected as a whole by bonding. The first magnetic conductor 5, the second magnetic conductive magnet 7, and the magnet 6 may be arranged coaxially. Preferably, the first magnetic conductor 5, the second magnetic conductive magnet 7, and the magnet 6 may be all arranged as structures with the same axis of symmetry. The structures with the axis of symmetry may be a ring structure, a columnar structure, or other structures with an axis of symmetry.

According to FIG. 31 and FIG. 32, in some embodiments, the support part (i.e., the core housing in the foregoing embodiment) may include a first housing 1 and a second housing 9. The first housing 1 may be connected with the second housing to form an accommodating space for accommodating the magnetic assembly, the elastic element, and/or the voice coil. The first housing 1 and the first magnetic conductive magnet 5 may be on the same side, and there may be a gap between them. The second housing 9 and the second magnetic conductive magnet 7 may be on the same side, and there may be a gap between them. The support part mentioned here may be a bracket or other device that may support the magnetic assembly and the positioning assembly.

In some embodiments, a gasket 3 may be fixedly arranged in an accommodating space formed by the first housing 1 and the second housing 9, and the gasket 3 is preferably annular. The inner diameter of the annular gasket 3 may be smaller than the inner diameters of the first housing 1 and the second housing 9, so that the inner side of the annular gasket 3 protrudes toward the inside with respect to the first housing 1 and the second housing 9. The outer diameter of the annular gasket 3 may be the same or different from the outer diameters of the first housing 1 and the second housing 9. Preferably, the outer diameter of the annular gasket 3 may be the same as the outer diameters of the first housing 1 and the second housing 9 to form a smooth and flat outer plane. The gasket 3 may be fixedly arranged at the junction of the first housing 1 and the second housing 9, or may be fixedly mounted on the inner side of the accommodating space formed by the first housing 1 and the second housing 9. The gasket 3, the first housing 1, and the second housing 9 may be connected in a certain manner as a whole. The above-mentioned connection method may be a physical method, such as clamping and welding, or a chemical method, such as bonding. Preferably, the gasket 3, the first housing 1, and the second housing 9 may be connected as a hole by bonding.

In some embodiments, inside the second housing 9, that is, on the side facing the first housing 1, a stepped surface 91 may be disposed on the bottom surface, and the lower surface of the second elastic element 8 is fixedly provided on the stepped surface 91. The second elastic element 8 and the stepped surface 91 may be connected together in a certain manner. The above-mentioned connection method may be a physical method, such as clamping and welding, or a chemical method, such as bonding. Preferably, the second elastic element 8 and the stepped surfaces 91 may be connected by bonding.

In some embodiments, a voice coil 4 may be fixed on the gasket 3, and the voice coil 4 may be fixed on the lower surface of the inner side of the gasket 3. The gasket 3 and the voice coil 4 may be connected in a certain way as a whole. The connection method may be a physical method, such as clamping and welding, or a chemical method, such as bonding. Preferably, the gasket 3 and the voice coil 4 may be connected as a whole by bonding. The voice coil 4 continues to extend downward from the lower surface of the inner side of the gasket 3 and may be located in the magnetic gap formed by the ring-shaped side edge 73 of the first magnetic conductive magnet 5 and the second magnetic conductive magnet 7.

According to FIG. 31, FIG. 33, FIG. 34, FIG. 35, FIG. 36, and FIG. 37, in some embodiments, the center of the first magnetic conductive magnet 5 may be provided with a protruding first step 51. The first step 51 may extend away from the magnet 6 and the second magnetic conductive magnet 7. A vibration space may be formed between the first magnetic conductive magnet 5 and the first elastic element 2 through the first step 51 to ensure that the first elastic element 2 may drive the first magnetic conductive magnet 5 to vibrate. If the first step 51 is not provided, although the first elastic element 2 may drive the magnetic assembly to vibrate, noise may be produced. The deformation of the center region of the elastic element may be the largest along the axis of symmetry, and the deformation of the region of the sides and the region bonded with the housing may be the smallest. Since the elastic element drives the magnetic assembly to vibrate, and the displacement of the magnetic assembly in the axial direction is the deformation of the center of the elastic element, the height of the first step 51 may ensure the size of the vibration space formed between the magnetic assembly and the elastic element. Preferably, the height of the first step 51 may be greater than the maximum value of the deformation of the elastic element in the direction of the axis of symmetry in the central region, so as to prevent the magnetic assembly from hitting the elastic element during movement and causing noise. At the center of the first step 51, a protruding first positioning portion 58 may be provided. The extending direction of the first positioning portion 58 may be away from the magnet 6 and the second magnetic conductive magnet 7 and the first magnetic conductive magnet 5 may be positioned by the first positioning part 52.

In some embodiments, the periphery of the second magnetic conductive magnet 7 may be provided with a convex side 73 extending upward, and preferably, the side 73 may be annular. The side 73 may extend from the second magnetic conductive magnet 7 toward the first magnetic conductive magnet 5 and the magnet 6. The diameter of the side 73 may be greater than the outer diameter of the first magnetic conductive magnet 5, so that a magnetic gap is formed between the side 73 and the first magnetic conductive magnet 5, and a strong magnetic field is formed in the magnetic gap.

In some embodiments, the center of the second magnetic conductive magnet 7 may be provided with a stepped portion, and the inner bottom may be set to be lower and thinner, so that a concave portion may be formed relative to the stepped portion. The center of the second magnetic conductive magnet 7 may also are not provided with the stepped portion and the concave portion. The concave portion mentioned here may be used to place the magnet, and the magnet may be fixedly connected in the concave portion of the second magnetic conductive magnet 7 in a certain way. It may be physical means, such as clamping and welding, or chemical means, such as bonding. Preferably, the magnet may be fixedly connected in the concave portion of the second magnetic conductive magnet 7 by bonding. The provision of the concave portion mentioned here may facilitate assembly but may result in a weakening of the magnetic field. Preferably, stepped portions and concave portions of different depths may be designed and adjusted according to needs, or the stepped portion and concave portion may not be provided.

In some embodiments, the center of the second magnetic conductive magnet 7 may be provided with a protruding second step 74. The second step 74 may extend away from the magnet 6 and the first magnetic conductive magnet 5. A vibration space may be formed between the second magnetic conductive magnet 7 and the second elastic element 8 through the second step 74 to ensure that the second elastic element 8 may drive the second magnetic conductive magnet 7 to vibrate. If the second step 74 is not provided, although the second elastic element 8 may drive the magnetic assembly to vibrate, noise may be produced. The deformation of the center region of the elastic element may be the largest along the axis of symmetry, and the deformation of the region of the sides and the region bonded with the housing may be the smallest. Since the elastic element drives the magnetic assembly to vibrate, and the displacement of the magnetic assembly in the axial direction is the deformation of the center of the elastic element, the height of the second step 74 may ensure the size of the vibration space formed between the magnetic assembly and the elastic element. Preferably, the height of the second step 74 may be greater than the maximum value of the deformation of the elastic element in the direction of the axis of symmetry in the central region, so as to prevent the magnetic assembly from hitting the elastic element during the movement process and causing noise. At the center of the second step 74, a protruding second positioning part 75 may be provided. The extending direction of the second positioning part 75 may be away from the magnet 6 and the first magnetic conductive magnet 5, and the second magnetic conductive magnet 7 may be positioned by the second positioning part 75.

In some embodiments, the positioning assembly may include the first elastic element 2 and the second elastic element 8. The first elastic element 2 and the second elastic element 8 may be located on both sides of the magnetic assembly, respectively. In some embodiments, the first elastic element 2 and the second elastic element 8 may be located on opposite sides of a center of gravity of the magnetic assembly. The first elastic element 2 may be fixed on the first positioning part 52 and the gasket 3, and the second elastic element 8 may be fixed on the second housing 9 and the second positioning part 75. The first elastic element 2 and the gasket 3 may form a composite vibration assembly, and two formants may be generated through double composite vibration. Furthermore, the formants may move by adjusting the size and material parameters of the two components. Specifically, the low-frequency formants may be moved to lower frequency, and the high-frequency formants may be moved to higher frequency, so that the range of these resonant peaks is within the range that can be heard by the ear, so as to broaden the resonance response range of sound and get the ideal sound. The first elastic element 2 and/or the second elastic element 8 may be made of elastic materials including but not limited to stainless steel, beryllium copper, plastic, PC, etc. Preferably, the thickness of the first elastic element 2 and/or the second elastic element 8 may be in a range of 0.04 mm to 0.20 mm. More preferably, the thickness of the first elastic element 2 and/or the second elastic element 8 may be in a range of 0.08 mm to 0.12 mm. Preferably, the first elastic element 2 may be an elastic plate, which may be set to have a first inner ring body and a first outer ring body. The first inner ring body may be located at the center of the first outer ring body. At least one first support rod may be arranged convergently toward the center of the outer ring body, and a first positioning hole may be provided in the center of the first inner ring body. Preferably, the second elastic element 8 may be an elastic plate, which may be set to have a second inner ring body and a second outer ring body. The second inner ring body may be located at the center of the second outer ring body. At least one second supporting rod may be arranged convergently toward the center of the second outer ring body, and a second positioning hole may be arranged in the center of the second inner ring body. The number of the first support rod 822 and the second support rod 882 may be the same or different. Preferably, the number of the first support rod 822 and the second support rod 882 may be greater than or equal to two. Preferably, the support rod may be a straight rod. Preferably, the width of the support rod may be in a range of 0.4 mm to 1.5 mm, and more preferably, the width of the support rod may be in a range of 0.6 mm to 1.0 mm.

Preferably, the outer diameter of the first elastic element 2, that is, the outer diameter of the first outer ring body may be smaller than the inner diameter of the first housing 1. Preferably, in the axial direction of the magnetic assembly, there may be also a gap between the first elastic element 2 and the first housing 1, and the first elastic element 2 may be not in direct contact with the first housing 1. The first elastic element 2 and the gasket 3 may be connected together in a certain manner. The above-mentioned connection method may be a physical method, such as clamping and welding, or a chemical method, such as bonding. Preferably, the connection between the first elastic element 2 with the gasket 3 may be bonding.

In some embodiments, the first positioning hole 27 in the first elastic element 2 may match the first positioning part 52 on the first conductor 5, and the two may be fixed together in a certain way, which may be a physical way, for example, snapping, bolting and welding, or may also be chemical methods, such as bonding. Preferably, snapping or bonding may be used for fixing, more preferably, the fixing method may be concentric fixing. The second positioning hole 81 in the second elastic element 8 may match the second positioning part 75 on the second magnetic conductive magnet 7. The two may be fixed together in a certain way, which may be physical means such as snapping, bolting and welding, or may be a chemical method, such as bonding. Preferably, a snap-fit or adhesive method may be used for the fixation, and more preferably, the fixation method may be a concentric fixation. In the specific installation process, the center of the first magnetic conductive magnet 5 may be protruded with the first positioning part 52, and the first positioning hole 27 may be recessed in the center of the first elastic element 2. During installation, the first positioning part 52 may be inserted into the first positioning hole 27, so that the first magnetic conductive magnet 5 and the first elastic element 2 may be concentrically fixed. The center of the second magnetic conductive magnet 7 may be protruded with the second positioning part 75, and correspondingly, and the second positioning hole 81 may be recessed in the center of the second elastic element 8. During installation, the second positioning part 75 may be inserted into the second positioning hole 81, so that the second magnetic conductive magnet 7 and the second elastic element 8 are concentrically fixed.

It should be noted that the dual positioning speaker device of the embodiment of the present disclosure may be based on air conduction or bone conduction technology. In some embodiments, when the speaker device is a dual positioning bone conduction speaker device, the magnetic system consisting of the first magnetic conductive magnet 5, the magnet 6, and the second magnetic conductive magnet 7 generates current induction when the voice coil 4 is energized, and then the magnetic field intensity of the magnetic system changes, and the inductance and other parameters also change accordingly. Therefore, the voice coil 4 may be subjected to ampere force in the magnetic field, so that the voice coil 4 move back and forth longitudinally among the first magnetic conductive magnet 5, the magnet 6, and the second magnetic conductive magnet 7. The vibration is transmitted to the first housing 1 and the second housing 9 by the gasket 3, and the sound vibration is transmitted to the human bone from the part that is in direct contact with the human bone, so that people may sense the sound. The voice coil 4 may be fixed on the gasket 3, so that when the speaker is working, the installation position of the voice coil 4 may not deviate. Since the positions of the first magnetic conductive magnet 5, the second magnetic conductive magnet 7, and the elastic element are relatively fixed, that is, the installation position of the magnetic gap 10 remains unchanged, thereby ensuring the installation stability of the voice coil, and fundamentally ensuring the sound quality of the speaker device.

It should be noted that the above descriptions of the dual positioning speaker device are merely a specific example, and should not be regarded as the only feasible implementation solution. Obviously, for those skilled in the art, after understanding the basic principle of the dual positioning speaker device, it may be possible to make various modifications and changes in the form and details of the specific method and operation of implementing the fitting without departing from these principles, but these modifications and changes are still within the scope described above. For example, the number of each of the first support rod and the second support rod may be three. All such variations may be within the protection scope of the present disclosure.

Figure 39:
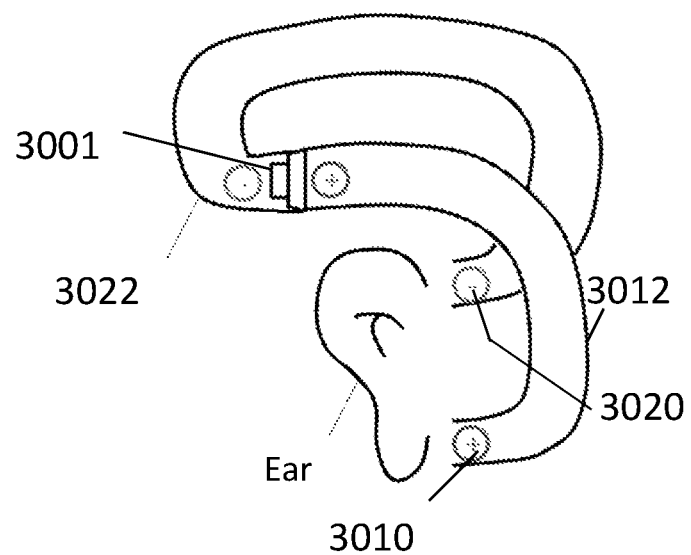
FIG. 39 is a schematic diagram of transmitting sound through air conduction according to some embodiments of the present disclosure.

In some embodiments, the speaker device described above may also transmit the sound to the user through air conduction. When the air condition is used to transmit the sound, the speaker device may include one or more sound sources. The sound source may be located at a specific position of the user's head, for example, the top of the head, a forehead, a cheek, a temple, an auricle, the back of an auricle, etc., without blocking or covering an ear canal. FIG. 39 is a schematic diagram illustrating transmitting sound through air conduction according to some embodiments of the present disclosure.

As shown in FIG. 39, a sound source 3010 and a sound source 3020 may generate sound waves with opposite phases ("+" and "−" in the figure may indicate the opposite phases). For brevity, the sound sources mentioned herein may refer to sound outlets of the speaker that may output sounds. For example, the sound source 3010 and the sound source 3020 may be two sound outlets located at specific positions of the speaker device (e.g., the core housing 82 or the circuit housing 101), respectively.

In some embodiments, the sound source 3010 and the sound source 3020 may be generated by a same vibration device 3001. The vibration device 3001 may include a diaphragm (not shown in the figure). When the diaphragm is driven to vibrate by an electric signal, the front side of the diaphragm may drive air to vibrate. The sound source 3010 may form at the sound output through a sound guiding channel 3012. The back of the diaphragm may drive air to vibrate, and the sound source 3020 may be formed at the sound output hole through a sound guiding channel 3022. The sound guiding channel may refer to a sound transmission route from the diaphragm to the corresponding outlet.

In some embodiments, the sound guiding channel may be a route surrounded by a specific structure (e.g., the core housing 82 or the circuit housing 101) on the speaker device. It should be noted that in some alternative embodiments, the sound source 3010 and the sound source 3020 may also be generated by different vibrating diaphragms of different vibration devices, respectively.

Among the sounds generated by the sound source 3010 and the sound source 3020, one portion of the sounds may be transmitted to the ear of the user to form the sound heard by the user. Another portion of the sound may be transmitted to the environment to form a leaked sound. Considering that the sound source 3010 and the sound source 3020 are relatively close to the ears of the user, for convenience of descriptions, the sound transmitted to the ears of the user may be referred to as a near-field sound. The leaked sound transmitted to the environment may be referred to as a far-field sound. In some embodiments, the near-field/far-field sounds of different frequencies generated by the speaker device may be related to a distance between the sound source 3010 and the sound source 3020. Generally speaking, the near-field sound generated by the speaker device may increase as the distance between the two sound sources increases, while the generated far-field sound (the leaked sound) may increase as the frequency increases.

For the sounds of different frequencies, the distance between the sound source 3010 and the sound source 3020 may be designed, respectively, so that a low-frequency near-field sound (e.g., a sound with a frequency smaller than 800 Hz) generated by the speaker device may be as large as possible and a high-frequency far-field sound (e.g., a sound with a frequency greater than 2000 Hz) may be as small as possible. In order to implement the above purpose, the speaker device may include two or more sets of dual sound sources. Each set of the dual sound sources may include two sound sources similar to the sound source 3010 and the sound source 3020, and generate sounds with specific frequencies, respectively. Specifically, a first set of the dual sound sources may be used to generate relatively low frequency sounds. A second set of the dual sound sources may be used to generate relatively high frequency sounds. In order to obtain more low-frequency near-field sounds, the distance between two sound sources in the first set of the dual sound sources may be set with a larger value. Since the low-frequency signal has a relatively long wavelength, the relatively large distance between the two sound sources may not cause a large phase difference in the far-field, and not form excessive leaked sound in the far-field. In order to make the high-frequency far-field sound smaller, the distance between the two sound sources in the second set of the dual sound sources may be set with a smaller value. Since the high-frequency signal has a relatively short wavelength, the smaller distance between the two sound sources may avoid the generation of the large phase difference in the far-field, and thus the generation of the excessive leaked sounds may be avoided. The distance between the second set of the dual sound sources may be smaller than the distance between the first set of the dual sound sources.

The benefits of the present application may include, but not limited to: (1) the circuit housing and the housing sheath may be molded separately and assembled together to avoid the damage to the control circuit or the battery caused by the high temperature; (2) the first housing sheath and the second housing sheath may not completely cover the entire circuit housing and components for user operation may be exposed to facilitate user operation; (3) the composite vibration assembly composed of the vibration plate, the first vibration conductive plate, and the second vibration conductive plate may produce at least two resonance peaks. A flatter frequency response curve may be generated within an audible range of the auditory system, thereby improving the sound quality of a speaker device; (4) the stability of the installation of the voice coil may be improved, thereby improving the sound quality of a speaker device. It should be noted that different embodiments may have different beneficial effects. In different embodiments, the possible beneficial effects may be any of the above or the like, or any combination thereof, or may be any other beneficial effects that may be obtained.

The basic concepts have been described above. Obviously, for those skilled in the art, the disclosure of the invention is merely by way of example, and does not constitute a limitation on the present disclosure. Although not explicitly stated here, those skilled in the art may make various modifications, improvements and alterations to the present disclosure. These alterations, improvements, and modifications are intended to be suggested by this disclosure, and are within the spirit and scope of the exemplary embodiments of this disclosure.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A speaker device, comprising:
a speaker assembly, the speaker assembly including an earphone core and a core housing for accommodating the earphone core, and a location of the speaker assembly relative to an ear hook being able to change, so that the speaker assembly being attached to a front side or a rear side of a user's ear.

2. The speaker device of claim 1, wherein the speaker device further includes a circuit housing, wherein
the circuit housing is configured to accommodate a control circuit or a battery,
the ear hook and the speaker assembly are connected to opposite ends of the circuit housing, respectively.

3. The speaker device of claim 2, wherein the speaker device further includes a rear hook, wherein
at least a part of the ear hook is covered by a first housing sheath, and
the rear hook is connected to the other end of the circuit housing away from the ear hook and at least a part of the rear hook being covered by a second housing sheath, the first housing sheath and the second housing sheath covering at least a part of a periphery of the circuit housing from two ends of the circuit housing, respectively.

4. The speaker device of claim 3, wherein the circuit housing comprises one or more main side walls, one or more auxiliary side walls, and one or more end walls connected with each other, wherein the first housing sheath and the second housing sheath is coupled to each other on the one or more main side walls and the one or more auxiliary side walls.

5. The speaker device of claim 4, wherein an inner surface of the first housing sheath or the second housing sheath corresponding to the one or more main side walls includes a positioning convex block, and an outer surface of the one or more main side walls is provided with a positioning groove corresponding to the positioning convex block.

6. The speaker device of claim 4, wherein coupled regions between the first housing sheath and the second housing sheath on the one or more main side walls and the one or more auxiliary sides wall are arranged obliquely with respect to the one or more auxiliary side walls.

7. The speaker device of claim 4, wherein
the rear hook includes a plug end facing an end of the circuit housing, and the second housing sheath is sleeved on a periphery of at least a part of the plug end;
the circuit housing includes a socket facing the rear hook, and the plug end is at least partially inserted into the socket; wherein slots perpendicular to an insertion direction of the plug end relative to the socket are located on the plug end, and a first side wall of the socket is provided with a first through-hole corresponding to positions of the slots; and
the speaker device further includes a fixing component, the fixing component including two pins disposed in parallel and a connecting part for connecting the pins; wherein the pins are inserted into the slots through the first through-hole from an outer side wall of the first side wall of the socket so as to achieve a plugged-in connection between the circuit housing and the rear hook.

8. The speaker device of claim 3, wherein a cover area of one of the first housing sheath or the second housing sheath on the circuit housing is not less than a half of a cover area of the other one of the first housing sheath or the second housing sheath on the circuit housing.

9. The speaker device of claim 1, wherein the speaker assembly is connected to an end of the ear hook through a hinge assembly, and the hinge assembly is able to rotate to change the location of the speaker assembly relative to the ear hook.

10. The speaker device of claim 9, wherein the hinge assembly comprises a hinge, a rod-like component, and a fixing component; the hinge includes:
a hinge base; and
a hinge arm, wherein the hinge arm and the hinge base are rotatably connected by a rotating axis, and the hinge arm rotates relative to the hinge base under an external force, so as to alter a position of the speaker assembly relative to the ear hook;
a supporting element, the supporting element being movably arranged on the hinge base; and
an elastic element, the elastic element is configured to elastically bias the supporting element toward the hinge arm so that the supporting element elastically abuts against the hinge arm.

11. The speaker device of claim 10, wherein
the hinge arm includes a first supporting surface and a second supporting surface connected with each other;
the support element includes a third supporting surface;
the third supporting surface elastically abuts against the first supporting surface and the second supporting surface, respectively, when the supporting element is elastically biased toward the hinge arm; and
the supporting element is driven to rotate reversely to overcome the elastic bias of the elastic element by a connection between the first supporting surface and the second supporting surface when the hinge arm rotates relative to the hinge base under an external force, so that the third supporting surface is switched from elastically abutting against one of the first supporting surface or the second supporting surface to the other one of the first supporting surface or the second supporting surface.

12. The speaker device of claim 11, wherein
the hinge base includes a base body, a first lug, and a second lug, and the first lug and the second lug protrude from the base body and are arranged at intervals between each other; and
the hinge arm includes an arm body and a third lug protruding from the arm body, and the third lug is inserted into an interval region between the first lug and the second lug and is rotatably connected with the first lug and the second lug through the rotating axis.

13. The speaker device of claim 12, wherein
the supporting element is at least partially arranged in the interval region and located on one side of the third lug facing the base body; and
the base body is provided with an accommodating cavity communicated with the interval region, the elastic element is disposed within the accommodating cavity, and the supporting element is elastically biased toward the third lug by the elastic element.

14. The speaker device of claim 1, wherein the earphone core at least includes a composite vibration assembly constituted by a vibration plate and a second vibration conductive plate, the composite vibration assembly generating two resonance peaks.

15. The speaker device of claim 14, wherein
the earphone core further includes at least one voice coil and at least one magnetic circuit assembly; and
the at least one voice coil is physically connected to the vibration plate, and the at least one magnetic circuit assembly is physically connected to the second vibration conductive plate.

16. The speaker device of claim 1, wherein the earphone core comprises:
a magnetic assembly, the magnetic assembly at least including a magnetic element;
a positioning assembly, the positioning assembly at least including two elastic elements;
the magnetic assembly and the positioning assembly being both provided on the core housing;
the two elastic elements being located on opposite sides of a center of gravity of the magnetic assembly; and
a relative position between the magnetic assembly and the core housing being fixed.

17. The speaker device of claim 16, wherein
the magnetic assembly at least includes a first magnetic element and a second magnetic element, the first magnetic element being a magnetic conductor or a magnet and the second magnetic element being a magnetic conductor or a magnet; and
there is a magnetic gap between the first magnetic element and the second magnetic element.

18. The speaker device of claim 17, wherein
the positioning assembly includes a first elastic element and a second elastic element;
the first elastic element causes a relative position between the first magnetic element and the core housing to be fixed in an extending direction of the first elastic element; and
the second elastic element causes a relative position between the second magnetic element and the core housing to be fixed in an extending direction of the second elastic element.

19. The speaker device of claim 18, wherein the core housing includes a first housing and a second housing;

the first housing and the second housing form an accommodating space for accommodating the magnetic assembly and the positioning assembly; and the first elastic element causes a relative position between the first magnetic element and the first housing to be fixed in the extending direction of the first elastic element.

20. The speaker device of claim 17, wherein the earphone core includes a voice coil, and at least a portion of the voice coil is disposed in the magnetic gap between the first magnetic element and the second magnetic element.

* * * * *